US010164858B2

(12) United States Patent
Gunasekara et al.

(10) Patent No.: US 10,164,858 B2
(45) Date of Patent: Dec. 25, 2018

(54) APPARATUS AND METHODS FOR MONITORING AND DIAGNOSING A WIRELESS NETWORK

(71) Applicant: Time Warner Cable Enterprises LLC, New York, NY (US)

(72) Inventors: Don Gunasekara, Reston, VA (US); Ahmed Bencheikh, Lorton, VA (US); Priyank Vira, Fairfax, VA (US)

(73) Assignee: Time Warner Cable Enterprises LLC, St. Louis, MO (US)

( * ) Notice: Subject to any disclaimer, the term of this patent is extended or adjusted under 35 U.S.C. 154(b) by 131 days.

(21) Appl. No.: 15/183,159

(22) Filed: Jun. 15, 2016

(65) Prior Publication Data
US 2017/0366983 A1 Dec. 21, 2017

(51) Int. Cl.
*H04L 12/26* (2006.01)
*H04W 24/08* (2009.01)
*H04W 84/12* (2009.01)

(52) U.S. Cl.
CPC .......... *H04L 43/10* (2013.01); *H04L 43/0811* (2013.01); *H04L 43/0817* (2013.01); *H04W 24/08* (2013.01); *H04W 84/12* (2013.01)

(58) Field of Classification Search
CPC . H04L 43/10; H04L 43/0805; H04L 43/0811; H04L 43/0817; H04W 24/08;
(Continued)

(56) References Cited

U.S. PATENT DOCUMENTS

| 5,313,454 A | 5/1994 | Bustini et al. |
| 5,369,707 A | 11/1994 | Follendore, III |

(Continued)

FOREIGN PATENT DOCUMENTS

| EP | 1139198 A2 | 10/2001 |
| EP | 2113860 A1 | 11/2009 |

(Continued)

OTHER PUBLICATIONS

Gupta V., et al., "Bit-Stuffing in 802.11 Beacon Frame: Embedding Non-Standard Custom Information," International Journal of Computer Applications, Feb. 2013, vol. 63 (2), pp. 6-12.

(Continued)

*Primary Examiner* — Peter Chen
(74) *Attorney, Agent, or Firm* — Gazdzinski & Associates, PC

(57) ABSTRACT

Apparatus and methods for monitoring a wireless local area network (WLAN) to identify inoperative or degraded devices and restore network connectivity to end users. In one embodiment, the network includes one or more access points (APs) in data communication with a cable modem, which in turn communicates with managed network entities via a backhaul connection. Each AP is configured to provide connectivity to client devices, as well as monitor the operation of other network components including the cable modem, via logic indigenous to the AP, and invoke corrective action when failures or degraded performance is detected. In one variant, the logic operative to run on the AP includes both diagnostic and self-healing functionality, so as to enable at least partial automated diagnosis, localization, and recovery from faults, thereby obviating costly troubleshooting by the network operator or service personnel.

20 Claims, 25 Drawing Sheets

(58) Field of Classification Search
CPC .............. H04W 84/045; H04W 92/12; H04W 36/0055; H04W 36/0066; H04W 36/14; H04W 48/18
See application file for complete search history.

(56) References Cited

U.S. PATENT DOCUMENTS

| | | | |
|---|---|---|---|
| 5,528,284 A | 6/1996 | Iwami et al. |
| 5,577,209 A | 11/1996 | Boyle et al. |
| 5,708,961 A | 1/1998 | Hylton et al. |
| 5,715,403 A | 2/1998 | Stefik |
| 5,774,170 A | 6/1998 | Hite et al. |
| 5,787,172 A | 7/1998 | Arnold |
| 5,818,438 A | 10/1998 | Howe et al. |
| 5,828,832 A | 10/1998 | Holden et al. |
| 5,862,312 A | 1/1999 | Mann et al. |
| 5,870,474 A | 2/1999 | Wasilewski et al. |
| 5,878,324 A | 3/1999 | Borth et al. |
| 5,897,635 A | 4/1999 | Torres et al. |
| 5,926,205 A | 7/1999 | Krause et al. |
| 5,935,206 A | 8/1999 | Dixon et al. |
| 5,982,412 A | 11/1999 | Nulty |
| 6,002,393 A | 12/1999 | Hite et al. |
| 6,009,103 A | 12/1999 | Woundy |
| 6,092,178 A | 7/2000 | Jindal et al. |
| 6,128,316 A | 10/2000 | Takeda et al. |
| 6,134,532 A | 10/2000 | Lazarus et al. |
| 6,148,400 A | 11/2000 | Arnold |
| 6,154,844 A | 11/2000 | Touboul et al. |
| 6,157,719 A | 12/2000 | Wasilewski et al. |
| 6,167,432 A | 12/2000 | Jiang |
| 6,167,521 A | 12/2000 | Smith et al. |
| 6,169,728 B1 | 1/2001 | Perreault et al. |
| 6,181,697 B1 | 1/2001 | Nurenberg et al. |
| 6,211,901 B1 | 4/2001 | Imajima et al. |
| 6,212,636 B1 | 4/2001 | Boyle et al. |
| 6,219,710 B1 | 4/2001 | Gray et al. |
| 6,219,840 B1 | 4/2001 | Corrigan et al. |
| 6,233,341 B1 | 5/2001 | Riggins |
| 6,233,687 B1 | 5/2001 | White |
| 6,240,553 B1 | 5/2001 | Son et al. |
| 6,249,680 B1 | 6/2001 | Wax et al. |
| 6,256,393 B1 | 7/2001 | Safadi et al. |
| 6,259,701 B1 | 7/2001 | Shur et al. |
| 6,266,421 B1 | 7/2001 | Domyo et al. |
| 6,330,609 B1 | 12/2001 | Garofalakis et al. |
| 6,353,626 B1 | 3/2002 | Sunay et al. |
| 6,378,130 B1 | 4/2002 | Adams |
| 6,434,141 B1 | 8/2002 | Oz et al. |
| 6,456,716 B1 | 9/2002 | Arnold |
| 6,463,585 B1 | 10/2002 | Hendricks et al. |
| 6,498,783 B1 | 12/2002 | Lin |
| 6,519,062 B1 | 2/2003 | Yoo |
| 6,523,696 B1 | 2/2003 | Saito et al. |
| 6,590,865 B1 | 7/2003 | Ibaraki et al. |
| 6,601,171 B1 | 7/2003 | Carter et al. |
| 6,640,145 B2 | 10/2003 | Hoffberg et al. |
| 6,657,991 B1 | 12/2003 | Akgun et al. |
| 6,687,735 B1 | 2/2004 | Logston et al. |
| 6,694,145 B2 | 2/2004 | Riikonen et al. |
| 6,711,148 B1 | 3/2004 | Hills |
| 6,718,551 B1 | 4/2004 | Swix et al. |
| 6,738,978 B1 | 5/2004 | Hendricks et al. |
| 6,742,116 B1 | 5/2004 | Matsui et al. |
| 6,760,768 B2 | 7/2004 | Holden et al. |
| 6,763,391 B1 | 7/2004 | Ludtke |
| 6,782,550 B1 | 8/2004 | Cao |
| 6,785,810 B1 | 8/2004 | Lirov et al. |
| 6,788,676 B2 | 9/2004 | Partanen et al. |
| 6,799,047 B1 | 9/2004 | Bahl et al. |
| 6,807,573 B2 | 10/2004 | Saito et al. |
| 6,813,505 B2 | 11/2004 | Walley et al. |
| 6,842,783 B1 | 1/2005 | Boivie et al. |
| 6,859,535 B1 | 2/2005 | Tatebayashi et al. |
| 6,891,841 B2 | 5/2005 | Leatherbury et al. |
| 6,898,708 B2 | 5/2005 | Hori et al. |
| 6,910,064 B1 | 6/2005 | Astarabadi et al. |
| 6,925,257 B2 | 8/2005 | Yoo |
| 6,944,150 B1 | 9/2005 | McConnell et al. |
| 6,948,183 B1 | 9/2005 | Peterka |
| 6,954,632 B2 | 10/2005 | Kobayashi |
| 6,957,261 B2 | 10/2005 | Lortz |
| 6,957,328 B2 | 10/2005 | Goodman et al. |
| 6,973,576 B2 | 12/2005 | Giobbi |
| 6,975,730 B1 | 12/2005 | Kuroiwa et al. |
| 6,985,355 B2 | 1/2006 | Allirot |
| 6,986,156 B1 | 1/2006 | Rodriguez et al. |
| 6,996,544 B2 | 2/2006 | Sellars et al. |
| 7,006,881 B1 | 2/2006 | Hoffberg et al. |
| 7,007,170 B2 | 2/2006 | Morten |
| 7,009,972 B2 | 3/2006 | Maher et al. |
| 7,016,963 B1 | 3/2006 | Judd et al. |
| 7,017,189 B1 | 3/2006 | Demello et al. |
| 7,027,460 B2 | 4/2006 | Iyer et al. |
| 7,039,048 B1 | 5/2006 | Monta et al. |
| 7,054,443 B1 | 5/2006 | Jakubowski et al. |
| 7,054,902 B2 | 5/2006 | Toporek et al. |
| 7,055,040 B2 | 5/2006 | Klemba et al. |
| 7,065,216 B1 | 6/2006 | Benaloh et al. |
| 7,068,639 B1 | 6/2006 | Varma et al. |
| 7,069,449 B2 | 6/2006 | Weaver et al. |
| 7,069,573 B1 | 6/2006 | Brooks et al. |
| 7,072,950 B2 | 7/2006 | Toft |
| 7,073,199 B1 | 7/2006 | Raley |
| 7,075,945 B2 | 7/2006 | Arsenault et al. |
| 7,086,077 B2 | 8/2006 | Giammaressi |
| 7,092,397 B1 | 8/2006 | Chandran et al. |
| 7,099,308 B2 | 8/2006 | Merrill et al. |
| 7,103,181 B2 | 9/2006 | Ananth |
| 7,106,382 B2 | 9/2006 | Shiotsu |
| 7,107,326 B1 | 9/2006 | Fijolek et al. |
| 7,143,431 B1 | 11/2006 | Eager et al. |
| 7,149,772 B1 | 12/2006 | Kalavade |
| 7,154,912 B2 | 12/2006 | Chong et al. |
| 7,165,268 B1 | 1/2007 | Moore et al. |
| 7,174,126 B2 | 2/2007 | McElhatten et al. |
| 7,174,127 B2 | 2/2007 | Otten et al. |
| 7,174,371 B2 | 2/2007 | Elo et al. |
| 7,174,385 B2 | 2/2007 | Li |
| 7,194,756 B2 | 3/2007 | Addington et al. |
| 7,209,458 B2 | 4/2007 | Ahvonen et al. |
| 7,225,333 B2 | 5/2007 | Peinado et al. |
| 7,228,427 B2 | 6/2007 | Fransdonk |
| 7,228,555 B2 | 6/2007 | Schlack |
| 7,237,112 B1 | 6/2007 | Ishiguro et al. |
| 7,242,960 B2 | 7/2007 | Van Rooyen et al. |
| 7,248,694 B2 | 7/2007 | Husemann et al. |
| 7,254,608 B2 | 8/2007 | Yeager et al. |
| 7,257,227 B2 | 8/2007 | Chen et al. |
| 7,266,726 B1 | 9/2007 | Ladd et al. |
| 7,289,534 B1 | 10/2007 | Bailey et al. |
| 7,299,502 B2 | 11/2007 | Schmeling et al. |
| 7,305,460 B2 | 12/2007 | Park |
| 7,308,415 B2 | 12/2007 | Kimbrel et al. |
| 7,313,611 B1 | 12/2007 | Jacobs et al. |
| 7,324,531 B2 | 1/2008 | Cho |
| 7,325,073 B2 | 1/2008 | Shao et al. |
| 7,330,483 B1 | 2/2008 | Peters, Jr. et al. |
| 7,330,967 B1 | 2/2008 | Pujare et al. |
| 7,334,044 B1 | 2/2008 | Allen |
| 7,340,759 B1 | 3/2008 | Rodriguez |
| 7,346,688 B2 | 3/2008 | Allen et al. |
| 7,353,543 B2 | 4/2008 | Ohmori et al. |
| 7,363,371 B2 | 4/2008 | Kirkby et al. |
| 7,373,506 B2 | 5/2008 | Asano et al. |
| 7,376,386 B2 | 5/2008 | Phillips et al. |
| 7,376,976 B2 | 5/2008 | Fierstein et al. |
| 7,379,494 B2 | 5/2008 | Raleigh et al. |
| 7,409,546 B2 | 8/2008 | Platt |
| 7,457,520 B2 | 11/2008 | Rossetti et al. |
| 7,464,179 B2 | 12/2008 | Hodges et al. |
| 7,472,280 B2 | 12/2008 | Giobbi |
| 7,486,869 B2 | 2/2009 | Alexander et al. |
| 7,487,363 B2 | 2/2009 | Alve et al. |

(56) References Cited

U.S. PATENT DOCUMENTS

| | | |
|---|---|---|
| 7,506,367 B1 | 3/2009 | Ishibashi |
| 7,567,565 B2 | 7/2009 | La |
| 7,577,118 B2 | 8/2009 | Haumonte et al. |
| 7,592,912 B2 | 9/2009 | Hasek et al. |
| 7,602,820 B2 | 10/2009 | Helms et al. |
| 7,673,004 B1 | 3/2010 | Sherstinsky et al. |
| 7,690,020 B2 | 3/2010 | Lebar |
| 7,693,171 B2 | 4/2010 | Gould |
| 7,707,644 B2 | 4/2010 | Choi et al. |
| 7,721,314 B2 | 5/2010 | Sincaglia et al. |
| 7,730,321 B2 | 6/2010 | Gasparini et al. |
| 7,742,074 B2 | 6/2010 | Minatogawa |
| 7,752,617 B2 | 7/2010 | Blinick et al. |
| 7,757,101 B2 | 7/2010 | Nonaka et al. |
| 7,783,891 B2 | 8/2010 | Perlin et al. |
| 7,809,942 B2 | 10/2010 | Baran et al. |
| 7,860,507 B2 | 12/2010 | Kalika et al. |
| 7,865,440 B2 | 1/2011 | Jaquette |
| 7,870,599 B2 | 1/2011 | Pemmaraju |
| 7,925,592 B1 | 4/2011 | Issa et al. |
| 7,930,558 B2 | 4/2011 | Hori |
| 7,930,715 B2 | 4/2011 | Hendricks et al. |
| 7,954,131 B2 | 5/2011 | Cholas et al. |
| 7,983,418 B2 | 7/2011 | Oyama et al. |
| 8,041,785 B2 | 10/2011 | Mazur et al. |
| 8,084,792 B2 | 12/2011 | Lehmann et al. |
| 8,166,508 B2 | 4/2012 | Mitsuji et al. |
| 8,181,262 B2 | 5/2012 | Cooper et al. |
| 8,234,387 B2 | 7/2012 | Bradley et al. |
| 8,280,982 B2 | 10/2012 | La Joie et al. |
| 8,306,634 B2 | 11/2012 | Nguyen et al. |
| 8,332,370 B2 | 12/2012 | Gattegno et al. |
| 8,341,242 B2 | 12/2012 | Dillon et al. |
| 8,442,265 B1 | 5/2013 | Bosworth et al. |
| 8,583,484 B1 | 11/2013 | Chalawsky et al. |
| 8,713,623 B2 | 4/2014 | Brooks |
| 8,862,155 B2 | 10/2014 | Stern et al. |
| 8,866,911 B1 | 10/2014 | Sivertsen |
| 8,898,270 B1 | 11/2014 | Stack et al. |
| 9,003,436 B2 | 4/2015 | Tidwell et al. |
| 9,027,062 B2 | 5/2015 | Patel et al. |
| 9,071,859 B2 | 6/2015 | Lajoie |
| 9,215,423 B2 | 12/2015 | Kimble et al. |
| 9,300,919 B2 | 3/2016 | Cholas et al. |
| 9,918,345 B2 | 3/2018 | Gunasekara et al. |
| 2001/0004768 A1 | 6/2001 | Hodge et al. |
| 2001/0014946 A1 | 8/2001 | Ichinoi et al. |
| 2001/0019614 A1 | 9/2001 | Madoukh et al. |
| 2001/0029581 A1 | 10/2001 | Knauft |
| 2001/0030785 A1 | 10/2001 | Pangrac et al. |
| 2001/0053223 A1 | 12/2001 | Ishibashi et al. |
| 2001/0053226 A1 | 12/2001 | Akins et al. |
| 2001/0056541 A1 | 12/2001 | Matsuzaki et al. |
| 2002/0013772 A1 | 1/2002 | Peinado |
| 2002/0026575 A1 | 2/2002 | Wheeler et al. |
| 2002/0027883 A1 | 3/2002 | Belaiche |
| 2002/0032754 A1 | 3/2002 | Logston et al. |
| 2002/0049902 A1 | 4/2002 | Rhodes |
| 2002/0054589 A1 | 5/2002 | Ethridge et al. |
| 2002/0055978 A1 | 5/2002 | Joon-Bo et al. |
| 2002/0056125 A1 | 5/2002 | Hodge et al. |
| 2002/0059619 A1 | 5/2002 | Lebar |
| 2002/0062440 A1 | 5/2002 | Akama |
| 2002/0063621 A1 | 5/2002 | Tseng et al. |
| 2002/0066033 A1 | 5/2002 | Dobbins et al. |
| 2002/0077984 A1 | 6/2002 | Ireton |
| 2002/0087976 A1 | 7/2002 | Kaplan et al. |
| 2002/0123928 A1 | 9/2002 | Eldering et al. |
| 2002/0126654 A1 | 9/2002 | Preston et al. |
| 2002/0129358 A1 | 9/2002 | Buehl et al. |
| 2002/0129378 A1 | 9/2002 | Cloonan et al. |
| 2002/0147771 A1 | 10/2002 | Traversat et al. |
| 2002/0152299 A1 | 10/2002 | Traversat et al. |
| 2002/0152393 A1 | 10/2002 | Thoma et al. |
| 2002/0183985 A1 | 12/2002 | Hori et al. |
| 2002/0188744 A1 | 12/2002 | Mani |
| 2002/0188869 A1 | 12/2002 | Patrick |
| 2002/0199105 A1 | 12/2002 | Ishiguro et al. |
| 2003/0002862 A1 | 1/2003 | Rodriguez et al. |
| 2003/0005453 A1 | 1/2003 | Rodriguez et al. |
| 2003/0007516 A1 | 1/2003 | Abramov et al. |
| 2003/0009681 A1 | 1/2003 | Harada et al. |
| 2003/0021421 A1 | 1/2003 | Yokota et al. |
| 2003/0041336 A1 | 2/2003 | Del et al. |
| 2003/0046560 A1 | 3/2003 | Inomata et al. |
| 2003/0046704 A1 | 3/2003 | Laksono et al. |
| 2003/0048380 A1 | 3/2003 | Tamura |
| 2003/0056217 A1 | 3/2003 | Brooks |
| 2003/0061619 A1 | 3/2003 | Giammaressi |
| 2003/0069965 A1 | 4/2003 | Ma et al. |
| 2003/0071117 A1 | 4/2003 | Meade |
| 2003/0074571 A1 | 4/2003 | Fujiwara et al. |
| 2003/0084003 A1 | 5/2003 | Pinkas et al. |
| 2003/0097340 A1 | 5/2003 | Okamoto et al. |
| 2003/0099212 A1 | 5/2003 | Anjum et al. |
| 2003/0114162 A1 | 6/2003 | Chheda et al. |
| 2003/0115267 A1 | 6/2003 | Hinton et al. |
| 2003/0139980 A1 | 7/2003 | Hamilton |
| 2003/0140227 A1 | 7/2003 | Asano et al. |
| 2003/0163697 A1 | 8/2003 | Pabla et al. |
| 2003/0163739 A1 | 8/2003 | Armington et al. |
| 2003/0165241 A1 | 9/2003 | Fransdonk |
| 2003/0166401 A1 | 9/2003 | Combes et al. |
| 2003/0174838 A1 | 9/2003 | Bremer |
| 2003/0179773 A1 | 9/2003 | Mocek et al. |
| 2003/0187799 A1 | 10/2003 | Sellars et al. |
| 2003/0205763 A1 | 11/2003 | Park et al. |
| 2003/0208763 A1 | 11/2003 | McElhatten et al. |
| 2003/0208767 A1 | 11/2003 | Williamson et al. |
| 2003/0217137 A1 | 11/2003 | Roese et al. |
| 2003/0217365 A1 | 11/2003 | Caputo |
| 2004/0019691 A1 | 1/2004 | Daymond et al. |
| 2004/0024688 A1 | 2/2004 | Bi et al. |
| 2004/0034877 A1 | 2/2004 | Nogues |
| 2004/0045032 A1 | 3/2004 | Cummings et al. |
| 2004/0045035 A1 | 3/2004 | Cummings et al. |
| 2004/0045037 A1 | 3/2004 | Cummings et al. |
| 2004/0078602 A1 | 4/2004 | Rothbarth et al. |
| 2004/0088558 A1 | 5/2004 | Candelore |
| 2004/0106403 A1 | 6/2004 | Mori et al. |
| 2004/0109569 A1 | 6/2004 | Ellison et al. |
| 2004/0117836 A1 | 6/2004 | Karaoguz et al. |
| 2004/0123129 A1 | 6/2004 | Ginter et al. |
| 2004/0128499 A1 | 7/2004 | Peterka et al. |
| 2004/0133907 A1 | 7/2004 | Rodriguez et al. |
| 2004/0133923 A1 | 7/2004 | Watson et al. |
| 2004/0137918 A1 | 7/2004 | Varonen et al. |
| 2004/0146006 A1 | 7/2004 | Jackson |
| 2004/0181800 A1 | 9/2004 | Rakib et al. |
| 2004/0187159 A1 | 9/2004 | Gaydos et al. |
| 2004/0193609 A1 | 9/2004 | Phan et al. |
| 2004/0193680 A1 | 9/2004 | Gibbs et al. |
| 2004/0224425 A1 | 11/2004 | Gjerde et al. |
| 2004/0240478 A1 | 12/2004 | Goren et al. |
| 2004/0250273 A1 | 12/2004 | Swix et al. |
| 2004/0260798 A1 | 12/2004 | Addington et al. |
| 2004/0261093 A1 | 12/2004 | Rebaud et al. |
| 2004/0268386 A1 | 12/2004 | Logan et al. |
| 2005/0005287 A1 | 1/2005 | Claussen |
| 2005/0007278 A1 | 1/2005 | Anson et al. |
| 2005/0015810 A1 | 1/2005 | Gould et al. |
| 2005/0021985 A1 | 1/2005 | Ono et al. |
| 2005/0022227 A1 | 1/2005 | Shen et al. |
| 2005/0034171 A1 | 2/2005 | Benya |
| 2005/0039205 A1 | 2/2005 | Riedl |
| 2005/0039212 A1 | 2/2005 | Baran et al. |
| 2005/0049886 A1 | 3/2005 | Grannan et al. |
| 2005/0055220 A1 | 3/2005 | Lee et al. |
| 2005/0060742 A1 | 3/2005 | Riedl et al. |
| 2005/0060745 A1 | 3/2005 | Riedl et al. |
| 2005/0065888 A1 | 3/2005 | Benaloh |
| 2005/0086683 A1 | 4/2005 | Meyerson |
| 2005/0086691 A1 | 4/2005 | Dudkiewicz et al. |
| 2005/0091173 A1 | 4/2005 | Alve |

(56) References Cited

U.S. PATENT DOCUMENTS

| | | |
|---|---|---|
| 2005/0097006 A1 | 5/2005 | Nyako |
| 2005/0108763 A1 | 5/2005 | Baran et al. |
| 2005/0111844 A1 | 5/2005 | Compton et al. |
| 2005/0114686 A1 | 5/2005 | Ball et al. |
| 2005/0114900 A1 | 5/2005 | Ladd et al. |
| 2005/0125832 A1 | 6/2005 | Jost et al. |
| 2005/0138357 A1 | 6/2005 | Swenson et al. |
| 2005/0168323 A1 | 8/2005 | Lenoir et al. |
| 2005/0169468 A1 | 8/2005 | Fahrny et al. |
| 2005/0172127 A1 | 8/2005 | Hartung et al. |
| 2005/0176444 A1 | 8/2005 | Tanaka |
| 2005/0177740 A1 | 8/2005 | Athaide et al. |
| 2005/0177741 A1 | 8/2005 | Chen et al. |
| 2005/0177855 A1 | 8/2005 | Maynard et al. |
| 2005/0182931 A1 | 8/2005 | Robert et al. |
| 2005/0188210 A1 | 8/2005 | Perlin et al. |
| 2005/0190912 A1 | 9/2005 | Hopkins et al. |
| 2005/0195975 A1 | 9/2005 | Kawakita |
| 2005/0198693 A1 | 9/2005 | Choi et al. |
| 2005/0268107 A1 | 12/2005 | Harris et al. |
| 2005/0273629 A1 | 12/2005 | Abrams et al. |
| 2005/0278259 A1 | 12/2005 | Gunaseelan et al. |
| 2005/0289618 A1 | 12/2005 | Hardin |
| 2005/0289619 A1 | 12/2005 | Melby |
| 2006/0002551 A1 | 1/2006 | Brown et al. |
| 2006/0004662 A1 | 1/2006 | Nadalin et al. |
| 2006/0008256 A1 | 1/2006 | Khedouri et al. |
| 2006/0020786 A1 | 1/2006 | Helms et al. |
| 2006/0020950 A1 | 1/2006 | Ladd et al. |
| 2006/0021004 A1 | 1/2006 | Moran et al. |
| 2006/0036750 A1 | 2/2006 | Ladd et al. |
| 2006/0041903 A1 | 2/2006 | Kahn et al. |
| 2006/0047801 A1 | 3/2006 | Haag et al. |
| 2006/0047957 A1 | 3/2006 | Helms et al. |
| 2006/0064583 A1 | 3/2006 | Birnbaum et al. |
| 2006/0095940 A1 | 5/2006 | Yearwood |
| 2006/0130099 A1 | 6/2006 | Rooyen |
| 2006/0130107 A1 | 6/2006 | Gonder et al. |
| 2006/0130113 A1 | 6/2006 | Carlucci et al. |
| 2006/0136964 A1 | 6/2006 | Diez et al. |
| 2006/0137005 A1 | 6/2006 | Park |
| 2006/0137015 A1 | 6/2006 | Fahrny et al. |
| 2006/0148362 A1 | 7/2006 | Bridges |
| 2006/0149850 A1 | 7/2006 | Bowman |
| 2006/0154674 A1 | 7/2006 | Landschaft et al. |
| 2006/0161635 A1 | 7/2006 | Lamkin et al. |
| 2006/0165090 A1 | 7/2006 | Kalliola et al. |
| 2006/0165197 A1 | 7/2006 | Morita et al. |
| 2006/0168219 A1 | 7/2006 | Ahluwalia et al. |
| 2006/0171390 A1 | 8/2006 | La |
| 2006/0171423 A1 | 8/2006 | Helms et al. |
| 2006/0179138 A1 | 8/2006 | Van et al. |
| 2006/0184972 A1 | 8/2006 | Rafey et al. |
| 2006/0187900 A1 | 8/2006 | Akbar |
| 2006/0200856 A1 | 9/2006 | Salowey et al. |
| 2006/0206712 A1 | 9/2006 | Dillaway et al. |
| 2006/0209799 A1 | 9/2006 | Gallagher et al. |
| 2006/0212400 A1 | 9/2006 | Kamperman et al. |
| 2006/0218604 A1 | 9/2006 | Riedl et al. |
| 2006/0218632 A1 | 9/2006 | Corley et al. |
| 2006/0236131 A1 | 10/2006 | Vauclair |
| 2006/0248553 A1 | 11/2006 | Mikkelson et al. |
| 2006/0248555 A1 | 11/2006 | Eldering |
| 2006/0253328 A1 | 11/2006 | Kohli et al. |
| 2006/0253864 A1 | 11/2006 | Easty |
| 2006/0259927 A1 | 11/2006 | Acharya et al. |
| 2006/0277569 A1 | 12/2006 | Smith |
| 2006/0291506 A1 | 12/2006 | Cain |
| 2007/0011335 A1 | 1/2007 | Burns et al. |
| 2007/0019645 A1 | 1/2007 | Menon |
| 2007/0022459 A1 | 1/2007 | Gaebel et al. |
| 2007/0022469 A1 | 1/2007 | Cooper et al. |
| 2007/0033531 A1 | 2/2007 | Marsh |
| 2007/0046791 A1 | 3/2007 | Wang et al. |
| 2007/0049245 A1 | 3/2007 | Lipman |
| 2007/0067851 A1 | 3/2007 | Fernando et al. |
| 2007/0076728 A1 | 4/2007 | Rieger et al. |
| 2007/0079381 A1 | 4/2007 | Hartung et al. |
| 2007/0089127 A1 | 4/2007 | Flickinger et al. |
| 2007/0094691 A1 | 4/2007 | Gazdzinski |
| 2007/0098178 A1 | 5/2007 | Raikar |
| 2007/0113243 A1 | 5/2007 | Brey |
| 2007/0115900 A1 | 5/2007 | Liang et al. |
| 2007/0121678 A1 | 5/2007 | Brooks et al. |
| 2007/0124488 A1 | 5/2007 | Baum et al. |
| 2007/0157295 A1 | 7/2007 | Mangalore et al. |
| 2007/0174888 A1 | 7/2007 | Rubinstein |
| 2007/0192615 A1 | 8/2007 | Varghese et al. |
| 2007/0195727 A1 | 8/2007 | Kinder et al. |
| 2007/0204314 A1 | 8/2007 | Hasek et al. |
| 2007/0206799 A1 | 9/2007 | Wingert et al. |
| 2007/0209059 A1 | 9/2007 | Moore et al. |
| 2007/0217436 A1 | 9/2007 | Markley et al. |
| 2007/0219910 A1 | 9/2007 | Martinez |
| 2007/0220024 A1 | 9/2007 | Putterman et al. |
| 2007/0233857 A1 | 10/2007 | Cheng et al. |
| 2007/0250872 A1 | 10/2007 | Dua |
| 2007/0250880 A1 | 10/2007 | Hainline |
| 2007/0261116 A1 | 11/2007 | Prafullchandra et al. |
| 2007/0266395 A1 | 11/2007 | Lee et al. |
| 2007/0276925 A1 | 11/2007 | La et al. |
| 2007/0276926 A1 | 11/2007 | Lajoie et al. |
| 2007/0294178 A1 | 12/2007 | Pinder et al. |
| 2008/0008321 A1 | 1/2008 | Gagnon et al. |
| 2008/0008371 A1 | 1/2008 | Woods et al. |
| 2008/0021836 A1 | 1/2008 | Lao |
| 2008/0022012 A1 | 1/2008 | Wang |
| 2008/0037493 A1 | 2/2008 | Morton |
| 2008/0059804 A1 | 3/2008 | Shah et al. |
| 2008/0066112 A1 | 3/2008 | Bailey et al. |
| 2008/0091805 A1 | 4/2008 | Malaby et al. |
| 2008/0091807 A1 | 4/2008 | Strub et al. |
| 2008/0098212 A1 | 4/2008 | Helms et al. |
| 2008/0101460 A1 | 5/2008 | Rodriguez |
| 2008/0103976 A1 | 5/2008 | Read et al. |
| 2008/0103977 A1 | 5/2008 | Khosravy et al. |
| 2008/0104634 A1 | 5/2008 | Gajdos et al. |
| 2008/0109307 A1 | 5/2008 | Ullah |
| 2008/0112405 A1 | 5/2008 | Cholas et al. |
| 2008/0117920 A1 | 5/2008 | Tucker |
| 2008/0123862 A1 | 5/2008 | Rowley |
| 2008/0133551 A1 | 6/2008 | Wensley et al. |
| 2008/0134274 A1 | 6/2008 | Derrenberger et al. |
| 2008/0141317 A1 | 6/2008 | Radloff et al. |
| 2008/0141353 A1 | 6/2008 | Brown |
| 2008/0148362 A1 | 6/2008 | Gilder et al. |
| 2008/0155059 A1 | 6/2008 | Hardin et al. |
| 2008/0155614 A1 | 6/2008 | Cooper et al. |
| 2008/0162353 A1 | 7/2008 | Tom et al. |
| 2008/0165460 A1 | 7/2008 | Whitby-Strevens |
| 2008/0177998 A1 | 7/2008 | Apsangi et al. |
| 2008/0182591 A1 | 7/2008 | Krikorian |
| 2008/0183705 A1 | 7/2008 | Shivaji-Rao et al. |
| 2008/0192820 A1 | 8/2008 | Brooks et al. |
| 2008/0212945 A1 | 9/2008 | Khedouri et al. |
| 2008/0222684 A1 | 9/2008 | Mukraj et al. |
| 2008/0229354 A1 | 9/2008 | Morris et al. |
| 2008/0235746 A1 | 9/2008 | Peters et al. |
| 2008/0244667 A1 | 10/2008 | Osborne |
| 2008/0256510 A1 | 10/2008 | Auerbach |
| 2008/0270307 A1 | 10/2008 | Olson et al. |
| 2008/0273591 A1 | 11/2008 | Brooks et al. |
| 2008/0282299 A1 | 11/2008 | Koat et al. |
| 2008/0288618 A1 | 11/2008 | Vardi et al. |
| 2009/0007234 A1 | 1/2009 | Birger et al. |
| 2009/0013210 A1* | 1/2009 | McIntosh ............ H04L 41/0672 714/4.1 |
| 2009/0025027 A1 | 1/2009 | Craner |
| 2009/0025075 A1 | 1/2009 | Chow et al. |
| 2009/0028182 A1 | 1/2009 | Brooks et al. |
| 2009/0031371 A1 | 1/2009 | Munsell et al. |
| 2009/0064251 A1 | 3/2009 | Savoor et al. |
| 2009/0083813 A1 | 3/2009 | Dolce et al. |
| 2009/0094648 A1 | 4/2009 | Patel et al. |

(56) References Cited

U.S. PATENT DOCUMENTS

| | | |
|---|---|---|
| 2009/0098861 A1 | 4/2009 | Kalliola et al. |
| 2009/0100459 A1 | 4/2009 | Riedl et al. |
| 2009/0102983 A1 | 4/2009 | Malone et al. |
| 2009/0119751 A1* | 5/2009 | Koga ............... H04W 12/06 726/3 |
| 2009/0125374 A1 | 5/2009 | Deaton et al. |
| 2009/0151006 A1 | 6/2009 | Saeki et al. |
| 2009/0170479 A1 | 7/2009 | Jarenskog |
| 2009/0182815 A1 | 7/2009 | Czechowski, III et al. |
| 2009/0185576 A1 | 7/2009 | Kisel et al. |
| 2009/0187939 A1 | 7/2009 | Lajoie |
| 2009/0201917 A1 | 8/2009 | Maes et al. |
| 2009/0210899 A1 | 8/2009 | Lawrence-Apfelbaum et al. |
| 2009/0210912 A1 | 8/2009 | Cholas et al. |
| 2009/0225760 A1 | 9/2009 | Foti |
| 2009/0244290 A1 | 10/2009 | McKelvey et al. |
| 2009/0265750 A1 | 10/2009 | Jones et al. |
| 2009/0282241 A1 | 11/2009 | Prafullchandra et al. |
| 2009/0282449 A1 | 11/2009 | Lee |
| 2009/0292922 A1 | 11/2009 | Park |
| 2009/0293101 A1 | 11/2009 | Carter et al. |
| 2010/0014496 A1 | 1/2010 | Kalika et al. |
| 2010/0030578 A1 | 2/2010 | Siddique et al. |
| 2010/0031299 A1 | 2/2010 | Harrang et al. |
| 2010/0042478 A1 | 2/2010 | Reisman |
| 2010/0070867 A1 | 3/2010 | Lemmers |
| 2010/0081416 A1 | 4/2010 | Cohen |
| 2010/0082983 A1 | 4/2010 | Shah et al. |
| 2010/0083329 A1 | 4/2010 | Joyce et al. |
| 2010/0088236 A1 | 4/2010 | Karabulut et al. |
| 2010/0088292 A1 | 4/2010 | Tirpak et al. |
| 2010/0106846 A1 | 4/2010 | Noldus et al. |
| 2010/0122288 A1 | 5/2010 | Minter et al. |
| 2010/0131973 A1 | 5/2010 | Dillon et al. |
| 2010/0138900 A1 | 6/2010 | Peterka et al. |
| 2010/0150027 A1 | 6/2010 | Atwal et al. |
| 2010/0151816 A1 | 6/2010 | Besehanic et al. |
| 2010/0159951 A1 | 6/2010 | Shkedi |
| 2010/0167743 A1 | 7/2010 | Palanki et al. |
| 2010/0169977 A1 | 7/2010 | Dasher et al. |
| 2010/0185855 A1 | 7/2010 | Margolus et al. |
| 2010/0198888 A1 | 8/2010 | Blomstedt et al. |
| 2010/0217837 A1 | 8/2010 | Ansari et al. |
| 2010/0251305 A1 | 9/2010 | Kimble et al. |
| 2010/0287609 A1 | 11/2010 | Gonzalez et al. |
| 2010/0309051 A1 | 12/2010 | Moshfeghi |
| 2010/0312826 A1 | 12/2010 | Sarosi et al. |
| 2010/0313225 A1 | 12/2010 | Cholas et al. |
| 2010/0313226 A1 | 12/2010 | Cholas et al. |
| 2011/0015989 A1 | 1/2011 | Tidwell et al. |
| 2011/0071841 A1 | 3/2011 | Fomenko et al. |
| 2011/0078721 A1 | 3/2011 | Wang et al. |
| 2011/0093900 A1 | 4/2011 | Patel et al. |
| 2011/0103374 A1 | 5/2011 | Lajoie et al. |
| 2011/0107389 A1 | 5/2011 | Chakarapani |
| 2011/0112717 A1 | 5/2011 | Resner |
| 2011/0138064 A1 | 6/2011 | Rieger et al. |
| 2011/0163888 A1 | 7/2011 | Goedde |
| 2011/0164753 A1 | 7/2011 | Dubhashi et al. |
| 2011/0167440 A1 | 7/2011 | Greenfield |
| 2011/0169977 A1 | 7/2011 | Masuda |
| 2011/0197070 A1 | 8/2011 | Mizrah |
| 2011/0206136 A1 | 8/2011 | Bekedam et al. |
| 2011/0213688 A1 | 9/2011 | Santos et al. |
| 2011/0219229 A1 | 9/2011 | Cholas et al. |
| 2011/0225619 A1 | 9/2011 | Kesireddy et al. |
| 2011/0235577 A1 | 9/2011 | Hintermeister et al. |
| 2011/0247029 A1 | 10/2011 | Yarvis et al. |
| 2011/0252236 A1 | 10/2011 | De et al. |
| 2011/0252243 A1 | 10/2011 | Brouwer et al. |
| 2011/0286437 A1 | 11/2011 | Austin et al. |
| 2012/0008786 A1 | 1/2012 | Cronk et al. |
| 2012/0011567 A1 | 1/2012 | Cronk et al. |
| 2012/0023535 A1 | 1/2012 | Brooks et al. |
| 2012/0030716 A1 | 2/2012 | Zhang et al. |
| 2012/0046049 A1 | 2/2012 | Curtis et al. |
| 2012/0054785 A1 | 3/2012 | Yang et al. |
| 2012/0079546 A1 | 3/2012 | Kalidindi et al. |
| 2012/0115501 A1 | 5/2012 | Zheng |
| 2012/0151549 A1 | 6/2012 | Kumar et al. |
| 2012/0159603 A1 | 6/2012 | Queck |
| 2012/0167173 A1 | 6/2012 | Nadalin et al. |
| 2012/0202447 A1 | 8/2012 | Edge et al. |
| 2012/0203822 A1 | 8/2012 | Floyd et al. |
| 2012/0222081 A1 | 8/2012 | Schaefer et al. |
| 2012/0278654 A1* | 11/2012 | Shen ............... G06F 11/0793 714/23 |
| 2012/0291062 A1 | 11/2012 | Pearson et al. |
| 2012/0302259 A1 | 11/2012 | Busch |
| 2012/0330759 A1 | 12/2012 | Aggarwal et al. |
| 2013/0016648 A1 | 1/2013 | Koskela et al. |
| 2013/0045681 A1 | 2/2013 | Dua |
| 2013/0046623 A1 | 2/2013 | Moritz et al. |
| 2013/0081097 A1 | 3/2013 | Park et al. |
| 2013/0095848 A1 | 4/2013 | Gold et al. |
| 2013/0100818 A1 | 4/2013 | Qiu et al. |
| 2013/0132789 A1 | 5/2013 | Watford et al. |
| 2013/0145152 A1 | 6/2013 | Maino et al. |
| 2013/0235774 A1 | 9/2013 | Jo et al. |
| 2013/0254787 A1 | 9/2013 | Cox et al. |
| 2013/0308622 A1 | 11/2013 | Uhlik |
| 2013/0317892 A1 | 11/2013 | Heerboth et al. |
| 2013/0347089 A1 | 12/2013 | Bailey et al. |
| 2014/0010219 A1 | 1/2014 | Dor et al. |
| 2014/0046624 A1 | 2/2014 | Miettinen |
| 2014/0066098 A1 | 3/2014 | Stern et al. |
| 2014/0177611 A1 | 6/2014 | Corrales |
| 2014/0213256 A1 | 7/2014 | Meylan et al. |
| 2014/0215506 A1 | 7/2014 | Kalmes et al. |
| 2014/0242991 A1 | 8/2014 | Yanover et al. |
| 2014/0274110 A1 | 9/2014 | Mehta et al. |
| 2014/0280901 A1* | 9/2014 | Balachandran ....... H04W 24/04 709/224 |
| 2014/0281489 A1 | 9/2014 | Peterka et al. |
| 2014/0282721 A1 | 9/2014 | Kuncl et al. |
| 2014/0283137 A1 | 9/2014 | Rebaud et al. |
| 2014/0309868 A1 | 10/2014 | Ricci |
| 2014/0328257 A1 | 11/2014 | Kamlani |
| 2014/0359649 A1 | 12/2014 | Cronk et al. |
| 2015/0058883 A1 | 2/2015 | Tidwell et al. |
| 2015/0058909 A1 | 2/2015 | Miller et al. |
| 2015/0094098 A1 | 4/2015 | Stern et al. |
| 2015/0103685 A1 | 4/2015 | Butchko et al. |
| 2015/0106501 A1 | 4/2015 | Malets et al. |
| 2015/0106846 A1 | 4/2015 | Chen et al. |
| 2015/0146537 A1 | 5/2015 | Panaitopol et al. |
| 2015/0156129 A1 | 6/2015 | Tsuruoka et al. |
| 2015/0189377 A1 | 7/2015 | Wheatley et al. |
| 2015/0288617 A1 | 10/2015 | Dasher et al. |
| 2015/0288732 A1 | 10/2015 | Phillips et al. |
| 2015/0305082 A1* | 10/2015 | Elliott ............... H04W 48/20 370/329 |
| 2015/0365833 A1 | 12/2015 | Stafford et al. |
| 2016/0019103 A1 | 1/2016 | Basra |
| 2016/0066234 A1 | 3/2016 | Cho et al. |
| 2016/0127185 A1 | 5/2016 | McAllister |
| 2016/0301525 A1 | 10/2016 | Canard et al. |
| 2017/0164378 A1 | 6/2017 | Gunasekara |
| 2017/0164416 A1 | 6/2017 | Yeddala et al. |
| 2017/0223536 A1* | 8/2017 | Gupta ............... H04W 12/06 |
| 2017/0257750 A1 | 9/2017 | Gunasekara et al. |

FOREIGN PATENT DOCUMENTS

| | | |
|---|---|---|
| GB | 2381709 A | 5/2003 |
| JP | H08263440 A | 10/1996 |
| JP | 2000156676 A | 6/2000 |
| JP | 2000332746 A | 11/2000 |
| JP | 2001243707 A | 9/2001 |
| JP | 2001274786 A | 10/2001 |
| JP | 2001274788 A | 10/2001 |
| JP | 2001285821 A | 10/2001 |
| JP | 2002163396 A | 6/2002 |
| JP | 2002352094 A | 12/2002 |

(56) References Cited

FOREIGN PATENT DOCUMENTS

| | | |
|---|---|---|
| JP | 2003058657 A | 2/2003 |
| JP | 2003162600 A | 6/2003 |
| JP | 2003233690 A | 8/2003 |
| JP | 2003248508 A | 9/2003 |
| JP | 2003296484 A | 10/2003 |
| JP | 2003348508 A | 12/2003 |
| JP | 2004030111 A | 1/2004 |
| JP | 2004072721 A | 3/2004 |
| JP | 2004120736 A | 4/2004 |
| JP | 2004120738 A | 4/2004 |
| JP | 2004303111 A | 10/2004 |
| JP | 2005506627 A | 3/2005 |
| JP | 2005519365 A | 6/2005 |
| JP | 2005519501 A | 6/2005 |
| JP | 2005339093 A | 12/2005 |
| JP | 2006185473 A | 7/2006 |
| JP | 2006311267 A | 11/2006 |
| JP | 2007020144 A | 1/2007 |
| JP | 2008005047 A | 1/2008 |
| JP | 2008015936 A | 1/2008 |
| JP | 2008021293 A | 1/2008 |
| JP | 2008507905 A | 3/2008 |
| JP | 2008167018 A | 7/2008 |
| JP | 2008186272 A | 8/2008 |
| JP | 2008206039 A | 9/2008 |
| JP | 2009071786 A | 4/2009 |
| JP | 2009515238 A | 4/2009 |
| JP | 2009176060 A | 8/2009 |
| JP | 2009211632 A | 9/2009 |
| JP | 2010502109 A | 1/2010 |
| JP | 2010079902 A | 4/2010 |
| JP | 2012505436 A | 3/2012 |
| JP | 2012523614 A | 10/2012 |
| WO | WO-0103410 A1 | 1/2001 |
| WO | WO-0110125 A1 | 2/2001 |
| WO | WO-0137479 A1 | 5/2001 |
| WO | WO-0169842 A1 | 9/2001 |
| WO | WO-0177778 A2 | 10/2001 |
| WO | WO-0213032 A1 | 2/2002 |
| WO | WO-0221841 A1 | 3/2002 |
| WO | WO-0242966 A1 | 5/2002 |
| WO | WO-02080556 A1 | 10/2002 |
| WO | WO-03038704 A1 | 5/2003 |
| WO | WO-03087799 A1 | 10/2003 |
| WO | WO-03093944 A2 | 11/2003 |
| WO | WO-2004027622 A2 | 4/2004 |
| WO | WO-2005015422 A1 | 2/2005 |
| WO | WO-2006020141 A2 | 2/2006 |
| WO | WO-2008080556 A1 | 7/2008 |
| WO | WO-2009020476 A2 | 2/2009 |
| WO | WO-2012021245 A1 | 2/2012 |

OTHER PUBLICATIONS

5C Digital Transmission Content Protection White Paper, Hitachi, Ltd., et al., dated Jul. 14, 1998, 15 pages.

Cantor, et al., Assertions and Protocols for the OASIS Security Assertion Markup Language (SAML) V2.0, OASIS Standard, Mar. 15 2005. Document ID: saml-core-2.0-os (http://docs.oasis-open.org/securit/samVv2.0/saml-core-2.0-os.pdf).

Cantor, et al., Bindings for the OASIS Security Assertion Markup Language (SAML) V2.0, OASIS Standard, Mar. 2005 (http://docs.oasis-open.org/security/saml/v2.0/).

Cisco Intelligent Network Architecture for Digital Video—SCTE Cable-Tec Expo 2004 information page, Orange County Convention Center, Jun. 2004, 24 pages.

DCAS Authorized Service Domain, Version 1.2, dated Nov. 30, 2005, 54 pages.

DCAS Licensed Specification Abstracts, CableLabs Confidential Information, Jan. 12, 2006, 4 pages.

Digital Video Broadcasting (DVB); DVB SimulCrypt; Part 1: "Head-end architecture and synchronization" Technical Specification—ETSI TS 101 197 V1.2.1 (Feb. 2002), 40 pages.

DVB (Digital Video Broadcasting), DVB Document A045 Rev. 3, Jul. 2004, "Head-end Implementation of SimulCrypt," 289 pages.

Federal Information Processing Standards Publication, US FIPS Pub 197, Nov. 26, 2001, "Advanced Encryption Standards (AES)," 47 pages.

Griffith, et al.,Resource Planning and Bandwidth Allocation in Hybrid Fiber-Coax Residential Networks, National Institute of Standards and Technology (NIST), 10 pages, no date.

High-bandwidth Digital Content Protection System, Revision 1.091, dated Apr. 22, 2003, Digital Content Protection LLC Draft, 78 pages.

Kanouff, Communications Technology: Next-Generation Bandwidth Management—The Evolution of the Anything-to-Anywhere Network, 8 pages, Apr. 1, 2004.

Marusic, et al., "Share it!—Content Transfer in Home-to-Home Networks." IEEE MELECON 2004, May 12-15, 2004, Dubrovnik, Croatia.

Media Server; 1 Device Template Version 1.01 Jun. 25, 2002.

Motorola DOCSIS Cable Module DCM 2000 specifications, 4 pages, no date.

OpenCable Application Platform Specification, OCAP 2.0 Profile, OC-SP-OCAP2.0-I01-020419, Apr. 19, 2002.

OpenCable Application Platform Specifications, OCAP Extensions, OC-SP-OCAP—HNEXT-I03-080418, 2005-2008.

OpenCable Host Device, Core Functional Requirements, OC-SP-HOST-CFR-I13-030707, Jul. 7, 2003.

OpenCable, HOST-POD Interface Specification, OC-SP-HOSTPOD-IF-I13-030707, Jul. 7, 2003.

OpenCable Specification, Home Networking Protocol 2.0, OC-SP-HNP2.0-I01-08418, 2007.

OpenCable Specifications, Home Networking Security Specification, OC-SP-HN-SEC-DO1-081027, draft (Oct. 27, 2008).

OpenVision Session Resource Manager—Open Standards-Based Solution Optimizes Network Resources by Dynamically Assigning Bandwidth in the Delivery of Digital Services article, 2 pages, (copyright 2006), (http://www.imake.com/hopenvision).

OpenVision Session Resource Manager features and information, 2 pages, no date, (http://www.imake.com/hopenvision).

Primergy BX300 Switch Blade user's manual, Fujitsu Corp., Sep. 30, 2002, first edition, pp. 1 to 20.

Real System Media Commerce Suite (Technical White Paper), at http://docs.real.com/docs/drm/DRM.sub-WP1.pdf, 12 pages, Nov. 2001.

Van Moffaert, K., et al. ("Digital Rights Management: DRM is a key enabler for the future growth of the broadband access market and the telecom/networking market in general", Alcatel Telecommunications Review, Alcatel, Paris Cedex FR, Apr. 1, 2003, XP007005930ISSN; 8 pages.

Zhang, et al., A Flexible Content Protection System for Media-on-Demand, ISM China Research Lab, Proceedings of the IEEE Fourth International Symposium on Multimedia Software Engineering (MSE'02), 6 pages.

Deering et al., Internet Protocol, Version 6 (Ipv6) Specification, IETF RFC 2460 (Dec. 1998).

Internet Protocol DARPA Internet Program Protocol Specification, IETF RFC 791 (Sep. 1981).

Gomez, Conserving Transmission Power in Wireless Ad Hoc Networks, 2001, Network Protocols.

Miao , et al., "Distributed interference-aware energy-efficient power optimization," IEEE Transactions on Wireless Communications, Apr. 2011, vol. 10 (4), pp. 1323-1333.

\* cited by examiner

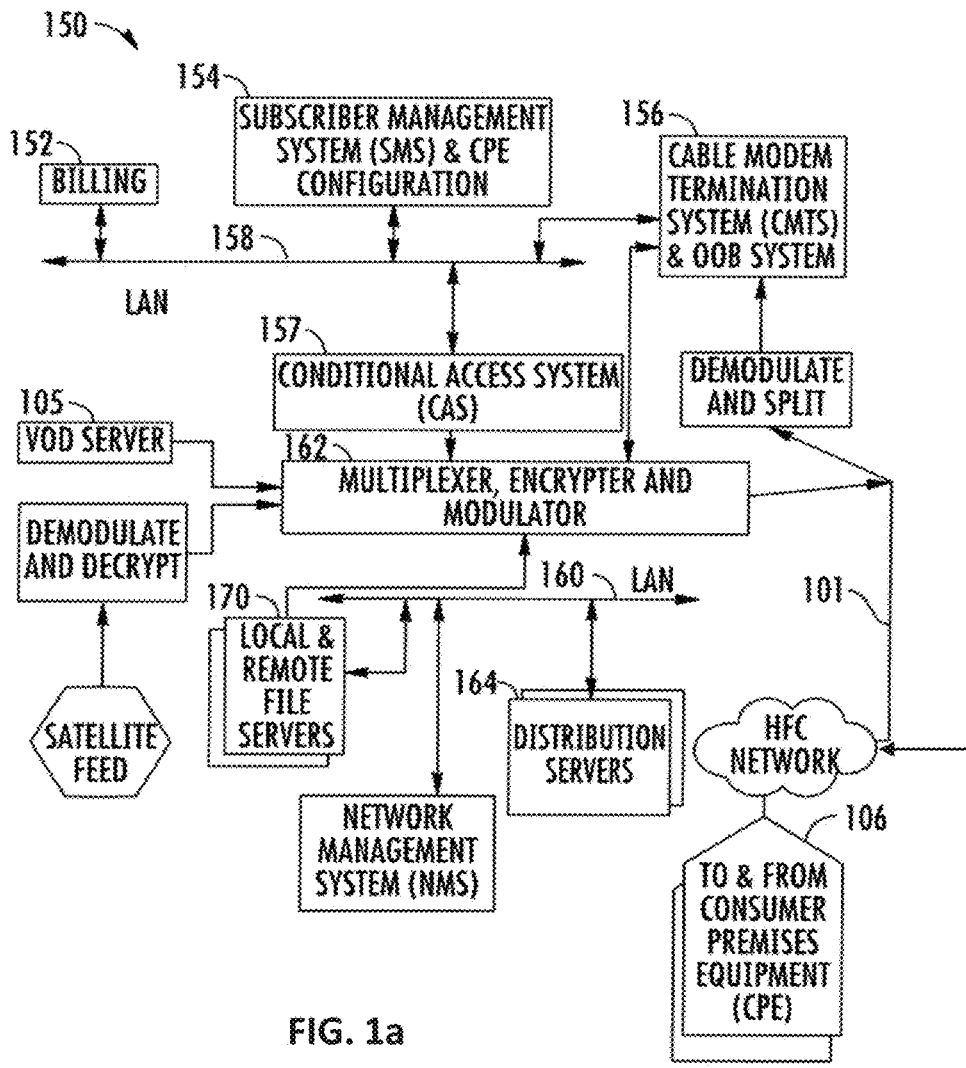
FIG. 1a
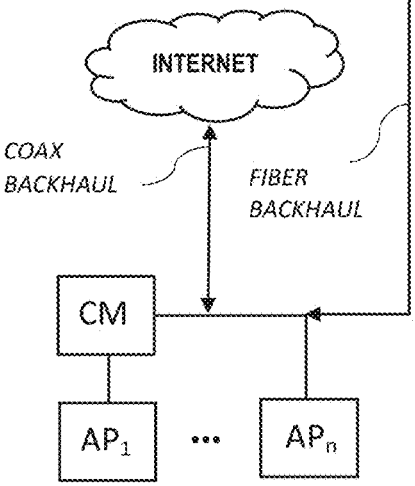

APPARATUS AND METHODS FOR MONITORING AND DIAGNOSING A WIRELESS NETWORK

RELATED APPLICATIONS

The present application is generally related to the subject matter of co-pending and co-owned U.S. patent application Ser. No. 15/063,314 filed Mar. 7, 2016 and entitled "APPARATUS AND METHODS FOR DYNAMIC OPEN-ACCESS NETWORKS", co-pending and co-owned U.S. patent application Ser. No. 15/002,232 filed Jan. 20, 2016 and entitled "APPARATUS AND METHOD FOR WIRELESS NETWORK SERVICES IN MOVING VEHICLES", co-pending and co-owned U.S. patent application Ser. No. 14/959,948 filed Dec. 4, 2015 and entitled "APPARATUS AND METHOD FOR WIRELESS NETWORK EXTENSIBILITY AND ENHANCEMENT", and co-pending and co-owned U.S. patent application Ser. No. 14/959,885 filed Dec. 4, 2015 and entitled "APPARATUS AND METHODS FOR SELECTIVE DATA NETWORK ACCESS", each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of wireless networks, and specifically in one or more embodiments, to apparatus and methods for monitoring and diagnosing or correcting (e.g., self-diagnosing or correcting) an identified device within a content distribution network that spans from an operator or distribution portion to client devices or nodes (e.g., indoors or outdoors).

2. Description of Related Technology

Wireless networking technologies enable wireless devices to connect to one another. One ubiquitous application for wireless technology is to provide network access to client devices, such as laptops, smartphones, and other wireless-enabled user devices. One such technology that enables a user to engage in wireless communication (e.g., via services provided through the cable network) is Wi-Fi® (IEEE Std. 802.11), which has become the de facto standard for wireless networking in consumer electronics. Wi-Fi enables convenient access to networks (e.g., the Internet, intranets, other interconnected devices) via at least one access point ("AP," also colloquially referred to as "hotspots") to client devices within the AP's coverage area.

Commercially, Wi-Fi provides high-value services to users within their premises, within establishments, as well as venues outside of home, including houses, apartments, offices, cafes, hotels, business centers, restaurants, etc. A typical home setup may include a client device in wireless communication with an AP and/or modem (e.g., cable modem or CM) that are in communication with the backhaul portion of a service provider network. Although the AP and the CM either stand alone or are integrated into one "box," they are often physical and logically as if they were two different entities with no awareness of each other's status.

Today, Wi-Fi has become the standard choice for providing convenient means of Internet or other network access. Much of one's work-related activities (e.g., editing documents, reading emails), means of communication (e.g., instant messaging, social networking, sharing media) and means of entertainment (e.g., videos, music, books) may be performed or enabled with remote servers that are accessible via the Internet and/or the service provider's infrastructure. For example, myriad services are available to, e.g., stream content, collaborate with remote personnel, and store files online. As a result, consumers of all demographics are becoming less dependent on local content storage and less dependent on location. Rather, most information or content desired by consumers is stored and retrieved via the Internet or other network storage (i.e., from the "cloud"), which advantageously enables client devices to be used "on the go" and placed generally within the premises as long as an AP is nearby. Consequently, consumers depend on reliable network connectivity and expect, ideally, 100% "uptime," whether they are using mobile devices or personal computers.

However, unforeseen disconnections from the network are inevitable. Any network device (including the AP) may go offline because of traffic overload, firmware update, maintenance, physical disconnection, overheating, lack of user authentication, etc. Moreover, despite simplifications and enhancements in "user experience" in networking technology over the years, many consumers are typically aware of only the basic mechanisms of connectivity, such as being generally aware that they must connect to an AP within range (e.g., by identifying the desired network based on e.g., its name and service set identifier (SSID)). When a connection goes offline, e.g., when a laptop or smartphone can no longer access the Internet, the end user may not know the cause of the disconnection, or how to diagnose it. That is to say, the user does not know whether the responsibility for the issue lies with the client device itself, one or more of several devices within the premises (e.g., modem, router, range extender, repeater, or other access points), and/or elsewhere (e.g., backhaul infrastructure of the service provider, coaxial cable or optical fiber to the premises, etc.). In fact, even the service provider or its diagnostic equipment/software may not know the origin of the problem until the issue is further investigated.

Hence, a user is typically left with few choices, such as rebooting the modem or client device (such as via unplugging and replugging the power supply), looking for obvious connection issues such as a loose connector or plug, and/or simply waiting (particularly when the consumer has no control over the hotspot). However, this does not necessarily restore the connection because the device at issue may be upstream of the premises (e.g., at the controller). Moreover, a local device (e.g., AP, CM) may be down for reasons that cannot be solved with a manually forced reboot; it may require a device-induced reboot.

Accordingly, the foregoing issues result in a frustrating experience for the end user, whose primary concern is to maintain connectivity to the wireless network and backhaul, especially when such user has no visibility into when their network service will come back online.

This problem extends not only to individual users, but establishments or enterprises as well. For example, public establishments may derive business from offering free Wi-Fi to customers. When such means for attracting and retaining potential clientele are disabled, current or future business may be affected.

Moreover, a service provider may receive calls from individual or enterprise customers alerting the provider to the disconnection, and/or requesting them to send technicians to diagnose equipment (aka a "truck roll"). However, these manual approaches require user reporting, as well as continuous investigation, searching, and monitoring of potential issues throughout the network on the part of the service provider, including the very costly aforementioned truck rolls.

To these ends, improved solutions are needed for more precise and intelligent mechanisms to identify and recover problematic devices or connections within the service provider network (including even at the customer's premises). Specifically, what are needed are methods and apparatus to automatically monitor, diagnose, and "heal" devices associated with the network (e.g., access points, cable or satellite modems, controllers), and quickly recover a specific device or connection that is responsible for the loss of service.

SUMMARY

The present disclosure addresses the foregoing needs by providing, inter alia, methods and apparatus for monitoring and self-diagnosing a wireless network.

In one aspect, wireless radio frequency access point apparatus is disclosed. In one embodiment, the apparatus includes a first radio frequency modem configured to enable wireless communication between a plurality of user devices and the wireless radio frequency access point apparatus, the first radio frequency modem configured to operate according to a first protocol and comprising: a baseband module; a resource module in data communication with the baseband module and comprising logic operative to run thereon; and a data interface in data communication with the baseband module and configured to enable data communication between the first radio frequency modem and a second modem, the second modem configured to operate according to a second protocol different than the first protocol.

In one variant, the logic is configured to selectively monitor a plurality of network entities via the second modem to evaluate an upstream connectivity status; and when the upstream connectivity status is offline, the first radio frequency modem is configured to stop transmission of a service set identifier (SSID).

In another variant, the first radio frequency modem comprises a Wireless Local Area Network (WLAN) modem having an air interface, and the second modem comprises a Data Over Cable Services Interface Specification (DOCSIS) compliant cable modem configured to transmit and receive signals over a wireline medium.

In a further variant, the plurality of network entities includes at least one cable modem in communication with the second modem, and the logic is configured to determine that the upstream connectivity status is offline when the at least one cable modem is in a reboot sequence. In one implementation, the logic is configured to determine that the upstream connectivity status is offline when the at least one cable modem has lost upstream connectivity to a service provider backbone network.

In another implementation, the logic is configured to determine that the upstream connectivity status is offline when the second modem has lost connectivity with the at least one cable modem.

In another aspect, embedded access point apparatus is disclosed. In one embodiment, the apparatus includes: a first radio frequency modem configured to enable wireless communication between a plurality of user devices and the embedded access point apparatus, the first radio frequency modem configured to operate according to a first protocol; a cable modem configured to operate according to a second protocol different than the first protocol, wherein the cable modem is configured to communicate with a cable modem termination system of a service provider backbone network; and a resource module configured to transact data between the first radio frequency modem and the cable modem and comprising logic operative to run thereon.

In one variant, the logic is configured to selectively monitor a plurality of network entities of the service provider backbone network via the cable modem to evaluate an upstream connectivity status; and when the upstream connectivity status is offline, the first radio frequency modem is configured to stop transmission of a service set identifier (SSID). In one implementation, the cable modem is further configured to cause the first radio frequency modem to stop transmission of a service set identifier (SSID) when the cable modem is in a reboot sequence.

In another implementation, the first radio frequency modem stops transmission of a service set identifier (SSID) when in a reboot sequence.

In a further implementation, the first radio frequency modem stops transmission of a service set identifier (SSID) while a configuration mismatch is present between the first radio frequency modem and the cable modem; and when the configuration mismatch is present, the resource module is further configured to initiate a self-healing process to correct the configuration mismatch. The configuration mismatch may include, for example, at least a billing code mismatch or an internet protocol (IP) address mismatch.

In another aspect, a method executed by a network device to assist in evaluating network connectivity is disclosed. In one embodiment, the method includes: transmitting a heartbeat signal to one or more network entities, the heartbeat signal causing the one or more network entities to respond when successfully received; waiting for a response to the heartbeat signal; and when a response is successfully received, repeating the transmitting the heartbeat signal and waiting.

In one variant, the method further includes, when the response is not successfully received, evaluating at least one network entity that is offline; and implementing corrective action for the at least one network entity based at least on the evaluating. In one implementation, the at least one network entity is the network device and the evaluating comprises determining whether the network device is upgrading or rebooting; and the implementing of the corrective action comprises waiting for the upgrading or rebooting to complete and thereafter self-healing the network device.

In another implementation, the self-healing further comprises one or more actions such as checking whether the network device is online; checking at least one billing code and at least one internet protocol (IP) address of the network device; resetting at least one upstream cable modem; and/or checking a controller configuration associated with an upstream controller and pinging the upstream controller.

In a further implementation, the at least one network entity is the network device and the evaluating further comprises verifying one or more controller configuration parameters when one or more end users are unable to connect to the network device despite the network device being online.

In yet another implementation, the at least one network entity is the network device, and the method further includes pinging an authorization server of the network, when multiple end users are unable to connect to the network device despite the network device being online.

In yet another implementation, the at least one network entity comprises multiple access points, and the method further comprises executing a troubleshooting process that includes at least one of: checking connectivity of one or more of the multiple access points; identifying a network entity correlated with all of the multiple access points that is likely to be defective; and identifying a network component correlated with all of the multiple access points that is likely to be defective. The identifying the network entity comprises, for example, checking one or more of a shared access point controller, a shared cable modem termination system, or checking one or more of a shared fiber, a shared switch, or a shared concentrator.

In a further aspect of the present disclosure, a method for restoring access within a wireless network is provided.

In another aspect, an apparatus configured to restore access within a wireless network is provided.

In another aspect, a non-transitory computer-readable apparatus is provided.

In a further aspect, a system for use within a wireless network is disclosed.

These and other aspects shall become apparent when considered in light of the disclosure provided herein.

BRIEF DESCRIPTION OF THE DRAWINGS

FIG. 1a is a functional block diagram illustrating one exemplary network headend configuration useful with various aspects of the present disclosure.

Figure 1:
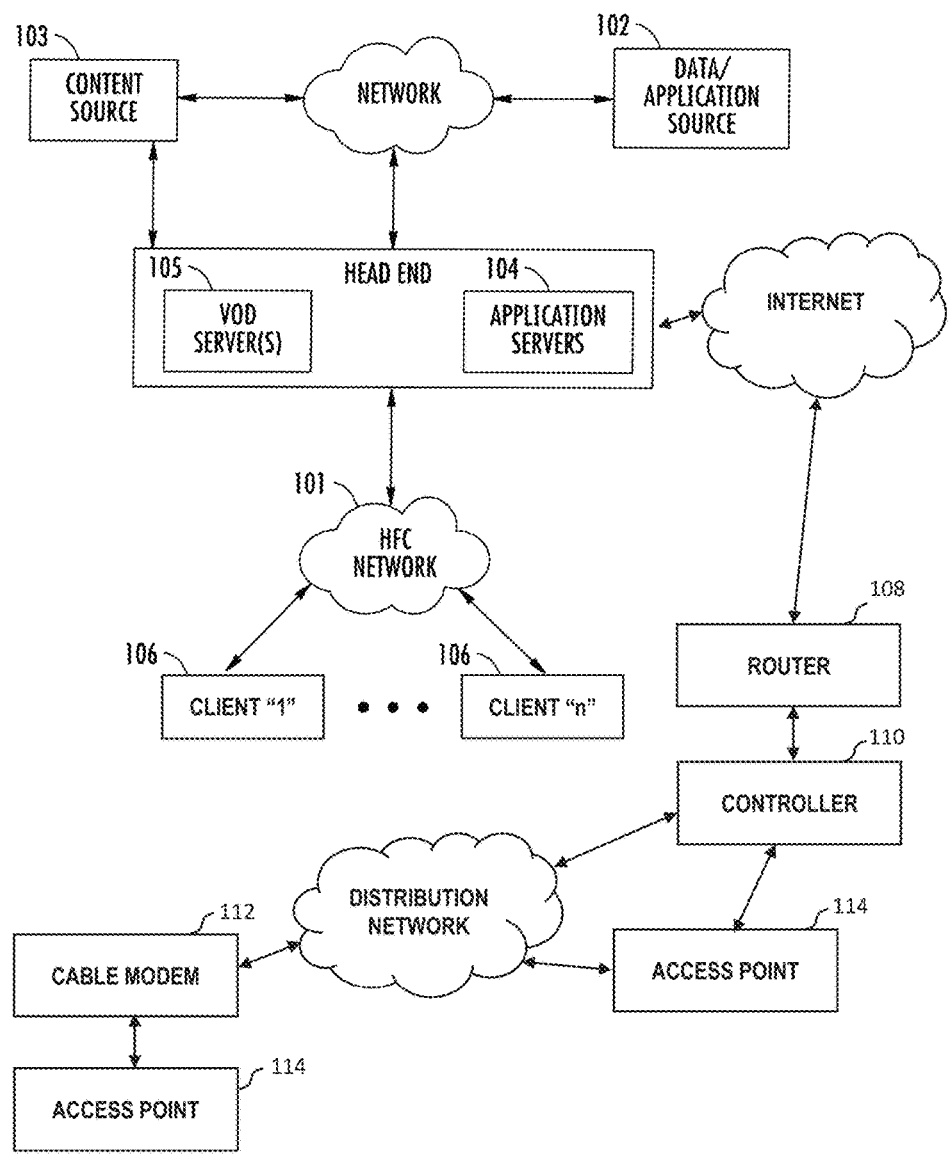
FIG. 1 is a functional block diagram illustrating an exemplary hybrid fiber network configuration useful with various aspects of the present disclosure.

All figures © Copyright 2016 Time Warner Enterprises LLC. All rights reserved.

DETAILED DESCRIPTION

Reference is now made to the drawings wherein like numerals refer to like parts throughout.

As used herein, the term "access point" refers generally and without limitation to a network node which enables communication between a user or client device and another entity within a network, such as for example a Wi-Fi AP, or a Wi-Fi-Direct enabled client or other device acting as a Group Owner (GO).

As used herein, the term "application" refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could include a downloadable Java Xlet™ that runs within the JavaTV™ environment.

As used herein, the term "client device" includes, but is not limited to, set-top boxes (e.g., DSTBs), gateways, modems, personal computers (PCs), and minicomputers, whether desktop, laptop, or otherwise, and mobile devices such as handheld computers, PDAs, personal media devices (PMDs), tablets, "phablets", smartphones, and vehicle infotainment or similar systems.

As used herein, the term "codec" refers to a video, audio, or other data coding and/or decoding algorithm, process or apparatus including, without limitation, those of the MPEG (e.g., MPEG-1, MPEG-2, MPEG-4/H.264, H.265, etc.), Real (RealVideo, etc.), AC-3 (audio), DiVX, XViD/ViDX, Windows Media Video (e.g., WMV 7, 8, 9, 10, or 11), ATI Video codec, or VC-1 (SMPTE standard 421M) families.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the term "DOCSIS" refers to any of the existing or planned variants of the Data Over Cable Services Interface Specification, including for example DOCSIS versions 1.0, 1.1, 2.0, 3.0 and 3.1.

As used herein, the term "headend" or "backend" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, over-the-top services, streaming services, and the Internet.

As used herein, the terms "heartbeat" and "heartbeat signal" refer generally and without limitation to a signal generated by hardware or software and sent to and/or acknowledged by a different network entity. Receipt and/or response to a heartbeat generally indicates normal operation (e.g., providing data communication and/or network connectivity), and may be used to synchronize multiple network devices or portions of a network. Such signals may be generated, transmitted, and received by any network entity configured to do so, from access points to headend or intermediary/local apparatus (e.g., controller apparatus), as well as between clients in a network (e.g., two clients in an ad hoc Wi-Fi network at a premises). Heartbeats may also be e.g., "one way" (i.e., a device is programmed to issue heartbeat signals according to a prescribed scheme, and failure of a monitoring device or process to receive such signals is indicative of a potential loss of functionality), or "two way" (i.e., a monitoring device issues a "ping" or the like to invoke a response from the target device or process being monitored; failure of the monitoring device to receive the response being indicative of the potential loss of functionality).

As used herein, the terms "Internet" and "internet" are used interchangeably to refer to inter-networks including, without limitation, the Internet. Other common examples include but are not limited to: a network of external servers, "cloud" entities (such as memory or storage not local to a device, storage generally accessible at any time via a network connection, and the like), service nodes, access points, controller devices, client devices, etc.

As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), 3D memory, and PSRAM.

As used herein, the terms "microprocessor" and "processor" or "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the term "network interface" refers to any signal or data interface with a component or network including, without limitation, those of the FireWire (e.g., FW400, FW800, etc.), USB (e.g., USB 2.0, 3.0. OTG), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), LTE/LTE-A, Wi-Fi (802.11), WiMAX (802.16), Z-wave, PAN (e.g., 802.15), or power line carrier (PLC) families.

As used herein, the term "QAM" refers to modulation schemes used for sending signals over e.g., cable or other networks. Such modulation scheme might use any constellation level (e.g. QPSK, 16-QAM, 64-QAM, 256-QAM, etc.) depending on details of a network. A QAM may also refer to a physical channel modulated according to the schemes.

As used herein the terms "reboot" and "re-initialization" include, without limitation, both "soft" reboots (i.e., those targeted at reinitializing one or more host device software/firmware processes without electrical power-down), and "hard" reboots (i.e., those which may interrupt power to the host as a whole, or particular components thereof). In some cases, hard reboots are further characterized in that they require a manual intervention or trigger (e.g., a user has to physically depress a button, etc.)

As used herein, the term "server" refers to any computerized component, system or entity regardless of form which is adapted to provide data, files, applications, content, or other services to one or more other devices or entities on a computer network.

As used herein, the term "storage" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "Wi-Fi" refers to, without limitation and as applicable, any of the variants of IEEE-Std. 802.11 or related standards including 802.11 a/b/g/n/s/v/ac or 802.11-2012/2013, as well as Wi-Fi Direct (including inter alia, the "Wi-Fi Peer-to-Peer (P2P) Specification", incorporated herein by reference in its entirety).

As used herein, the term "wireless" means any wireless signal, data, communication, or other interface including without limitation Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, Zigbee®, Z-wave, narrowband/FDMA, OFDM, PCS/DCS, LTE/LTE-A, analog cellular, CDPD, satellite systems, millimeter wave or microwave systems, acoustic, and infrared (i.e., IrDA).

Overview

As noted above, a wireless local area network (WLAN) is configured to provide network connectivity (e.g., to the Internet) via a service provider network, so as to deliver data and provide access to network services to nearby client devices (smartphone, laptop, desktop, tablet, etc.) via one or more wireless access points (e.g., WLAN APs). The data may travel through multiple network entities, such as a cable modem (CM) or satellite modem, intermediary entities (e.g., data center, backhaul infrastructure), AP controller, cable modem termination system (CMTS), and other backend apparatus.

An end user utilizing the wireless network may become disconnected from the network, or experience loss of service via the network, for various reasons.

The present disclosure provides a system, apparatus and methods to facilitate detection and tracking of defective or inoperative network devices, discovery of reasons for service outages, outage durations, and service restoration status in a substantially automated fashion so as to, inter alia, enhance network and service provision reliability, avoid or minimize loss of user experience, as well as catalog and characterize various types of events so as to enable subsequent use by network personnel/processes of a "living" database of outage scenarios and types. By enhancing the capabilities for data collection, monitoring, and communication between the various customer premises entities (as well as entities of the MSO network), identification of a variety of problem or fault scenarios such as CM failure, AP failure, connection failure, continuous reboot, loss of network/IP address, and user authentication/login failures is readily performed, thereby obviating service visits, technical support calls, and other costly and time consuming activities by the network operator or its agents.

The exemplary embodiments also advantageously remove much of the burden typically placed on a service provider customer to self-diagnose or troubleshoot issues with WLAN and modem implementations; i.e., "trial and error" normally conducted even before calling technical support or requesting a service visit.

In one embodiment of the present disclosure, a customer or user premises AP is configured to monitor the network health by transmitting "heartbeat" signals directed to one or more upstream network devices. The AP expects a return signal from each of the "pinged" upstream devices. Moreover, the intelligent AP can obtain data, such as via a data push or pull from the local CM, AP controller, or other entity, relating to performance of the various components (e.g., RF upstream and downstream power levels for the CM, accessible frequency bands within the available spectrum, etc.) so as to further enable isolation of the problem(s) within the network.

Moreover, in another aspect, an "intelligent" CM configuration is disclosed, wherein the CM can, such as in the event of detected problems with an associated AP; store configuration or other information relating to the AP for transmission upstream (e.g., to the AP controller or other analytical/management process within the MSO network) for further use in evaluating or diagnosing the problem(s) within the customer's WLAN and associated infrastructure.

When the device at issue is identified, the AP may send a reboot signal or similar instruction that causes the device to reboot or take other corrective action. In one variant, the AP checks whether this self-correcting process has properly brought the device at issue back online. If there does not appear to be a problem with the network, the AP may send an alert to the client device by pushing a message, e.g., via "bit stuffed" beacons.

In another embodiment, an upstream network entity (e.g., a controller) may participate in self-corrective actions. In this case, the controller expects information (such as via a heartbeat signal) from one or more downstream devices, and sends a response to acknowledge receipt and inform the downstream device (e.g., an AP) that it is operational. When the information or heartbeat is no longer received, the controller may cause a remote restart of one or more identified offline devices that should have been sending heartbeats to the controller. In one variant, the controller may act like the AP as described supra, originating the heartbeat signals as well as reboot signals (including to itself).

Detailed Description of Exemplary Embodiments

Exemplary embodiments of the apparatus and methods of the present disclosure are now described in detail. While these exemplary embodiments are described in the context of the previously mentioned Wi-Fi WLAN(s) associated with a managed network (e.g., hybrid fiber coax (HFC) cable architecture having a multiple systems operator (MSO), digital networking capability, IP delivery capability, and a plurality of client devices), the general principles and advantages of the disclosure may be extended to other types of networks and architectures that are configured to deliver digital media data (e.g., text, images, video, and/or audio). Such other networks or architectures may be broadband, narrowband, wired or wireless, or otherwise, the following therefore being merely exemplary in nature.

It will also be appreciated that while described generally in the context of a network providing service to a customer or consumer or end user (i.e., residential), the present disclosure may be readily adapted to other types of environments including, e.g., outdoors, commercial/retail, or enterprise domain (e.g., businesses), and government/military applications. Myriad other applications are possible.

Also, while certain aspects are described primarily in the context of the well-known Internet Protocol (described in, inter alia, *Internet Protocol DARPA Internet Program Protocol Specification*, IETF RCF 791 (September 1981) and Deering et al., *Internet Protocol, Version 6 (Ipv6) Specification*, IETF RFC 2460 (December 1998), each of which is incorporated herein by reference in its entirety), it will be appreciated that the present disclosure may utilize other types of protocols (and in fact bearer networks to include other internets and intranets) to implement the described functionality.

Other features and advantages of the present disclosure will immediately be recognized by persons of ordinary skill in the art with reference to the attached drawings and detailed description of exemplary embodiments as given below.

Service Provider Network

FIG. 1 illustrates a typical service provider network configuration useful with the features of the wireless network described herein. This service provider network 100 is used in one embodiment of the disclosure to provide backbone and Internet access from the service provider's wireless access points (e.g., Wi-Fi APs operated or maintained by the service provider or its customers/subscribers), one or more cable modems (CMs) in data communication therewith, or even third party access points accessible to the service provider via e.g., an interposed network such as the Internet (e.g., with appropriate permissions from the access point owner/operator/user).

As opposed to an unmanaged network, the managed service-provider network of FIG. 1 advantageously allows, inter alia, control and management of a given user's access (such user which may be a network subscriber, or merely an incidental/opportunistic user of the service) via the wireless access point(s), including imposition and/or reconfiguration of various access "rules" or other configurations applied to the wireless access points. As but one example, the wireless access points (see discussion of FIG. 1a infra) disposed at the service location(s) can be coupled to the bearer managed network (FIG. 1) via, e.g., a cable modem termination system (CMTS) and associated local DOCSIS cable modem (CM), a wireless bearer medium (e.g., an 802.16 WiMAX system), a fiber-based system such as FiOS or similar, a third-party medium which the managed network operator has access to (which may include any of the foregoing), or yet other means.

Advantageously, the service provider network 100 also allows components at the service location (e.g., Wi-Fi APs and any supporting infrastructure such as routers, switches, etc.) to be remotely reconfigured by the network MSO, based on e.g., prevailing operational conditions in the network, changes in user population and/or makeup of users at the service location, business models (e.g., to maximize profitability), etc. In certain embodiments, the service provider network also advantageously permits the aggregation and/or analysis of subscriber- or account-specific data (including inter alia, particular mobile devices associated with such subscriber or accounts) as part of the provision of services to users under the exemplary delivery models described herein.

The various components of the exemplary embodiment of the network 100 include (i) one or more data and application origination sources 102; (ii) one or more content sources 103, (iii) one or more application distribution servers 104; (iv) one or more VOD servers 105, (v) client devices and/or Customer Premises Equipment (CPE) 106, (vi) one or more routers 108, (vii) one or more wireless access point controllers 110 (may be placed more locally as shown or in the headend or core" portion of network), (viii) one or more cable modems 112, and/or (ix) one or more access points 114. The distribution server(s) 104, VOD servers 105 and CPE/client device(s) 106 are connected via a bearer (e.g., HFC) network 101. A simple architecture comprising one of each of certain components 102, 103, 104, 105, 108, 110 is shown in FIG. 1 for simplicity, although it will be recognized that comparable architectures with multiple origination sources, distribution servers, VOD servers, controllers, and/or client devices (as well as different network topologies) may be utilized consistent with the present disclosure. For example, the headend architecture of FIG. 1a (described in greater detail below), or others, may be used.

It is also noted that cable network architecture is typically a "tree-and-branch" structure, and hence multiple tiered APs may be linked to each other or cascaded via such structure.

FIG. 1a shows one exemplary embodiment of a headend architecture. As shown in FIG. 1a, the headend architecture 150 comprises typical headend components and services including billing module 152, subscriber management system (SMS) and client/CPE configuration management module 154, cable modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the disclosure. It will also be appreciated that the headend configuration depicted in FIG. 1a is high-level, conceptual architecture, and that each MSO may have multiple headends deployed using custom architectures.

The exemplary architecture 150 of FIG. 1a further includes a conditional access system (CAS) 157 and a multiplexer-encrypter-modulator (MEM) 162 coupled to the HFC network 101 adapted to process or condition content for transmission over the network. The distribution servers 164 are coupled to the LAN 160, which provides access to the MEM 162 and network 101 via one or more file servers 170. The VOD servers 105 are coupled to the LAN 160 as well, although other architectures may be employed (such as for example where the VOD servers are associated with a core switching device such as an 802.3z Gigabit Ethernet device). As previously described, information is carried across multiple channels. Thus, the headend must be adapted to acquire the information for the carried channels from various sources. Typically, the channels being delivered from the headend 150 to the client devices/CPE 106 ("downstream") are multiplexed together in the headend, as previously described and sent to neighborhood hubs (as shown in the exemplary scheme of FIG. 1b) via a variety of interposed network components.

Figure 1B:
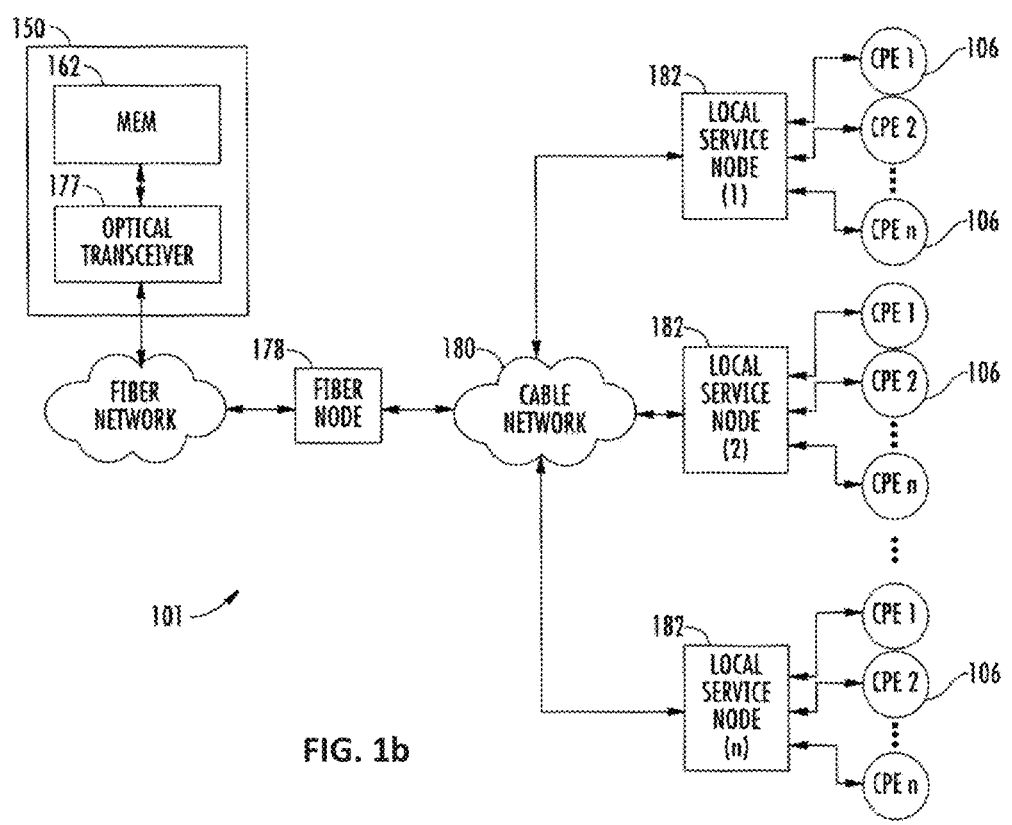
FIG. 1b is a functional block diagram illustrating one exemplary local service node configuration useful with various aspects of the present disclosure.

As shown in FIG. 1b, the network 101 of FIGS. 1 and 1a comprises a fiber/coax arrangement wherein the output of the MEM 162 of FIG. 1a is transferred to the optical domain (such as via an optical transceiver 177 at the headend or further downstream). The optical domain signals are then distributed to a fiber node 178, which further distributes the signals over a distribution network 180 to a plurality of local servicing nodes 182. This provides an effective 1:N expansion of the network at the local service end.

Content (e.g., audio, video, data, files, etc.) is provided in each downstream (in-band) channel associated with the relevant service group. To communicate with the headend or intermediary node (e.g., hub server), the client devices/CPE 106 may use the out-of-band (OOB) or DOCSIS channels and associated protocols. The OCAP 1.0, 2.0, 3.0, 3.1 (and subsequent) specification provides for exemplary networking protocols both downstream and upstream, although the present disclosure is in no way limited to these approaches.

Figure 1C:
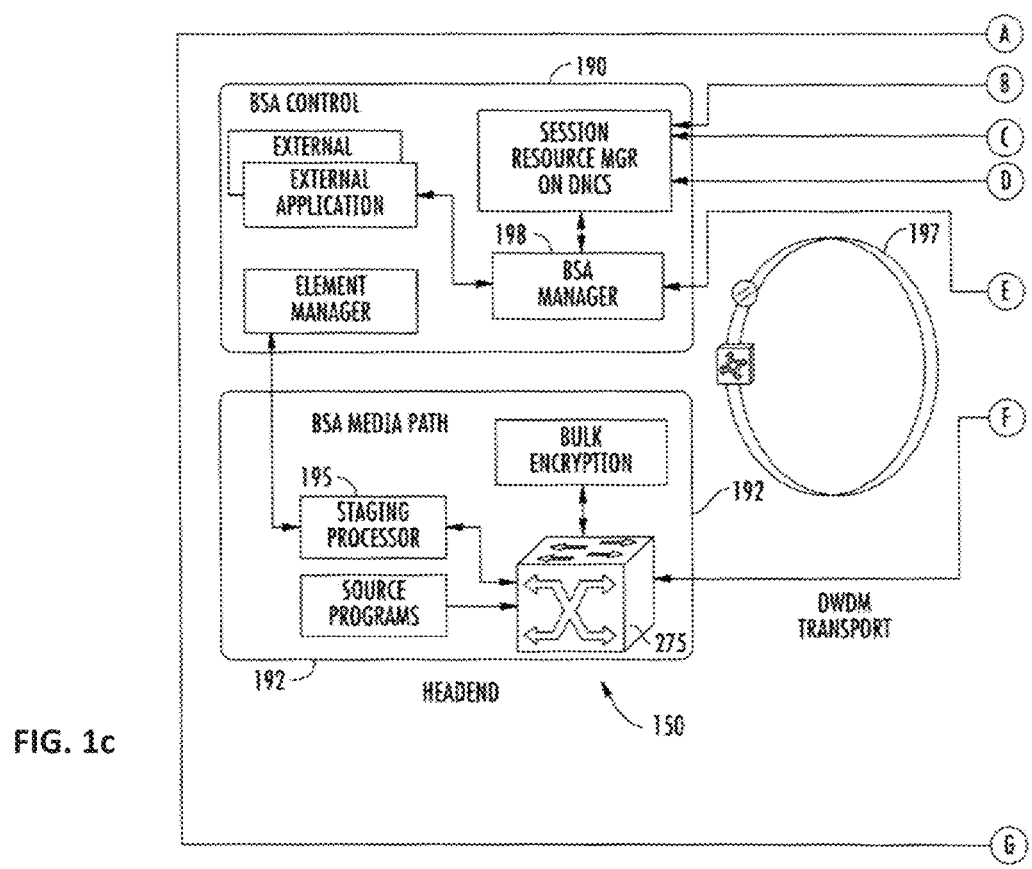
FIG. 1c is a functional block diagram illustrating one exemplary broadcast switched architecture (BSA) network useful with various aspects of the present disclosure.
Figure 1C:
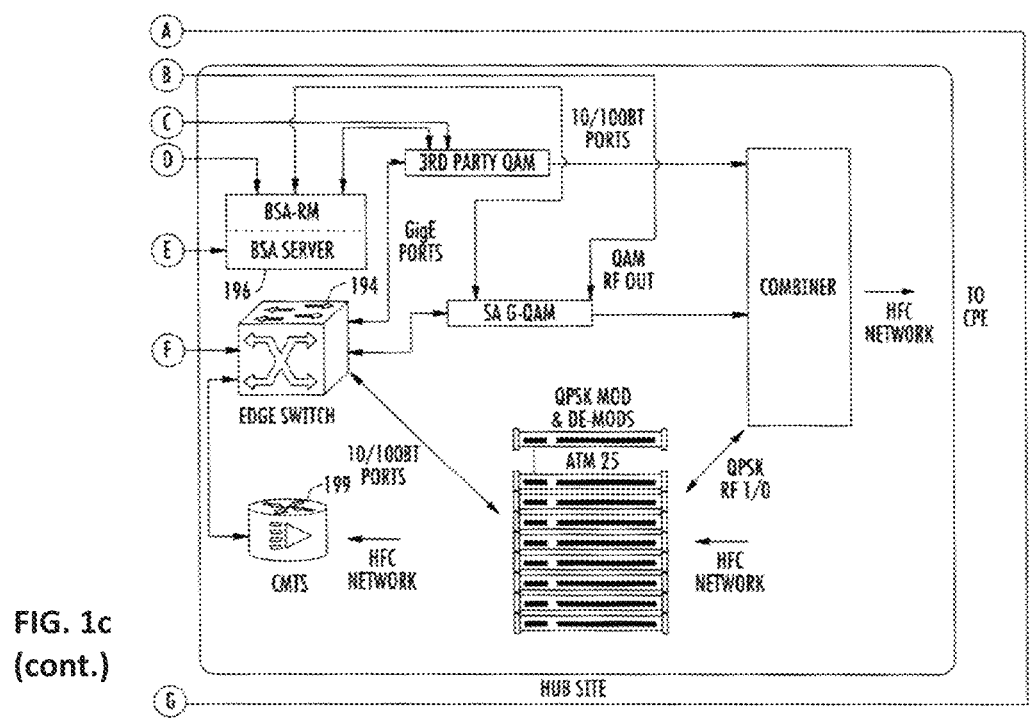

FIG. 1c illustrates an exemplary "switched" network architecture. Specifically, the headend 150 contains switched broadcast control 190 and media path functions 192; these element cooperating to control and feed, respectively, downstream or edge switching devices 194 at the hub site which are used to selectively switch broadcast streams to various service groups. Broadcast switched architecture (BSA) media path 192 may include a staging processor 195, source programs, and bulk encryption in communication with a switch 275. A BSA server 196 is also disposed at the hub site, and implements functions related to switching and bandwidth conservation (in conjunction with a management entity 198 disposed at the headend). An optical transport ring 197 is utilized to distribute the dense wave-division multiplexed (DWDM) optical signals to each hub in an efficient fashion.

In addition to "broadcast" content (e.g., video programming), the systems of FIGS. 1a and 1c (and 1d discussed below) also deliver Internet data services using the Internet protocol (IP), although other protocols and transport mechanisms of the type well known in the digital communication art may be substituted. One exemplary delivery paradigm comprises delivering MPEG-based video content, with the video transported to user client devices (including IP-based STBs or IP-enabled consumer devices) over the aforementioned DOCSIS channels comprising MPEG (or other video codec such as H.264 or AVC) over IP over MPEG. That is, the higher layer MPEG- or other encoded content is encapsulated using an IP protocol, which then utilizes an MPEG packetization of the type well known in the art for delivery over the RF channels. In this fashion, a parallel delivery mode to the normal broadcast delivery exists; i.e., delivery of video content both over traditional downstream QAMs to the tuner of the user's STB or other receiver device for viewing on the television, and also as packetized IP data over the DOCSIS QAMs to the user's client device or other IP-enabled device via the user's cable modem. Delivery in such packetized modes may be unicast, multicast, or broadcast.

Referring again to FIG. 1c, the IP packets associated with Internet services are received by the edge switch 194, and in one embodiment forwarded to the cable modem termination system (CMTS) 199. The CMTS examines the packets, and forwards packets intended for the local network to the edge switch 194. Other packets are discarded or routed to another component. As an aside, a cable modem is used to interface with a network counterpart (e.g., CMTS) so as to permit two-way broadband data service between the network and users within a given service group, such service which may be symmetric or asymmetric as desired (e.g., downstream bandwidth/capabilities/configurations may or may not be different than those of the upstream).

The edge switch 194 forwards the packets received from the CMTS 199 to the QAM modulator, which transmits the packets on one or more physical (QAM-modulated RF) channels to the CPE/client devices. The IP packets are typically transmitted on RF channels (e.g., DOCSIS QAMs) that are different that the RF channels used for the broadcast video and audio programming, although this is not a requirement. The client devices/CPE 106 are each configured to monitor the particular assigned RF channel (such as via a port or socket ID/address, or other such mechanism) for IP packets intended for the subscriber premises/address that they serve. For example, in one embodiment, a business customer premises obtains its Internet access (such as for a connected Wi-Fi AP) via a DOCSIS cable modem or other device capable of utilizing the cable "drop" to the premises (e.g., a premises gateway, etc.).

Figure 1D:
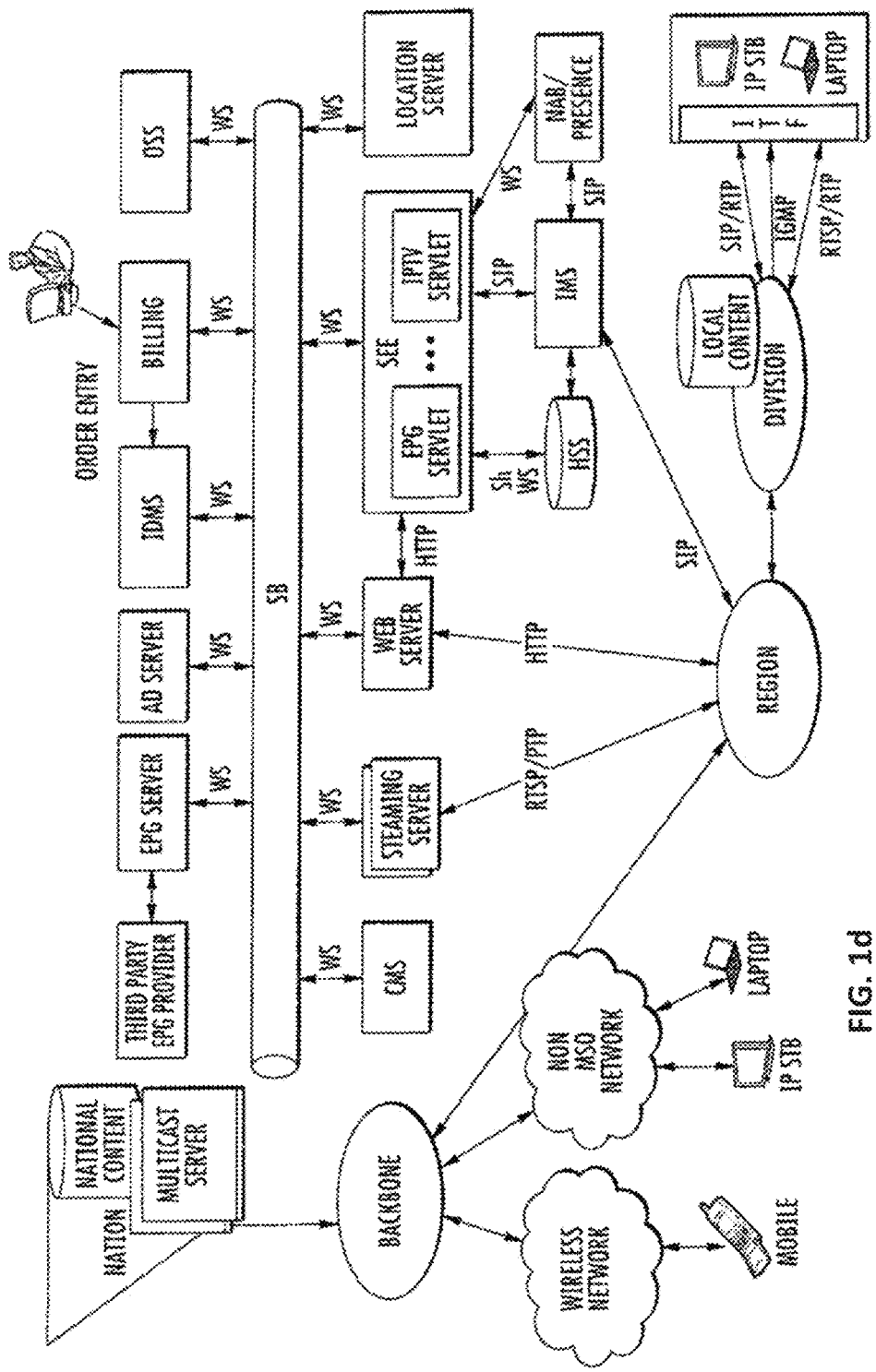
FIG. 1d is a functional block diagram illustrating one exemplary packetized content delivery network architecture useful with various aspects of the present disclosure.

While the foregoing network architectures described herein can (and in fact do) carry packetized content (e.g., IP over MPEG for high-speed data or Internet TV, MPEG2 packet content over QAM for MPTS, etc.), they are often not optimized for such delivery. Hence, in accordance with another embodiment of the disclosure, a "packet optimized" delivery network is used for carriage of the packet content (e.g., Internet data, IPTV content, etc.). FIG. 1d illustrates one exemplary implementation of such a network, in the context of a 3GPP IMS (IP Multimedia Subsystem) network with common control plane and service delivery platform (SDP), as described in co-owned and co-pending U.S. patent application Ser. No. 12/764,746 filed Apr. 21, 2010 and entitled "METHODS AND APPARATUS FOR PACKETIZED CONTENT DELIVERY OVER A CONTENT DELIVERY NETWORK", which is now published as U.S. Patent Application Publication No. 2011/0103374 of the same title, incorporated herein by reference in its entirety. Such a network provides, inter alia, significant enhancements in terms of common control of different services, implementation and management of content delivery sessions according to unicast or multicast models, etc.; however, it is appreciated that the various features of the present disclosure are in no way limited to this or any of the other foregoing architectures.

It will be appreciated that the foregoing MSO or managed network can advantageously be leveraged for easy installation of the various APs (and/or any lower-level "children APs" as described in co-owned U.S. patent application Ser. No. 15/002,232 entitled "APPARATUS AND METHOD FOR WIRELESS NETWORK SERVICES IN MOVING VEHICLES" and filed Jan. 20, 2016, issued as U.S. Pat. No. 9,918,345, incorporated herein by reference in its entirety) within a geographic region. Consider, for example, a MSO network that is already pervasive throughout a given area (i.e., the MSO has numerous customers, both business and residential and otherwise); in such networks, the MSO already has significant infrastructure deployed, at a very high level of granularity. Hence, if an AP needs to be placed at a given location in order to effect the coverage/operation for the Wi-Fi network described herein, the MSO can easily "tap off" the existing infrastructure in that area to enable the AP placement. This may take the form of e.g., placement of an AP coincident with a given customer's extant equipment, and/or placement of new equipment that taps off a local service node. The present disclosure further contemplates provision by the MSO (or other parties) of consideration to the customer for allowing the placement of the equipment on their premises (e.g., payments, credits on their bill, special services or features, etc.).

It is also contemplated that the service provider may utilize or "piggyback" off the infrastructure of other service providers, utilities, etc. For instance, a third party service provider may have a high-bandwidth backhaul "drop" near a location desired by the MSO; the MSO can then lease, pay, rent, etc. that third party for use of the drop. Similarly, traffic signal poles, lighting, bridges, tunnels, etc. all contain a wide variety of cabling, conduits, and other infrastructure which the (host) MSO could make use of so as to obviate having to perform a new installation (and all of the attendant costs and delays thereof).

Hence, by virtue of the sheer quantity of network devices (i.e., APs, hotspots, and/or other nodes) and backhaul infrastructures (as listed above), end users' constant access to the Internet via, e.g., ubiquitous numbers of APs installed within modern infrastructure, present challenges to the MSO (or dedicated portions thereof, such as AP controller, CMTS, etc.) to monitor and identify problematic devices and connections within the network (including within the home or other premises) in order to correct them. The present disclosure alleviates at least a portion of the challenge by offloading the workload of monitoring and identifying devices at issue to local devices (e.g., AP) capable of such functions.

Mesh Architecture

Figure 2:
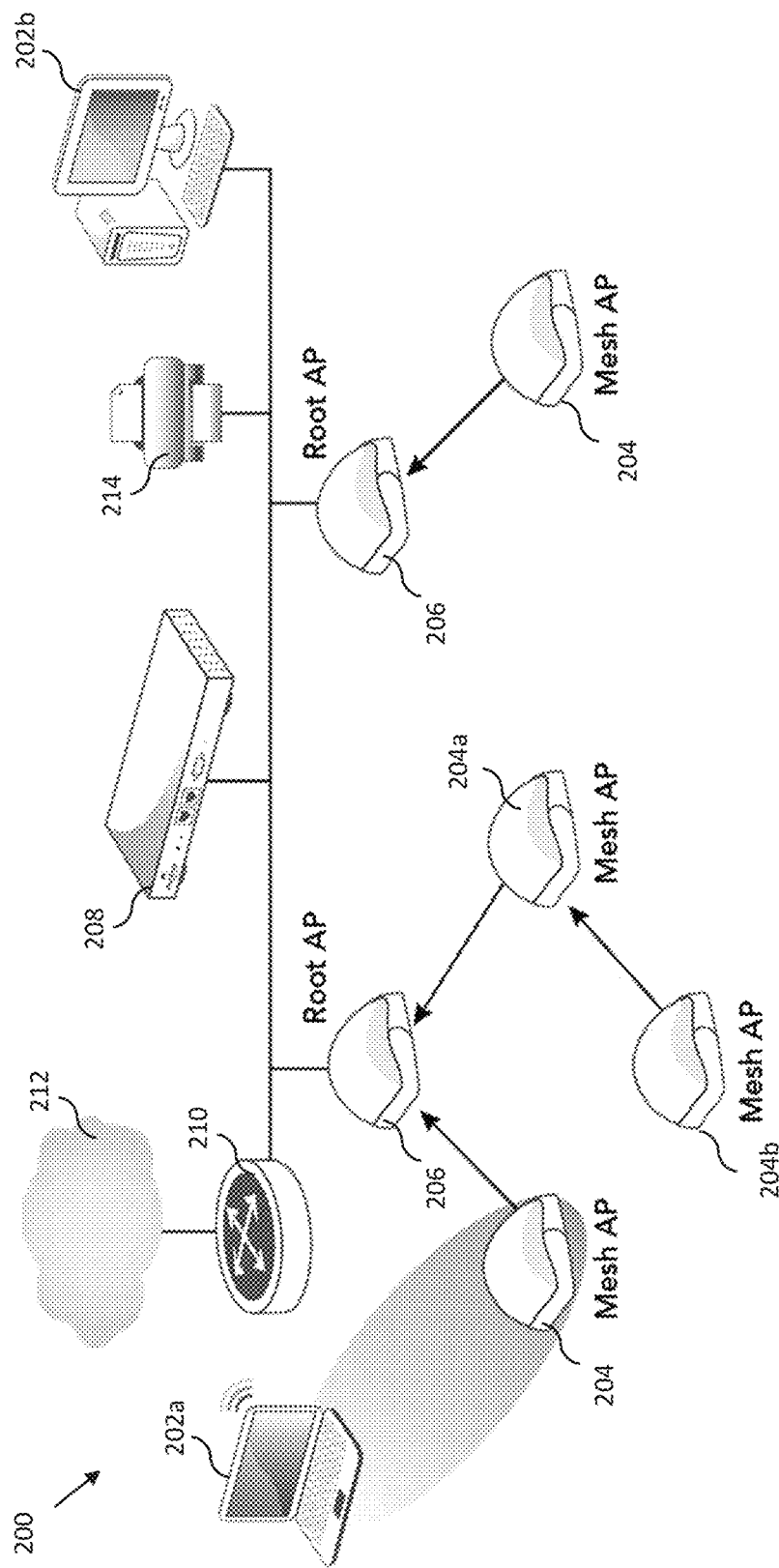
FIG. 2 is a graphical representation of an exemplary embodiment of a wireless network, including "meshing", useful with various embodiments of the present disclosure.

FIG. 2 illustrates a diagram of an exemplary mesh network deployed across a managed (here, cable) network that is useful consistent with the various feature of the present disclosure. In this context, a mesh network is a network topology that enables various nodes within the network to communicate and distribute data with one another. Various point-to-point and point-to-multi-point scenarios are possible in such topology. Hence, several access points in a mesh network may wirelessly share a single Internet connection. In an exemplary embodiment, the mesh network 200 includes one or more end users and client devices 202a, 202b (e.g., laptop, desktop, smartphone, tablet) in data communication with one or more network nodes (e.g., a mesh access point 204 and/or root access point 206 via wired or wireless connection, e.g., Wi-Fi) to access the network (e.g., internets, intranets). In some embodiments, root APs (and even mesh APs) may comprise cable modems and/or other nodes for client devices to access the network. For instance, in one implementation, all of the APs reside within the end user's premises, such as within a home or business. In another implementation, only some of the APs reside within the end user's premises, while one or more others are disposed external thereto (e.g., outdoor Wi-Fi APs broadcasting beacons that are recognized and received by client devices for, e.g., general access, or delivering contextually relevant information, as described in co-owned and co-pending U.S. patent application Ser. No. 15/063,314 filed Mar. 7, 2016 and entitled "APPARATUS AND METHODS FOR DYNAMIC OPEN-ACCESS NETWORKS", incorporated supra. Outdoor applications include deployment in public areas with numerous potential users, such as an airport, stadium, mall, subway, etc.

As shown, an end user may be wirelessly connected with a mesh access point 204 that is in data communication with a root access point 206 (e.g., via wired or wireless "local backhaul"), which is in turn in communication with a router 208, controller 210, backend 212, external device 214 (e.g., a printer), other APs or mesh networks, etc., thereby providing network access to the end user(s). Multiple mesh APs 204a, 204b may be daisy chained (e.g., in a repeater configuration within relatively large premises) to relay information to other end users (not shown) connected to any one of the APs.

Figure 3:
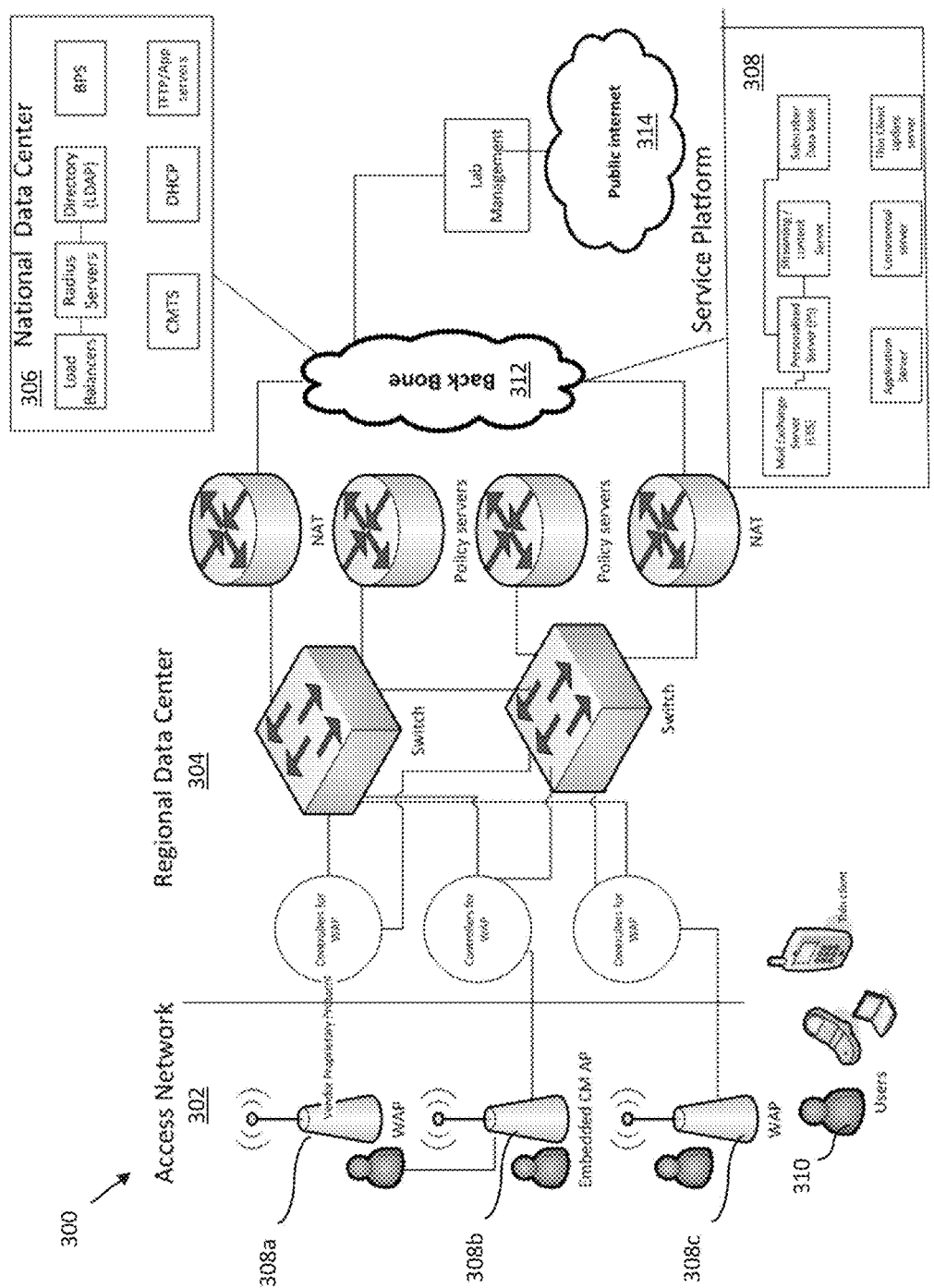
FIG. 3 is a graphical representation of an exemplary embodiment of an end-to-end cable network architecture useful with various embodiments of the present disclosure.

FIG. 3 illustrates an exemplary cable network architecture that extends from client devices to, inter alia, data centers. In the exemplary embodiment, the architecture 300 is divided into four main logical groups: an access network 302, a regional data center 304, a national data center 306, and a service platform 308. The access network 302 includes one or more APs (e.g., wireless APs 308a, 308b, 308c) and one or more end users 310 connected thereto via client devices (which, as in FIG. 2, may include "cascaded" topologies including one or more mesh elements). The regional data center 304 assists in providing services to the end users 310 by receiving, transmitting, and processing data between the access network 302 and the backbone 312 of the cable network. In one embodiment, the regional data center 304 is a local infrastructure that includes controllers (e.g., AP controllers), switches, policy servers and network address translators (NATs) in communication with the backbone 312. The regional data center 304 may be, for example, an intermediate data center on premises away to local APs (e.g., mesh APs) and user premises, and disposed within a larger infrastructure.

In the exemplary embodiment, the backbone 312 of the network enables data communication and services between the regional data center 304 and the national data center 306 via backhaul, and/or connection to the (public) Internet 314. In one implementation, the national data center 306 provides further top-level provisioning services to the regional data center 304 (e.g., load balancing, support of Trivial File Transfer Protocols (TFTP), Lightweight Directory Access Protocols (LDAP), and Dynamic Host Configuration Protocols (DHCP)), as well as providing the same to other data centers and/or access networks which may be part of the network operator's (e.g., MSO's) national-level architecture. National data center 306 also houses more advanced backend apparatus (e.g., CMTS 199, AP controllers, Layer 3 switches, and servers for the aforementioned provisioning services). In one embodiment, a separate service platform 308 may provide auxiliary services to the end users subscribed to the network provider, including access to mail exchange servers, remote storage, etc. Thus, it can be appreciated that myriad network nodes and entities, as well as connections therebetween, enable client devices (and ultimately end users 310) to maintain end-to-end connectivity across the network.

Cable Modem

The CM provides multiple functionalities to the network. It is a modem (i.e., modulates and demodulates radio frequency signals), can facilitate encryption-decryption and conditional access (CA), and can act as a bridge, a router, a network monitoring/management (e.g., Simple Network Management Protocol (SNMP)) agent, an Ethernet hub, etc. As such, the CM is somewhat of a "chokepoint" for many processes and services delivered to or originating from the customer's premises; accordingly even partial failure of the CM can result in loss of AP functionality or connectivity to the MSO network (and hence other networks such as the public Internet).

When sending and receiving data, a CM may use several modulation schemes, but two used most frequently are Quadrature Phase Shift Keying (QPSK) (allowing a data bitrate up to approximately 10 Mbps) and 64-QAM (allowing data bitrate up to approximately 36 Mbps). Moreover, a CM typically sends and receives data (i.e., upstream and downstream, respectively) in two different fashions. In one embodiment, when the CM sends data in the downstream direction, the digital data is modulated somewhere between a frequency range of 42 MHz and 750 MHz and then placed on a typical 6 MHz television carrier. Since cable networks have a tree-and-branch network structure (for instance, CM may be connected to multiple root APs via a switch, each of the root APs being connected to multiple mesh APs via a switch), noise is added as signals travel upstream and combine (e.g., multiple mesh APs sending traffic to a root AP, multiple root APs sending traffic to CM). To remedy this problem, the QPSK modulation scheme may be used in the upstream direction, as QPSK provides more robust modulation in a noisy environment. However, QPSK does not allow a bitrate as high as that of QAM. Thus, when the CM sends data upstream, the transmission rate tends to be slower than when the CM sends data downstream (i.e., is asymmetric); this asymmetry is typically acceptable as most users characteristically download much more data than they upload. Notably, all CMs (and hence APs) within a given service group share both downstream and upstream bandwidth among themselves as well.

Nonetheless, such bandwidth limitations do not affect response times nor significantly limit the quantity and frequency of "low overhead" heartbeat signals exchanged with other devices. For instance, when the premises AP sends a "heartbeat" to the AP controller, and the controller returns a response signal (as described in greater detail below), the transmission latency upstream is similar to the response transmission latency downstream (i.e., from the AP controller back to the CM/AP).

In terms of hardware, the CM's RF interface comprises an external F-connector and is configured for Ethernet connection with twisted-pair cables capable of transmitting at 10, 100 or 1000 Mbps. The CM may also support IPv4 and IPv6 protocols. A DOCSIS-enabled CM shares channels using a Time Division Multiple Access (TMDA) scheme or an Advanced Time Division Multiple Access (ATMDA); i.e., when the CM is not transmitting data, its RF transmitter is turned off, and to transmit data, it must transmit bursts of data.

In a typical CM, its downstream maximum data rate is approximately 343 Mbps across 8 downstream (RF) channels. The CM is capable of downstream communication within a frequency range of e.g., 88 MHz to 1002 Mhz, via 64- or 256-QAM modulation. The CM's RF input/output power ranges from e.g., −15 to +15 dBmV. The exemplary CM's upstream maximum data rate is approximately 122 Mbps across 4 upstream channels, and the CM is capable of upstream communication within a frequency range of 5 MHz to 42 MHz, via various modulation schemes (e.g., QPSK, or 8-, 16-, 32-, 64- or 128-QAM).

The CM's RF output power varies depending on modulation and time-division scheme. For example, for 32-QAM and 64-QAM (ATMDA only), typical RF output power is +8 to +54 dBmV. For 8-QAM and 16-QAM, typical RF output power is +8 to +55 dBmV, and +8 tp +58 dBmV for QPSK. For all modulations based on Synchronous-Code Division Multiple Access (S-CDMA), typical RF output power is +8 to +53 dBmV.

Figure 4A:
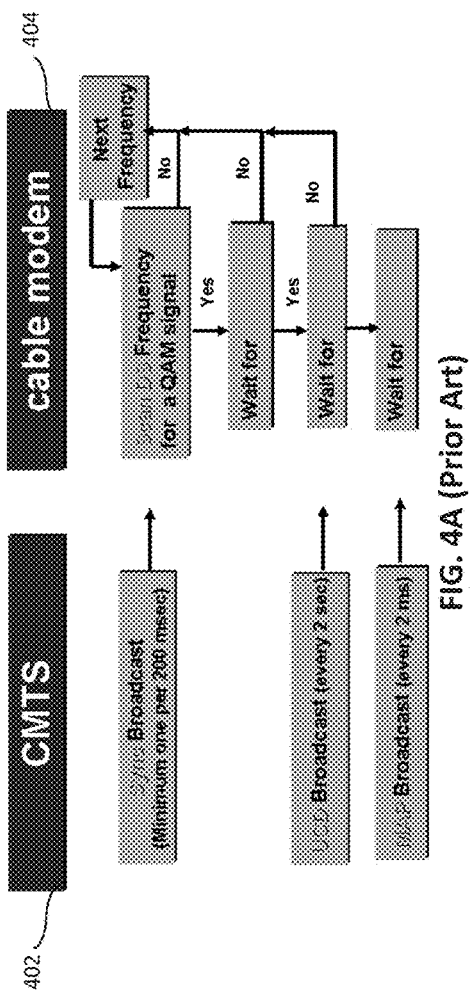
FIGS. 4A and 4B are flow diagrams of a downstream cable modem registration process according to a DOCSIS protocol.

Referring now to FIG. 4A, a flow diagram of a downstream cable modem registration process according to a typical prior art DOCSIS protocol is shown, so as to illustrate typical cable modem operation and indicate potential areas for device or other failures which can be addressed by the features of the present disclosure. Specifically, as shown in FIG. 4A, an internal flow occurs between a cable modem termination system (CMTS) 402 (such as e.g., the CMTS 199 of FIG. 1c) and a cable modem (CM) 404, such as the modem 112 of FIG. 1, attempting to acquire a QAM digital channel.

In an exemplary embodiment, when the CM 404 turns on and evaluates signals present on the RF cable (e.g., coaxial connection to the cable network), it searches for a valid downstream DOCSIS channel. Meanwhile, CMTS 402 transmits a "sync" (synchronization) broadcast every 200 milliseconds for system timing. In addition, the CMTS 402 sends an Upstream Channel Descriptor (UCD) every 2 seconds to instruct the CM 404 the upstream frequency to be used for transmission, along with other parameters needed to communicate over the network. The CMTS 402 also sends Media Access Protocol (MAP) messages to allocate time periods for each CM 404 according to a time-division scheme. The CM 404, in turn, looks for the SYNC, UCD and MAP messages from CMTS 402. If the CM 404 receives all three messages, it acknowledges that it is on a valid DOCSIS channel; otherwise, the CM 404 continues searching through QAM channels to lock onto.

Figure 4B:
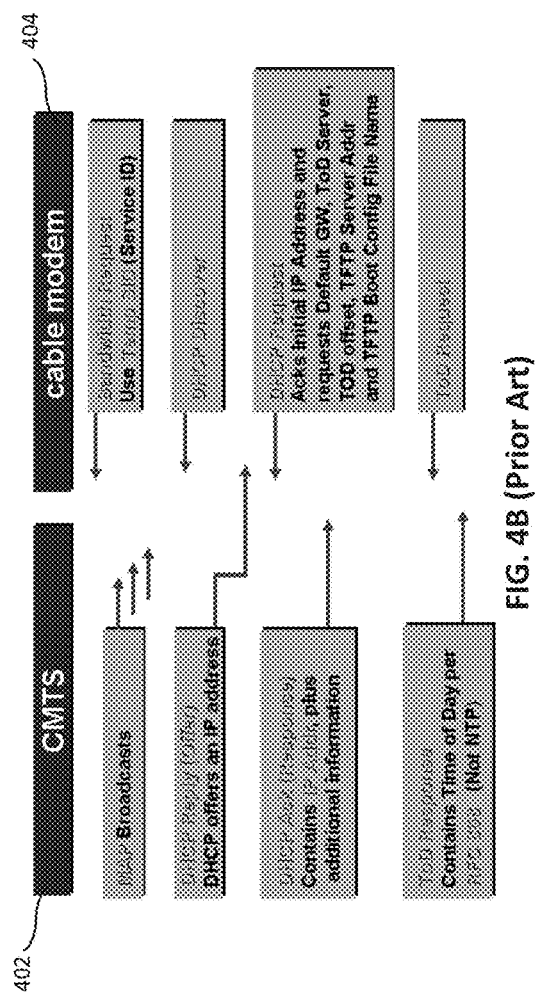

FIG. 4B illustrates a flow diagram of a typical process for acquiring an IP address as implemented by the CM. In an exemplary embodiment, the CM 404 requests permission to transmit data to the CMTS 402 in order to acquire an IP address for itself (which also may include other devices within the premises network). The request is contained in a bandwidth request. In response, the CMTS 402 broadcasts a MAP (containing an assigned time slot) for the CM that sent the request (i.e., CM 404). During the time slot, the CM 404 sends a DHCP discover message to find a DHCP server. The DHCP server exchanges an offer of an IP address along with other network information and parameters with acknowledgements from CM 404 to complete the acquisition process. Once the transactions are confirmed, CM 404 requests the current date and time of day from the time-of-day server, useful for accurately timestamping messages and error logs, and synchronizing all the clocks on the network.

It is appreciated that while the above flows between the CMTS and CM are described in terms of DOCSIS CMs in general, DOCSIS 3.0-enabled CMs (as opposed to purely DOCSIS 2.0 compliant devices) are advantageously capable of accessing a greater range of signals from the CMTS (as well as supporting downstream and upstream channel bonding), and hence aspects of the present disclosure may be readily adapted to any type of CM (or for that matter other modem such as satellite wireless modem, or optical interface/modulator device for interface with an optical fiber bearer network such as FiOS).

Moreover, devices compliant with the incipient DOCSIS 3.1 and CCAP (converged cable access platform) standards, such as e.g., the Cisco cBR-8 Converged Broadband Router and counterpart DOCSIS 3.1-enabled modems, which make use of full RF spectrum, may be adapted for use consistent with the various features described herein.

Access Point Apparatus

Figure 5:
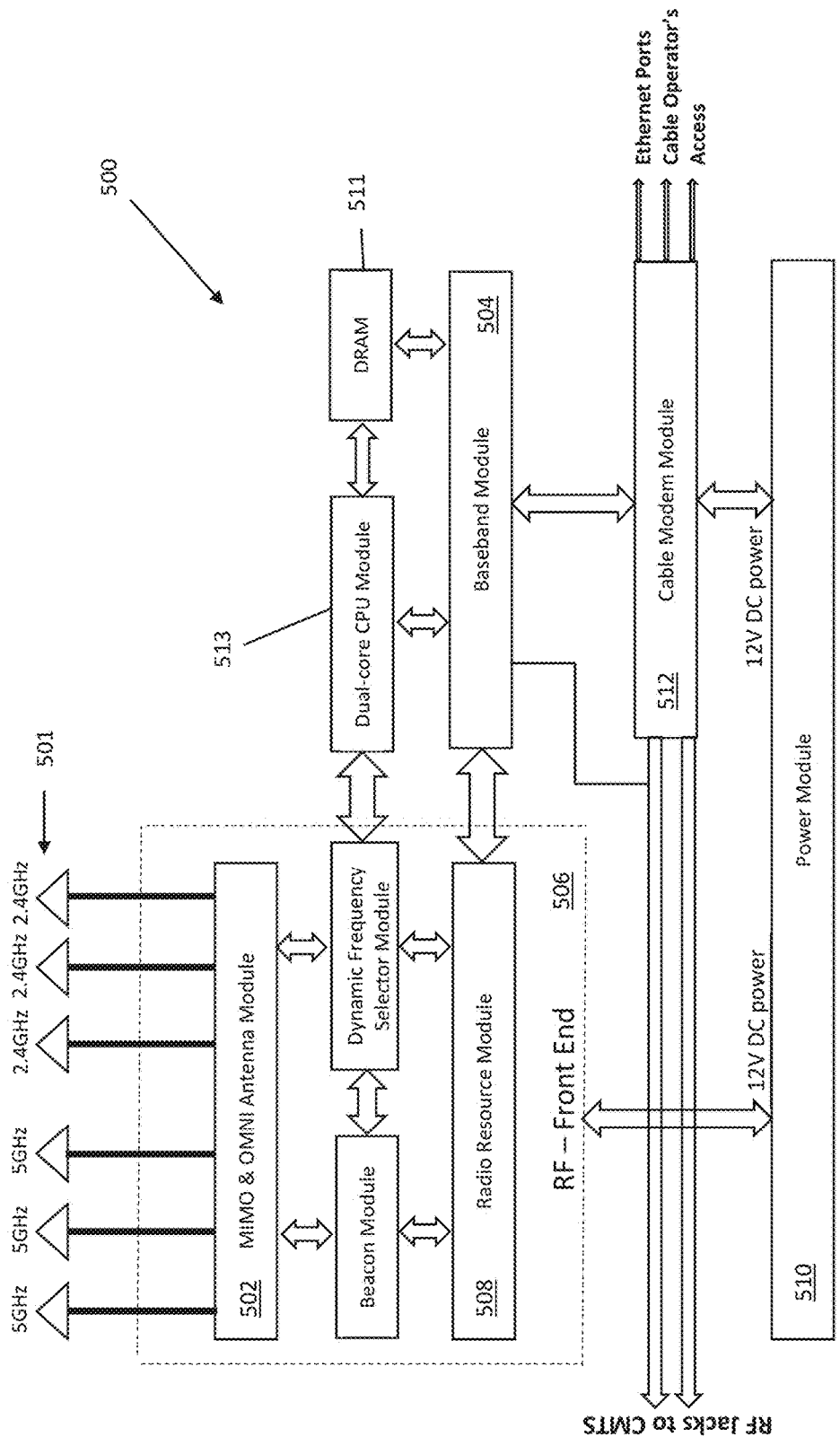
FIG. 5 is a functional block diagram illustrating a typical prior art access point.

FIG. 5 illustrates a block diagram of typical hardware and processes of a prior art WLAN access point (AP). The AP 500 supports multiple in, multiple out (MIMO) and/or omnidirectional communication (i.e., in multiple directions, e.g., 360 degrees for outdoor applications). In the diagram as shown, three 2.4 GHz and three 5 GHz integrated "omni" antennas 501 are each coupled to an antenna module 502. The omnidirectional and/or MIMO antennas support multiple users connecting to the AP simultaneously. A baseband module 504 is supported by a CPU and a memory module (e.g., DRAM), and is configured to manage the AP's radio functions (e.g., using computer software, firmware, operating system and/or other instructions stored thereon and/or at a discrete memory module).

A baseband module 504 is configured to communicate with various components of the front end 506 of the AP (e.g., a radio resource module 508) in order to enable and control the antenna functions. The baseband module 504 is further supported by a radio resource module (RRM) 508, a discrete memory module (e.g., DRAM) 511, and processing unit 513 (e.g., a dual-core CPU, as shown in FIG. 5). It is appreciated that while the RRM 508 is shown in FIG. 5 as a discrete component, all or part of its functionality may be combined with or integrated into other components, including without limitation the baseband module 504.

The radio resource module 508 manages radio resources (e.g., the antenna module 502, beacon module, dynamic frequency selector module) for efficient utilization thereof. For example, the radio resource module 508 may control radio transmission characteristics such as transmit power, user allocation, data rates, handover criteria, and modulation scheme.

A power module 510 supplies power (and may draw power from an external cord) to the front-end components and CM interface module 512, which share the power supply with baseband module 504, CPU 513, memory 511, and other associated components. The CM interface module 512 is configured to manage communications with the backend side of the network, e.g., the CMTS of the MSO. Thus, the architecture for the AP 500 as shown in FIG. 5 allows input and output of radio frequency signals via both the antenna module 502 and the CM module 512.

Figure 6:
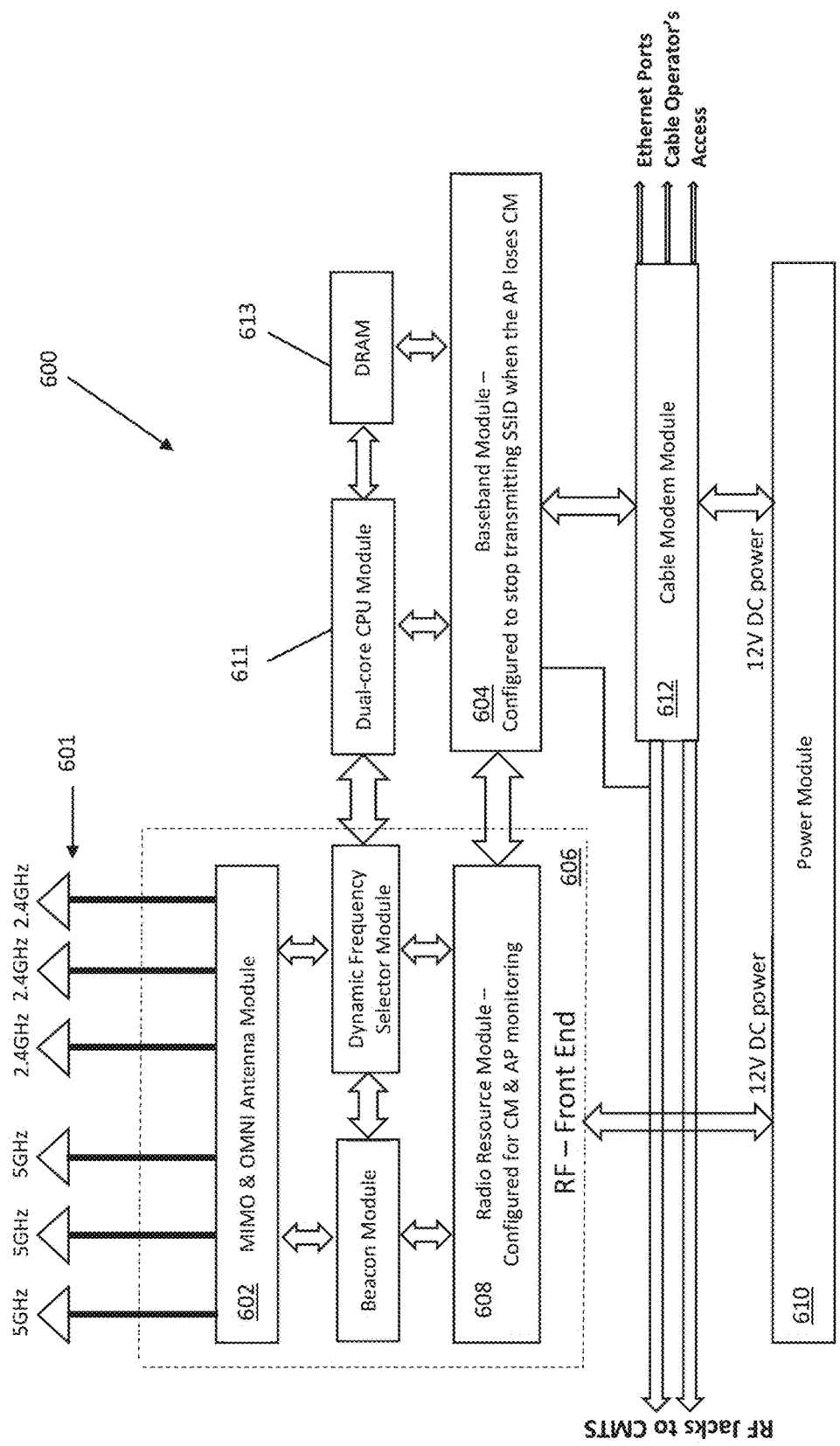
FIG. 6 is a functional block diagram illustrating an exemplary access point useful with various embodiments of the present disclosure.

FIG. 6 illustrates a block diagram of an exemplary access point architecture useful for operation in accordance with the present disclosure. In one exemplary embodiment, AP architecture 600 includes an antenna module 602 enabling wireless communication with other devices in the vicinity. As with the device of FIG. 5, the antenna module 602 supports communication via omnidirectional and/or MIMO (2×2, 3×3, 4×4, etc.) antenna configurations. In the diagram as shown, three 2.4 GHz and three 5 GHz integrated "omni" antennas 601 are each coupled to antenna module 602, although the number of antennas are not limited to six. Such omnidirectional (i.e., 360 degrees) communication may have particularly useful application in outdoor settings that have numerous users within range and at different azimuths, e.g., at a sports stadium, mall, airport, and other large public venues.

In the exemplary embodiment of FIG. 6, the baseband module 604 is configured to communicate with various components of the front-end 606 of the AP (e.g., a radio resource module 608) in order to enable and control the antenna functions, including e.g., in one exemplary embodiment, advertising SSID(s) to devices within range. In this embodiment, the baseband module 604 runs a locally self-contained communications stack, and does not rely on an external operating system for real-time processing, although other configurations may be used. In some variants, the baseband module 604 is further supported by a discrete memory module (e.g., DRAM) 611 and processing unit 613 (e.g., a dual-core CPU, as shown in FIG. 6). It is also appreciated that while the RRM 608 is shown in FIG. 6 as a discrete component, all or part of its functionality may be combined with or integrated into other components, including without limitation the baseband module 604.

One of the radio control functions of particular utility is the ability of baseband module 604 of the device 600 of FIG. 6 to stop transmitting the SSID of the AP when the CM is no longer accessible via the AP (e.g., at the baseband module 604). In the exemplary embodiment, radio resource module 608 is configured to monitor signals from other network devices (e.g., a known CM), as well as to send signals to other network entities. An online status of the known CM is monitored by sending a signal (e.g., a "heartbeat" signal) to the CM that is intended to cause a return signal to be issued from the CM. Heartbeat or other signals to a controller (see e.g., the controller 210 of FIG. 2) and/or other upstream network entities, whether at or near the edge of the MSO infrastructure, or further toward the core, may be transmitted and monitored as well by the AP 600. When an expected heartbeat is not recognized and/or received by radio resource module 608 (e.g., the AP logic is configured to measure the time between received heartbeat responses, and when such time exceeds a prescribed threshold (and/or other acceptance criteria fail), an error condition of flag is set), it is an indication that an upstream connection has gone offline or is otherwise unavailable because of one or more disabled network entities. The baseband module 604 then ceases to transmit the SSID, making the AP unavailable for connection to end users, as well as saving power.

Based on the capabilities enabled by the AP architecture 600 as described supra, rather than pinging each individual network entity from the backend (i.e., network operator side) and then remotely rebooting any downed devices via transmission of a reset or similar command as in the prior art, one or more backend (network) entities may instead (or in addition) directly monitor client APs as a way to infer that one or more devices have gone offline within the network. Specifically, in one embodiment, a given AP, using the architecture 600 of FIG. 6, monitors and logs transmitted heartbeats and/or (lack of) responses from local devices such as the CM, and those within the local infrastructure (e.g., regional data center 304). An AP controller 210, network monitoring center, or other entity/process within the MSO network accesses the aforementioned logs from the client APs to determine that a connection upstream thereto has been "severed" or is otherwise not fully functional (note that various levels of degradation may be logged/detected in various implementations of the architecture 600 of FIG. 6). An appropriate response may then be given by the accessing AP controller or other network entity (or a proxy thereof, such as local controller) such as, e.g., rebooting the problematic device.

In another embodiment, AP capabilities are sufficiently robust to offload monitoring partly or even entirely from the backend, such as by sending heartbeats to, and detecting responses from, devices further upstream within the network (e.g., the CMTS, AP controller, etc.). In one implementation, the AP architecture 600 is configured to determine the offline device and/or connection, and take appropriate remedial action. In some variants, such AP is configured to detect a precise location of the inoperative connection and/or device, such as by sending an identifiable signal to each monitored device (e.g., by including a unique identifier within the transmitted signal, and detecting failure to receive a return signal associated with the unique identifier within the expected time period).

As such, the AP logic (or that of an analytical or supervisory process accessing the logged data of the AP) can at least determine which portion or "link" in the network is potentially problematic. For example, the AP failing to receive a response to a heartbeat signal addressed specifically to a network AP controller associated with the AP would indicate that at least the portion of the network between the controller and the AP (inclusive) is non-functional, and a similar response successfully received from the CM connected to the AP being indicative that the pathway is good at least to the CM, thereby indicating that the problem lies anywhere between the upstream (backend) of the CM and the AP controller. Note also that the AP can provide such data either to a servicing technician (via direct physical access such as a connector or local wireless interface), or to one or more upstream entities such as via an alternate (unaffected) communication channel, such as e.g., out-of-band (OOB) signaling, or even cellular or "copper" service in the premises (e.g., a landline) that is unaffected by the network deficiency. The AP may also be configured to prompt the user to call for assistance, and provide error codes or information which the user can give to the technical support personnel which will indicate the origin of the problem(s). Moreover, the CM associated with the AP may be configured to perform functions comparable to those described above with respect to the AP. Notably, in many premises network configurations, the AP is downstream of the CM. Hence, a CM equipped to log relevant data, ping the AP (and/or detect heartbeats), etc. can provide useful data to upstream (network) processes, such as the AP controller. Hence, in one variant, both the AP and CM include within their software stacks logical processes configured to probe, monitor, and log data relating to themselves and other connected devices, so as to further enhance problem detection and identification. For instance, the CM may be configured to "pull" logged data from the AP upon failure of the AP, so as to enable evaluation of what components of the AP are at fault, and/or the type of failure. A simple reboot or power cycle may cure some issues, while others may require a device replacement, and yet others may be rooted within network-side entities (e.g., authentication or RADIUS servers, billing systems, etc.). It is also appreciated that the foregoing approach may be used at one or more network entities (such as the AP controller), whether alone or in combination with AP-based functionality. For instance, in one such implementation, the AP controller includes a complementary "heartbeat" module functionality, such that it can send (and specifically address) test or other signals to particular devices downstream (or even upstream) of itself so as to elicit a response therefrom and log the results, in similar fashion to the AP architecture 600. Hence, in one such approach, the AP controller and AP can coordinate or even work in tandem to "localize" the deficiency. To the degree that the AP in such case is still accessible to the network (e.g., the network AP controller), the latter can "push" instructions and test regimes to the AP (and other APs serviced by the same MSO network edge device) to attempt to localize the problem from both ends.

Call Flow

Figure 7:
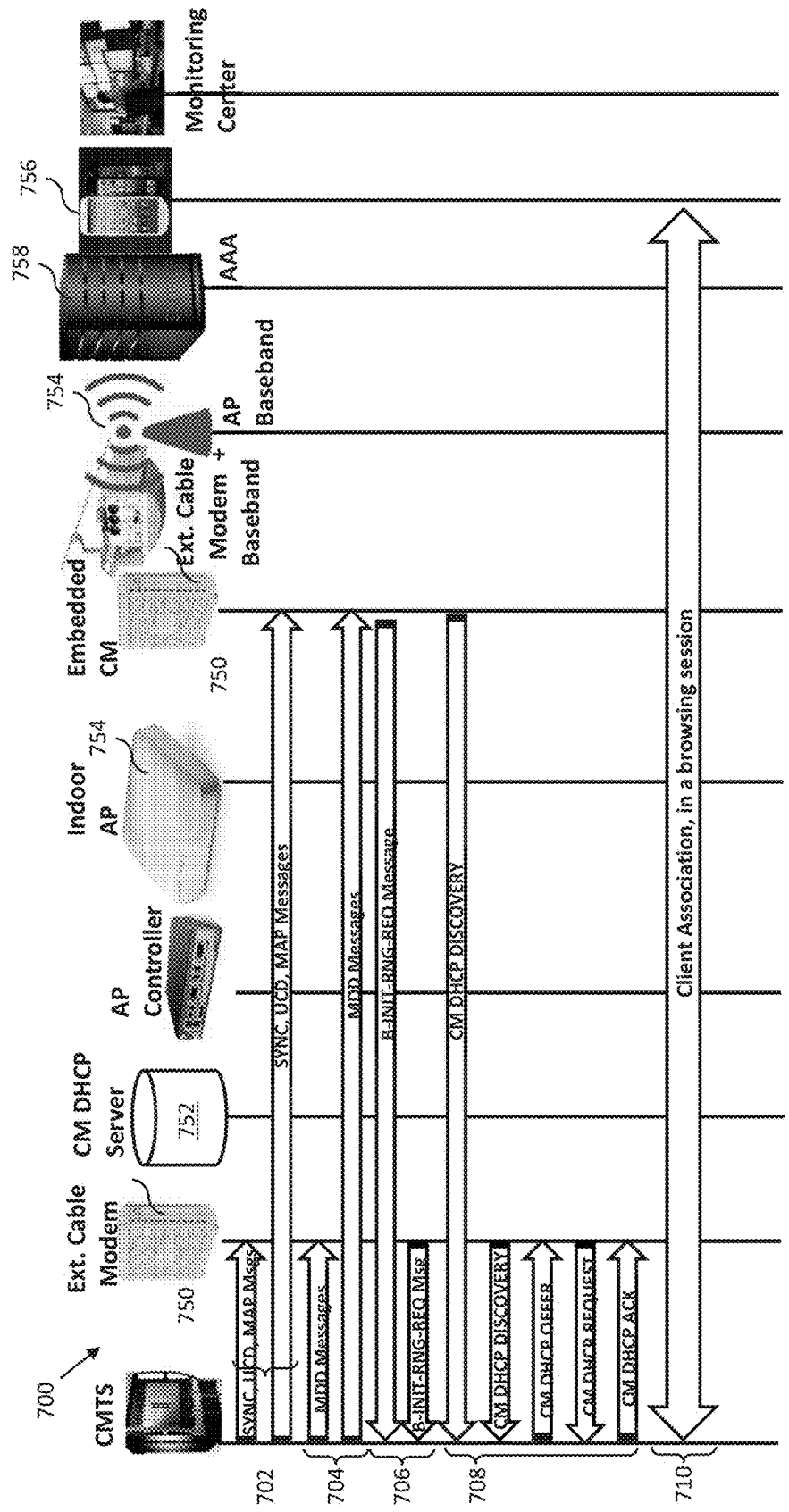
FIG. 7 is a flow diagram showing the typical steps for configuring an Internet protocol (IP) address by a Dynamic Host Configuration Protocol (DHCP) server.

FIG. 7 is a diagram illustrating a typical prior art call flow 700 for configuring an Internet protocol (IP) address by a Dynamic Host Configuration Protocol (DHCP) server, such as to allow network access to a client device. At step 702, SYNC, UCD and MAP messages are transmitted (e.g., broadcast) from a CMTS to an external CM and/or other CMs (e.g., within user premises), thereby enabling subsequent registration by the downstream CMs 750 with the CMTS (e.g., as described with respect to FIG. 4A supra.

At step 704, if the CM is a DOCSIS 3.0-enabled CM, the CM receives a MAC Domain Descriptor (MDD) message from the CMTS once a downstream DOCSIS channel is acquired (via, e.g., the registration process noted supra). MDD messages inform the CM with which channels to bond, by relaying the downstream channel ID of the primary downstream channel for the CMTS sending the MDD message. In response, at step 706, the CM sends a B-INIT-RNG-REQ message on the first channel on which it initializes.

At step 708, a DORA (Discover, Offer, Request, Acknowledgement) process is initiated at the CMTS. More specifically, the CM sends a DHCP Discovery request to the CMTS, asking for IP information from any listening DHCP servers.

Figure 7A:
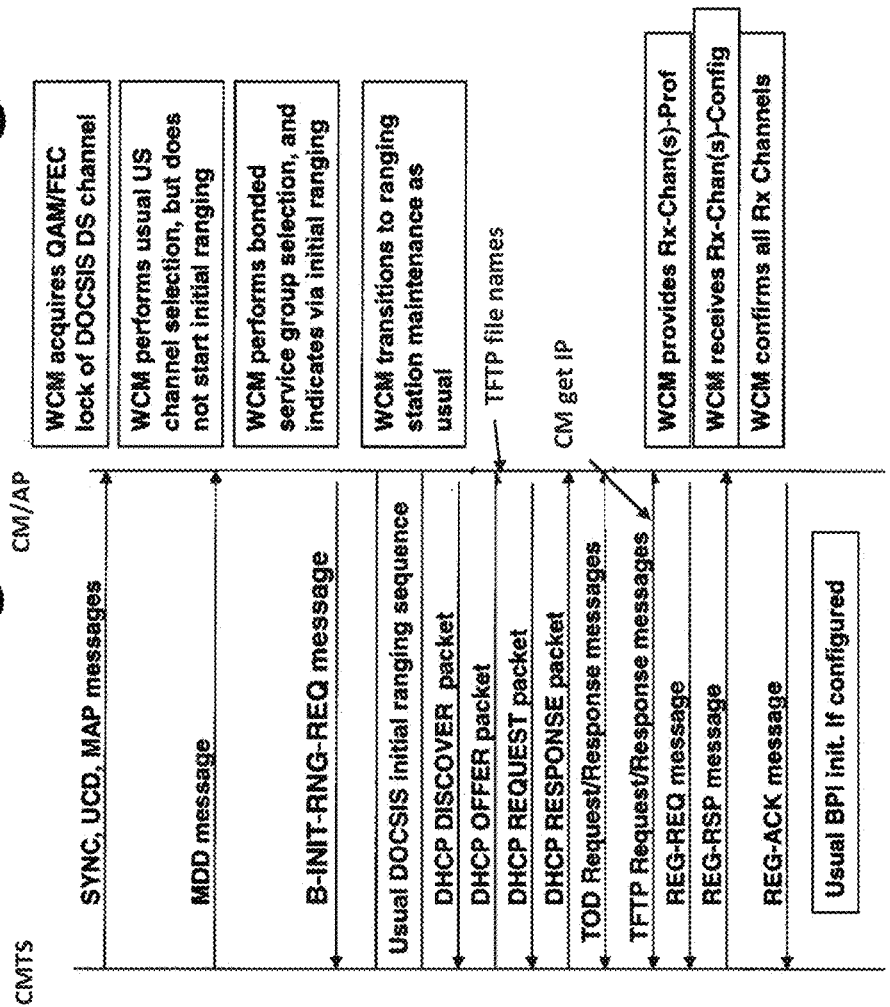
FIG. 7a is a flow diagram showing one prior art Discover, Offer, Request, Acknowledgement (DORA) process, useful with various embodiments of the present disclosure.

FIG. 7a illustrates one prior art Discover, Offer, Request, Acknowledgement (DORA) process. As shown, DHCP servers offer configuration information to the CM, including any IP information that would be necessary for the CM to connect to the server (see e.g., DHCP OFF packet). The CM selects the optimal offer, and requests to lease the corresponding DHCP server (e.g., DHCP server 752) (see e.g., DHCP REQUEST packet). The selected DHCP server 752 acknowledges the CM's request, and leases the IP configuration information (see e.g., DHCP RESPONSE packet), thereby providing the CM an IP address to enable an AP 754 or a client device 756 to access the network per step 710.

Once AP 754 receives the IP address, the AP begins transmitting its SSID(s). End users may see the SSID(s) on their client device 756, and select an appropriate SSID. In some variants, the end user must submit credentials, e.g., by authenticating with one or more authentication, authorization, and accounting (AAA) servers 758 of the network, before entering a browsing session. This flow process is repeated for each IP that needs to be assigned to AP 754 or to client device 756.

Figure 8:
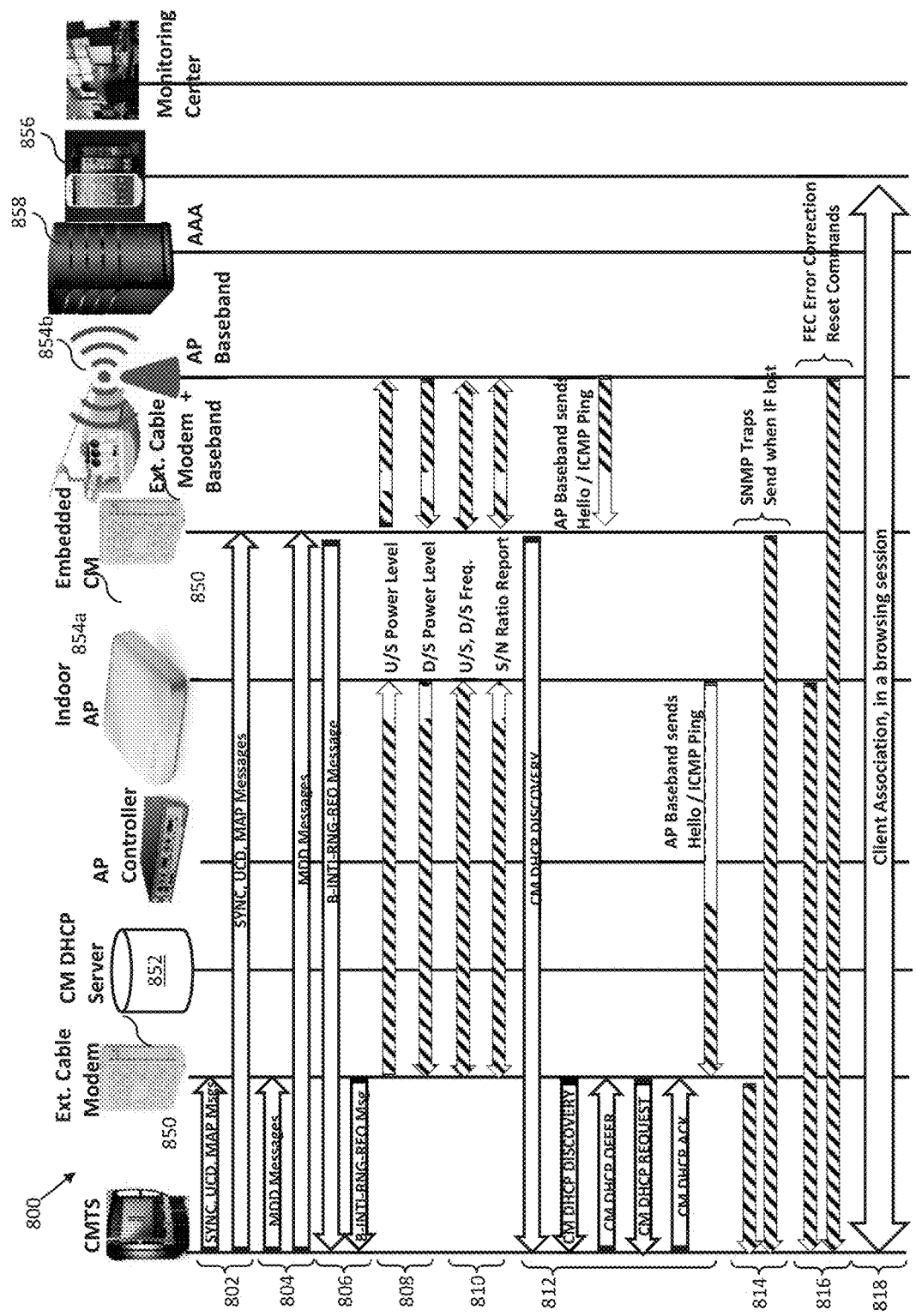
FIG. 8 is a flow diagram for configuring an IP address by a DHCP server to allow network access, useful with various embodiments of the present disclosure.

FIG. 8 is a diagram illustrating an exemplary inventive call flow 800; i.e., for configuring an IP address by a Dynamic Host Configuration Protocol (DHCP) server to allow network access to a client device. In an exemplary embodiment, at step 802, SYNC, UCD and MAP messages are transmitted (e.g., broadcast) from a CMTS to an external standalone CM and/or embedded CMs (e.g., within user premises, on an external outdoor pole installation, etc.), thereby enabling registration of one or more CMs 850 (e.g., as described with respect to FIG. 4A supra).

In some variants, a standalone CM is connected to a backhaul (via, e.g., coaxial or Ethernet connection) that is in turn in data communication with the MSO network, as well external networks such as e.g., the Internet. The standalone CM further is in data communication with one or more premises APs, such as via CAT-5 or similar cabling. Alternatively, an embedded CM may be integrated with the AP form factor, and additionally connect to the AP at the baseband module or baseband processor via an Ethernet port, such as shown in the architecture 600 of FIG. 6.

At step 804, an exemplary DOCSIS 3.0-enabled CM receives a MAC Domain Descriptor (MDD) message from the CMTS once a downstream DOCSIS channel is acquired (via, e.g., the registration process noted supra). In response, at step 806, the CM sends a B-INIT-RNG-REQ message on the first channel on which it initializes.

At step 808, CM 850 exchanges and/or synchronizes one or more upstream power levels and one or more downstream power levels with the AP(s) 854 (e.g., indoor AP 854a or outdoor AP 854b). In one embodiment, upstream power levels are measured by the CM 850 to determine, inter alia, maximum and minimum values for data transmission to CMTS. Downstream power levels are measured by the CM 850 to determine, inter alia, maximum and minimum values for data transmission downstream to the CM. In one variant, diagnostic services or software on the CM 850 monitors the upstream and downstream power levels to take action (e.g., modify or reject connection parameters) if a predefined power threshold is not met. In another variant, AP 854 accepts or rejects (i.e., considers unable to connect) a connection based on a value corresponding to the difference between the maximum and minimum values of power levels and/or available bandwidth.

At step 810, AP 854 receives and tracks upstream frequency and downstream frequency values via the CM 850. In some embodiments, the AP tracks a maximum and minimum boundaries (e.g., in Hz) of frequency values, and can optionally cause the CM to accept or reject a connection based on the boundaries. Signal-to-noise ratio (SNR) and received signal strength indicator (RSSI) may also be measured and/or adjusted. In some embodiments, the SNR must be above a predetermined threshold for the AP to accept or maintain a connection via the CM.

In some embodiments, AP 854 receives information that allows the AP to track whether the CM is locked into the appropriate channels and frequencies. Such information may include downstream channel ID (e.g., a non-parametric identifier associated with a given RF channel), downstream channel frequency, downstream received signal power, upstream channel ID, and upstream channel frequency. For example, the AP, after receiving information from the CM, may have information that reads: downstream channel ID=3; downstream channel frequency=403,000,000 Hz; downstream received signal power=0.0 dBmV; upstream channel ID=2; and upstream channel frequency=35,984,000 Hz. In some variants, the AP monitors all eight downstream channels and four upstream channels (e.g., if the CM is DOCSIS 3.0 enabled) or more (e.g., if the CM is DOCSIS 3.1 enabled), and may further communicate via heartbeats/responses. For example, such monitoring may include the ability of the downstream tuner to allow for reception of channels distributed across the downstream spectrum, either in groups or individually. Similarly, exemplary monitoring for an upstream transmitter configuration may include the transmitter's ability to access channels distributed anywhere in the upstream spectrum; failure of either of these criteria may indicate that the CM is not functioning properly (e.g., cannot tune to or transmit on all prescribed frequencies/bands).

At step 812, a discovery/handshake protocol (e.g., DORA or similar process) is initiated at the CMTS, as described with respect to FIG. 7 supra.

Once the DHCP provides the CM an IP address to enable the AP to access the network (see discussion supra), the CM's management interface must continue to function when pinged by an Internet Control Message Protocol (ICMP) Echo Request packet (e.g., by returning an ICMP Echo Reply). In one embodiment, the AP baseband module 604 sends an ICMP Echo packet, such as with a packet size greater than a prescribed value (typically e.g., 1,500 octets). As a brief aside, the packet size is administered and handled by the wireless controller and AP. Larger payloads may be handled with fragmentation and aggregation; for example, if a payload is 1,800 octets, the first frame may be truncated down to 1,500 octets with the remaining 300 octets appended to the next frame. Frames are application dependent (e.g., video clips, photos, etc.) and may span packet payload limitations.

The CM is further configured to, in the case where e.g., the bridge between the Ethernet port of the CM and another port (e.g., USB) is lost, to inform the AP 854, such as with "SNMP traps," at step 814. SNMP traps are alerts that enable significant events and issues to be reported to a managing entity; e.g., the AP. In some embodiments, the SNMP traps are transmitted to the CMTS alternatively or concurrently.

Likewise, in embedded applications, the (embedded) CM may be configured to notify the AP when the status of the Ethernet link between the embedded CM and the AP baseband device is lost.

It can be appreciated that CM 852/AP may be "disconnected" or unable to communicate with the CMTS or other entities of the MSO network (or distant entities such as web for any number of reasons, including a denial-of-service (DoS) or similar attack which occurs at a layer above the PHY of the CM/CMTS. In some such attacks, the CM and CMTS interoperate; however, the user's client cannot successfully negotiate and connect to e.g., a web server at the transport or other layers. Accordingly, in such cases, the exemplary embodiments of the CM herein are configured to continue operation to the extent possible; including response to SNMP commands from the AP baseband module, forwarding of traffic from the CM to the AP (and hence client), etc.

Moreover, in one embodiment, the AP baseband module is configured to send a reset command (e.g., command similar to docDevResetNow counterpart for the control center) within an SNMP message configured to remotely reset the CM (versus reset from the network side) via the AP/CM data layer.

At step 816, AP 854 measures one or more forward error correction (FEC) parameters to control errors in data transmission (e.g., bit error rate (BER), packet error rate (PER), cyclic redundancy check (CRC) failures, number of bits lost, number of bits sent, etc.) As used herein, the term "bit error" means a received bit at the CM or AP (or their respective controller interfaces), that have been altered due to noise, interference, distortion, bit synchronization errors, etc. As used herein, the term "bit error rate" means a number of bit errors per unit time per definition. As used herein, the term "bit error ratio" (also abbreviated BER) is a number of bit errors divided by the total number of transferred bits during a measured time interval. Both bit error rate and bit error ratio may be improved by one or more of: using a stronger signal strength, choosing a slower and more robust modulation scheme or line coding scheme, and/or applying channel coding schemes such as redundant forward error correction (FEC) codes.

As a brief aside, the bit error ratio (BER) is calculated by comparing the transmitted sequence of bits to the received sequence of bits and counting the number of errors. The ratio bits received in error compared to the total number of total bits received is the BER. Similarly, the packet error ratio (also abbreviated PER) is a number of incorrectly received data packets divided by the total number of received packets. A packet is declared incorrect if at least one bit is erroneous.

In one variant, the AP informs the CM of measured errors according to a prescribed abstract scale; e.g., ranging from 0 to 10. This information may be included for example in a message from the CM to the CMTS, e.g., to notify the CMTS of the performance of the link, that the FEC parameters require adjustment, etc.

At step 818, once AP 854 receives the IP address via the CM and begins transmitting SSID(s) via its (Wi-Fi) air interface, end users see the SSID(s) on their client device 856, and select the appropriate SSID and enters a browsing session or other type of operation as desired. In some embodiments, the end user must submit credentials, e.g., by authenticating with one or more authentication, authorization, and accounting (AAA) servers 758 of the network, before entering a browsing session. In one variant, the AAA server 858 is configured to provide services for, e.g., authorization and/or control of network subscribers for controlling access to computer resources or entitlements to access/receive protected content, enforcing policies, auditing usage, and providing the information necessary to bill for services.

In another variant, the Internet and/or other network services are only accessible by way of MSO-authorized client devices, or client devices running a downloadable application or "app" (comprising, e.g., an application programming interface (API) available from the service provider operating the AP).

The foregoing flow process may be repeated for each IP address that needs to be assigned to the AP 754 or to the client device 756. The AP continuously monitors network devices thereafter, e.g., by sending heartbeat signals to the CM and expecting response heartbeat signals. In various embodiments, the continuous monitoring process includes transmitting ICMP pings, looking for any SNMP traps and/or measuring FEC, as described supra.

In various embodiments, when the AP loses connectivity to the CM for any reason, the AP stops transmitting its SSID(s), so as to remove the AP from advertisement to prospective users. This suspension of SSID advertisement is conducted along with one or more of the self-diagnosis and/or self-healing functions described elsewhere herein (dependent on particular client premises configuration). Contrast the foregoing with the implementation corresponding to FIG. 7, where end users still see an SSID even when the AP has lost connection with the CM and the rest of the network. In the latter case, a user may select the SSID hoping to access the Internet but cannot since the AP is disconnected from the backhaul. The end result is a frustrating experience for the end user (as well as any technicians) who sees the SSID yet cannot identify and rectify the downed device or connection.

Wireless Network Fault Scenarios and Solutions

Figure 9:
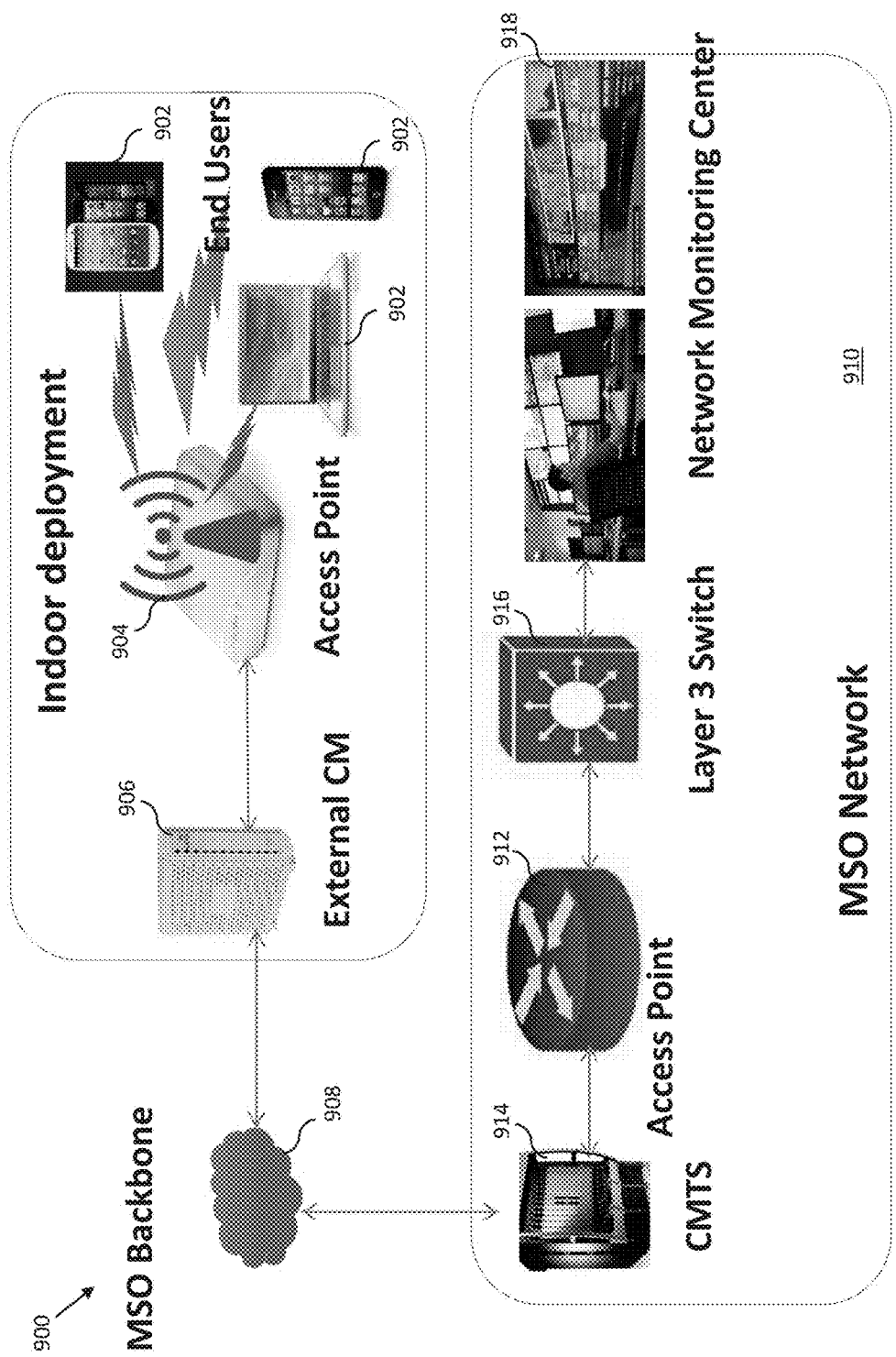
FIG. 9 is a graphical representation of an exemplary wireless network deployed indoors.

FIG. 9 illustrates an exemplary configuration of a wireless network 900 deployed indoors. The illustrated configuration represents an end-to-end view of the wireless network accessible by a client device 902 via, e.g., Wi-Fi, when all network devices are in proper working condition. In the exemplary configuration, end users access the wireless network by connecting with an access point 904 via their client devices 902 (laptop, smartphone, tablet, etc.). One or more APs 904 advertise their SSIDs, which an end user may select to connect to the AP(s) on one or more of the client devices 902.

In an exemplary variant, the AP is in data communication with a cable modem 906 within the indoor premises. The CM, in turn, connects to an external source of data via coaxial cable, Ethernet and/or other wired means of accessing the cable network to which the end users are subscribed. In other variants, the AP may be connected to another AP (e.g., range extender) before the other AP is connected to the CM, or the CM may be connected to multiple APs within the premises, but the APs are not directly connected to each other. Moreover, a router (not shown) may be present to manage and connect multiple APs to the same CM or multiple CMs to the same data source (e.g., one coaxial port connected).

In another implementation, the CM may communicate (via wireline or wirelessly) to multiple APs, and/or the CM may act as a router. As can be appreciated, numerous configurations exist to connect the end user to the network, each of which can benefit from one form or another of the functionality described herein, the exemplary configuration of FIG. 9 being merely exemplary.

The traffic exchanged within the configuration of FIG. 9 is supported by the backhaul or backbone portion 908 of the service provider network, which operates to connect local network devices (e.g., the AP 904 and CM 906) with the edge and ultimately the core of cable network as described elsewhere herein. In various embodiments, the MSO network includes various backend apparatus and services, including but not limited to one or more AP controllers 912, CMTS 914, Layer 3 switch 916, and network monitoring center 918. These apparatus and services operate to enable data transmission to and from the end user as described elsewhere herein, e.g., with respect to FIG. 3.

Figure 9A:
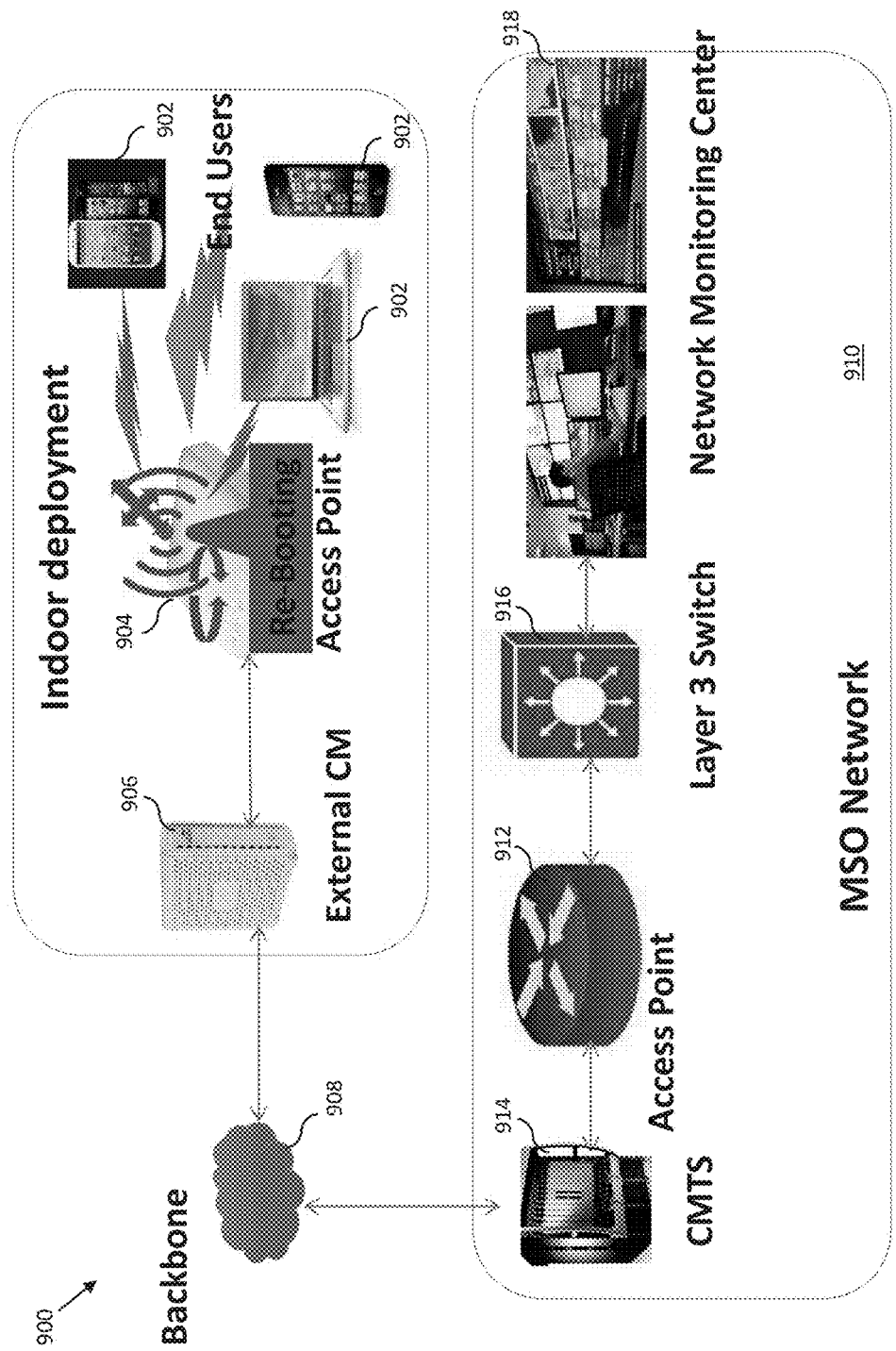
FIGS. 9A-9D illustrate various potential fault scenario occurring within the exemplary wireless network of FIG. 9.

FIG. 9A illustrates a first fault scenario occurring within the network 900 of FIG. 9. As shown in this scenario, AP 904 becomes disabled for any of various reasons (due to "locking up" within the software running on the CPU, component failure, overheating, ongoing firmware update, maintenance, physical disconnection from the network, etc.), or continues to reboot itself continuously.

During the AP reboot process, the AP does not broadcast its SSID(s); thus, the end user cannot access the wireless network. In this scenario, the end user does not receive much information about where the fault or disconnection lies and what caused the fault. However, once the AP is rebooted, the end user may reconnect to the AP and resume browsing activity if the reboot is successful (i.e., addresses the root issue of the failure). In a continuous reboot situation, no connectivity between the STA (client) and AP will be established, and the user will be provided with e.g., a "connection failed" message by their client indigenous wireless management software/process.

Figure 9B:
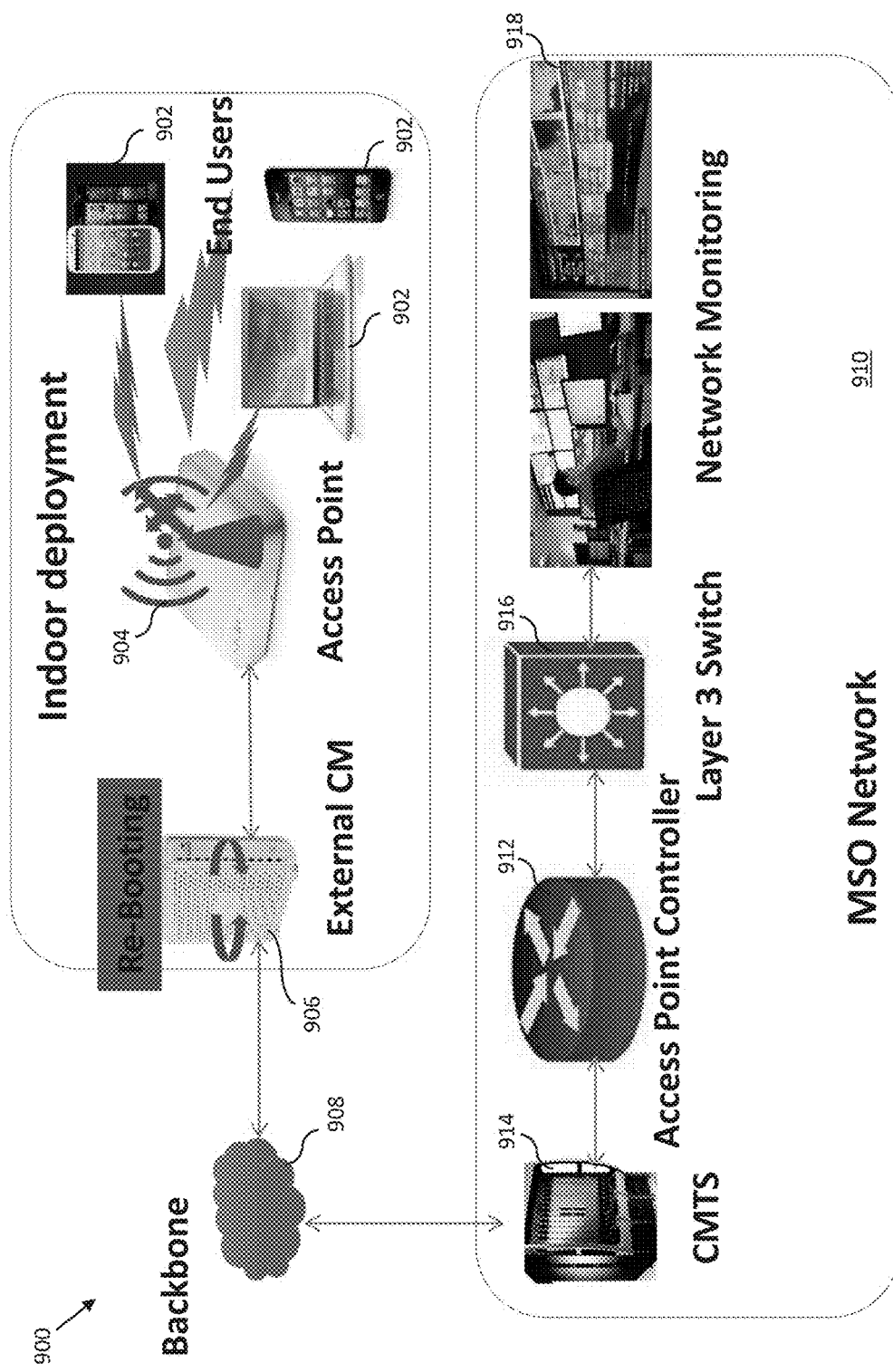

FIG. 9B illustrates a second fault scenario in the context of the exemplary wireless network of 900 of FIG. 9. In this scenario, the CM 906 becomes disabled (similarly due to e.g., software lock, component failure, overheating, firmware update, maintenance, physical disconnection from the network, etc.) or unable to provide data connectivity for the AP 904 due to continuous rebooting. There is no fault in the AP, but rather the AP's "pipe" to the MSO network has failed; however, to users, there is a loss of service similar to that experienced in the scenario of FIG. 9A (with the exception that the AP continues to broadcast its SSID in the scenario of FIG. 9B).

Figure 9C:
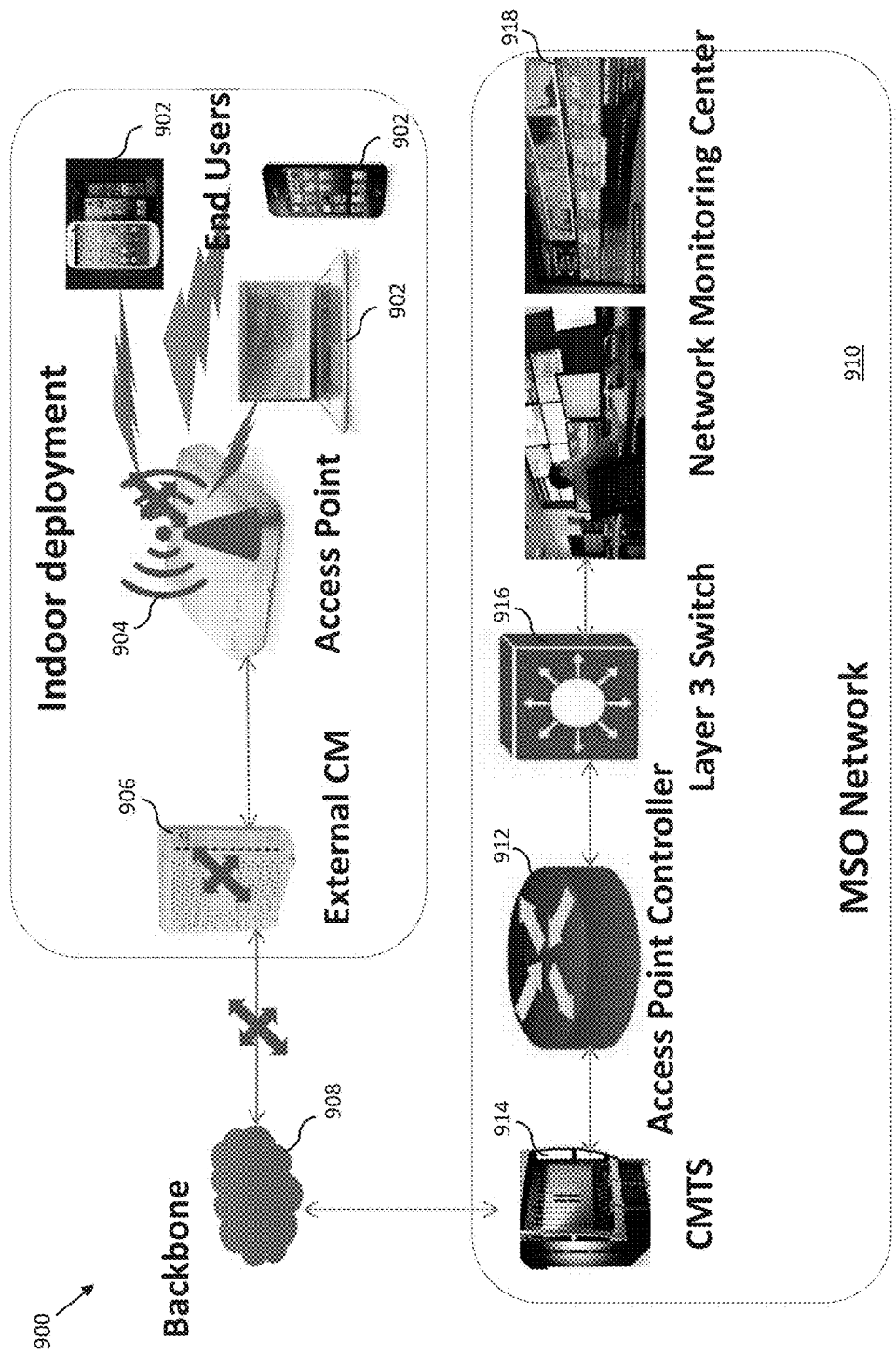

In the scenario of FIG. 9C, the CM 906 has lost connectivity to the MSO or service provider backbone network 908, such as due to cable disconnection, cable fault or severance, failure of a the user's premises interface to the local distribution node (e.g., bad switch), etc. The AP and CM operate, with the exception that the user has no connectivity to the MSO network, since the CM cannot acquire the proper RF channel(s) for transmission/reception.

Figure 9D:
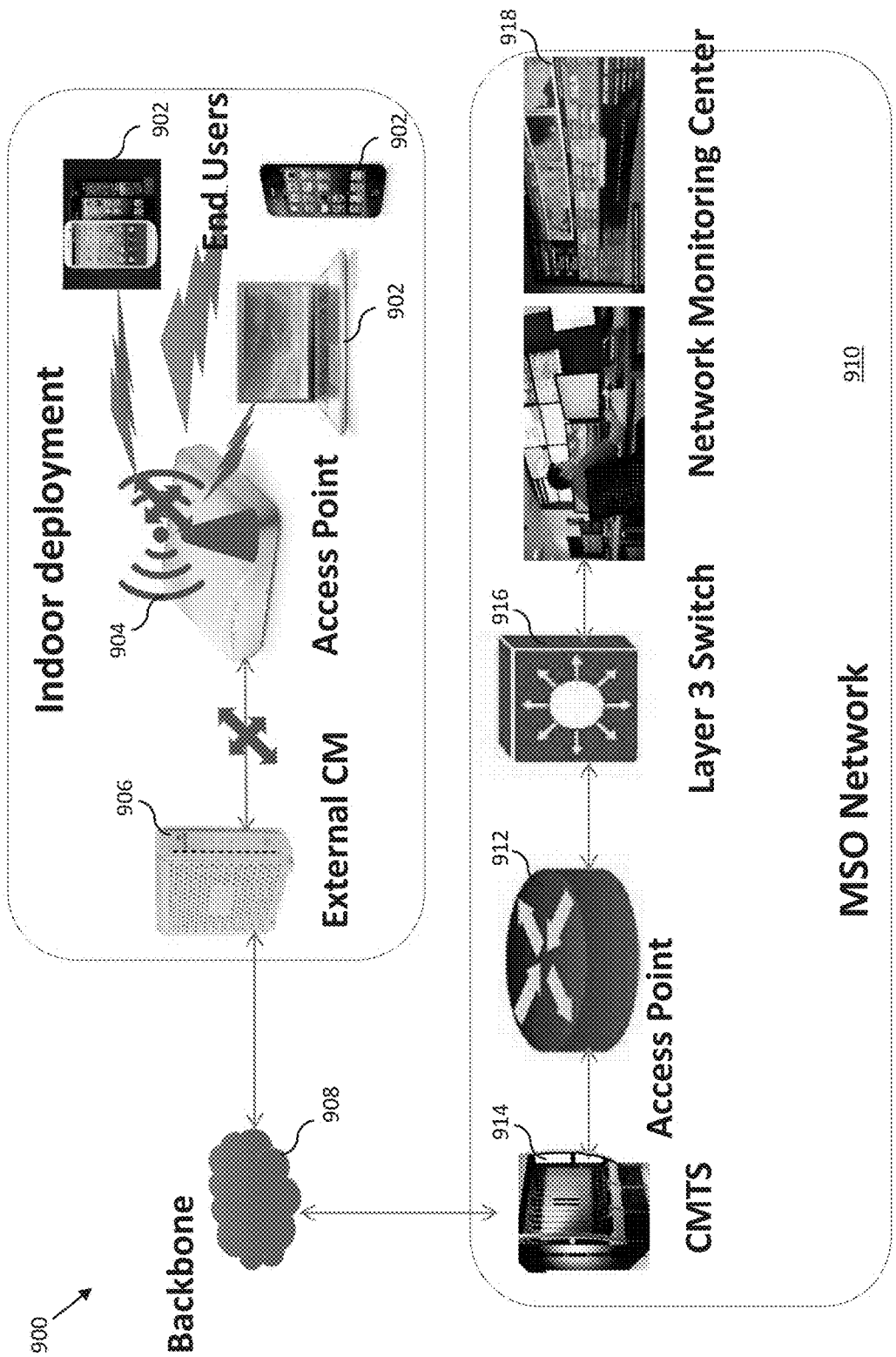

In the scenario of FIG. 9D, the AP 904 operates and broadcasts its SSID as normal; yet, the connection between the CM 906 and AP has been lost (e.g., unplugged, severed, etc.). For instance, one common issue is failure of the relatively fragile retaining mechanism on Ethernet/RJ45 connectors which may be used to interface the CM to the AP in some installations. The CM operates properly and has no faults, and the AP has no faults and operates properly other than providing no connectivity for the end user to the MSO network.

Figure 10:
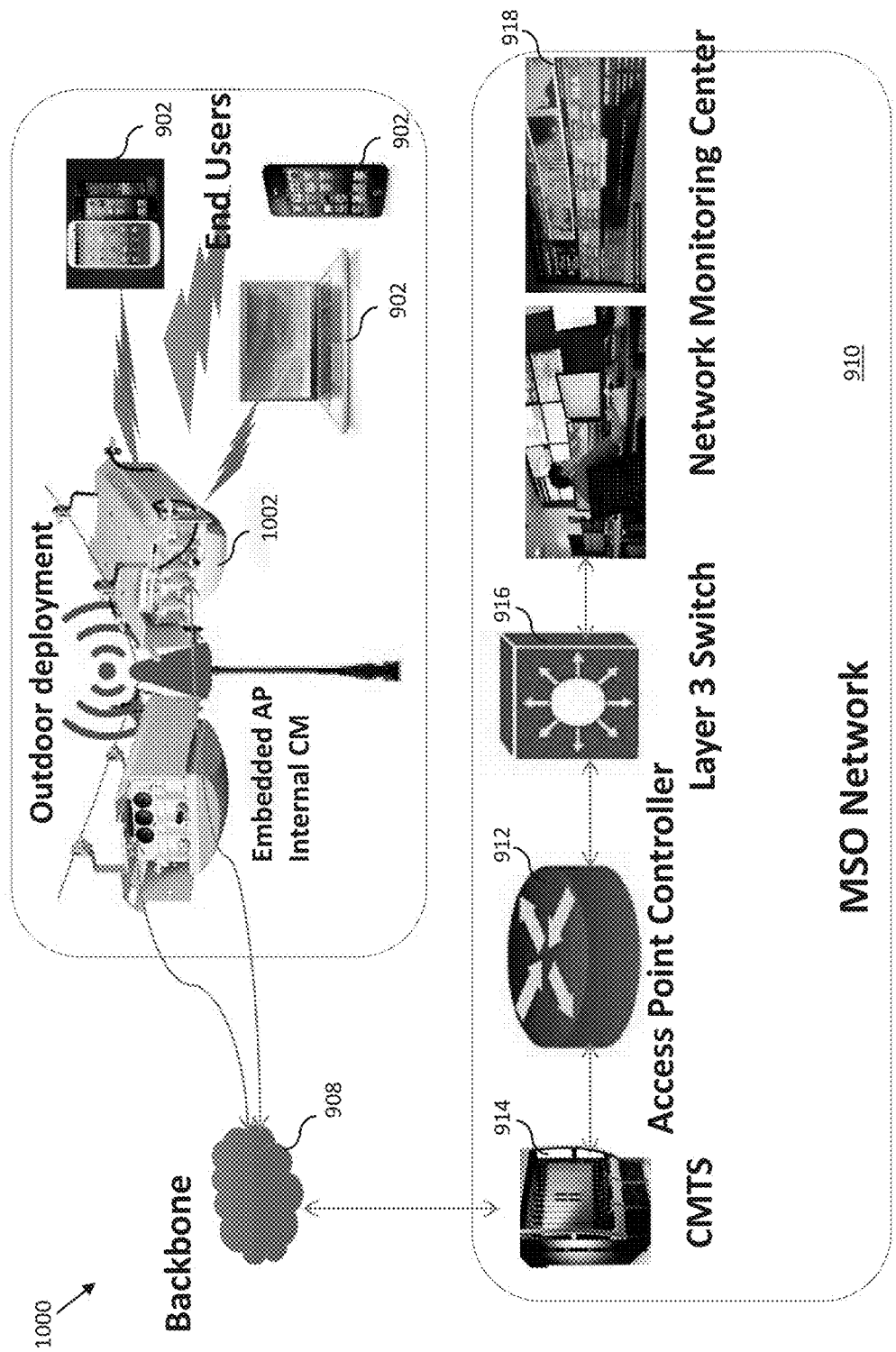
FIG. 10 is a graphical representation of an exemplary wireless network deployed outdoors.

FIG. 10 illustrates an exemplary configuration of a wireless network 1000 deployed outdoors. The illustrated configuration represents an end-to-end view of the local wireless network accessible by a client device 902 via, e.g., Wi-Fi, and upstream components when all network devices are in proper working condition. In this configuration, end users access the wireless network by connecting with an embedded access point 1002 via their client devices 902 (laptop, smartphone, tablet, etc.). Moreover, the traffic exchanged within the network is supported by the backhaul or backbone portion 908 of the MSO/service provider network, as is described with respect to FIG. 9, supra.

In one configuration of the embedded AP 1002, the AP is integrated with a cable modem (CM). Although a device may have both an AP and a CM within its chassis, the AP and CM may be separate logical entities. Multiple APs may also be integrated with the CM. Each embedded AP may include omnidirectional antennae as illustrated in FIG. 6, such as for providing a wide azimuthal coverage, and to support a large number of client devices which may be within range. One or more embedded APs 1002 advertise their SSIDs, which an end user may select to connect to the AP(s) via one or more client devices 902.

In another configuration of the wireless network 1000, multiple embedded APs 1002 are deployed at the same "tower" configured to broadcast their services to client devices 902. Data connectivity may be congregated at the tower (e.g., coaxial cables running along a bundle connected to the tower), while embedded APs are placed at relatively separate locations, thereby enabling more widespread network coverage (depending on the venue). For example, a baseball stadium may require multiple embedded APs or even multiple consolidated towers, each stationed at intervals around the stadium.

Figure 10A:
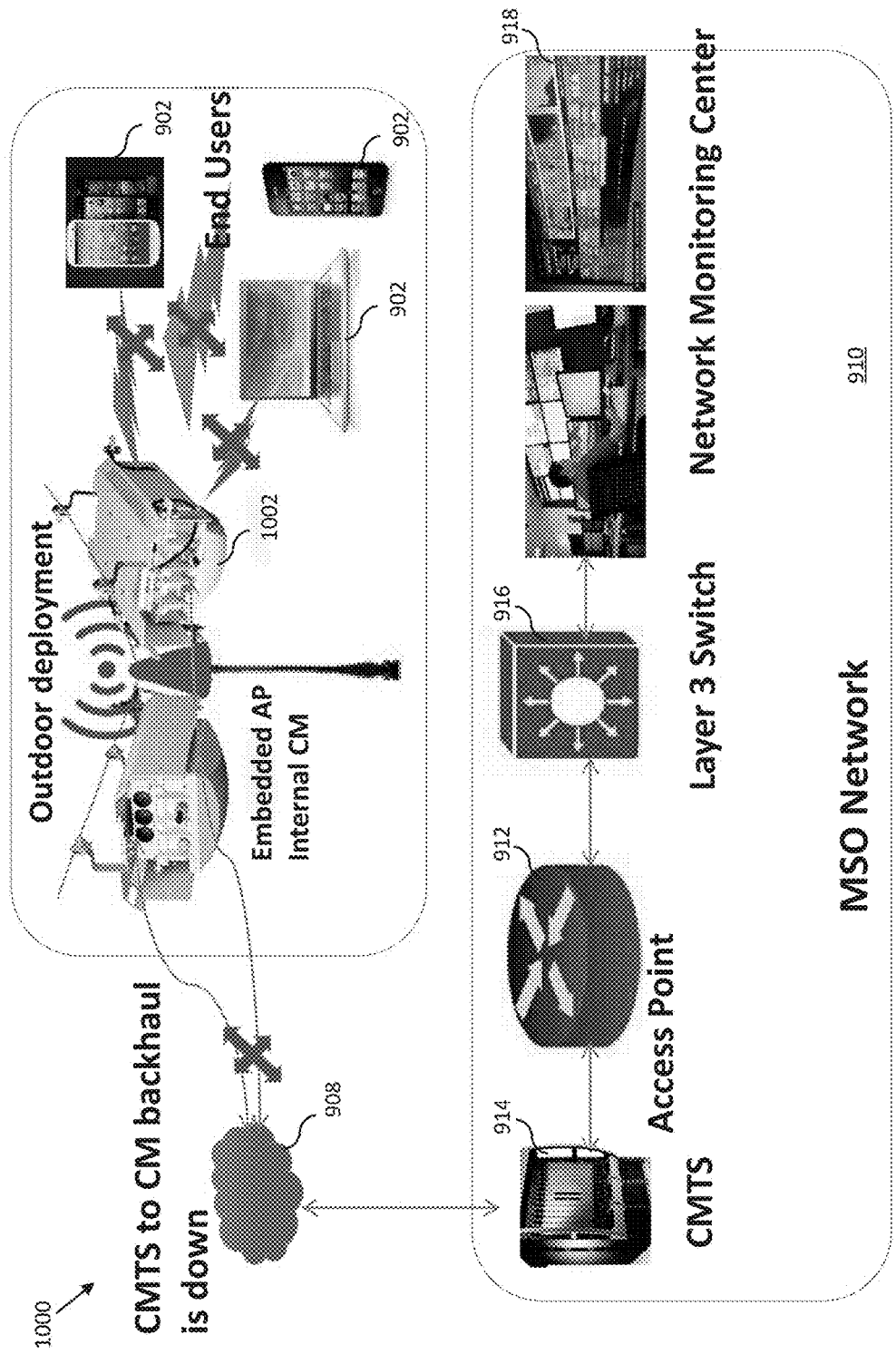
FIGS. 10A-10B illustrate various potential fault scenarios associated with the network of FIG. 10.

Referring now to FIG. 10A, an exemplary fault scenario is shown occurring within the wireless network 900 illustrated in FIG. 10. In this scenario, the backhaul link between the backbone 908 and the embedded AP 1002 (particularly its CM) is disconnected; i.e., the end users of the AP detect that they cannot connect to backbone 908 of the cable network via the CM, but otherwise have no visibility into the fault. The SSID continues to be broadcast from the AP(s), since the AP is operating normally (other than having no connectivity).

Figure 10B:
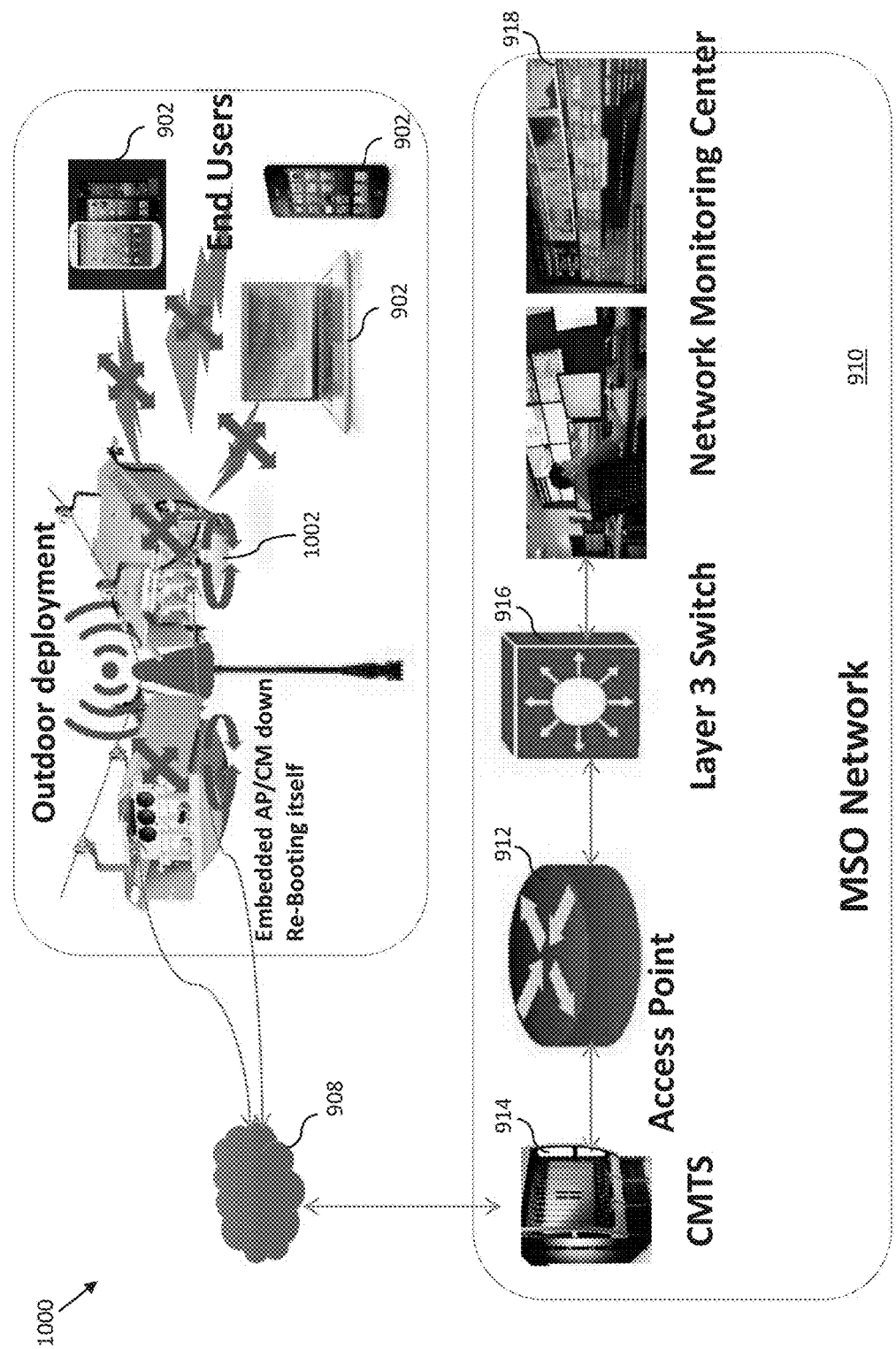

In the scenario of FIG. 10B, end user connectivity via the AP is lost due to one or both of the embedded APs failing, and/or continuously rebooting. During reboot, service is interrupted and the connection between the user device (e.g., Wi-Fi "STA" or station) and the AP is lost. The user is informed that the connection to the AP has failed, but no other information is available.

Once the embedded AP 1002 has rebooted and recovered, the CM and the AP may remain disconnected from each other, such as due to loss of assigned network address (e.g., IP address) by the AP during reboot. In such cases, the SSID may not transmit its SSID to the local wireless clients. More directly, the SSID is not transmitted unless there is end-to-end connectivity with the broader network; this reduces user confusion (i.e., prevents the user from connecting with an SSID that "goes nowhere") Alternatively, the SSID may be transmitted by the AP, and the clients will recognize it; however, no connection to the MSO network is enabled since no IP address has been assigned, and the client cannot negotiate with any distant entities (via the AP/CM) without such address.

Other potential failure scenarios include, without limitation where (i) the AP continues to send repetitive heartbeat alarms to the AP controller of the MSO network for an extended period of time when an issue is encountered (indicating a persistent issue upstream e.g., an unavailable controller, a loss of connectivity to the backhaul, etc.); (ii) logical communication (e.g., communications session) between the AP and the AP controller is lost; (iii) the AP is operational and connected to the CM and MSO network, yet individual users are disconnected or cannot connect initially; (iv) the AP controller indicates authorization failure for multiple clients (i.e., they cannot log in); and (v) multiple APs fail to establish sessions with a common AP or respective APs in logical arrangement with one another (e.g., via controller access concentrator).

Methods

Figure 11:
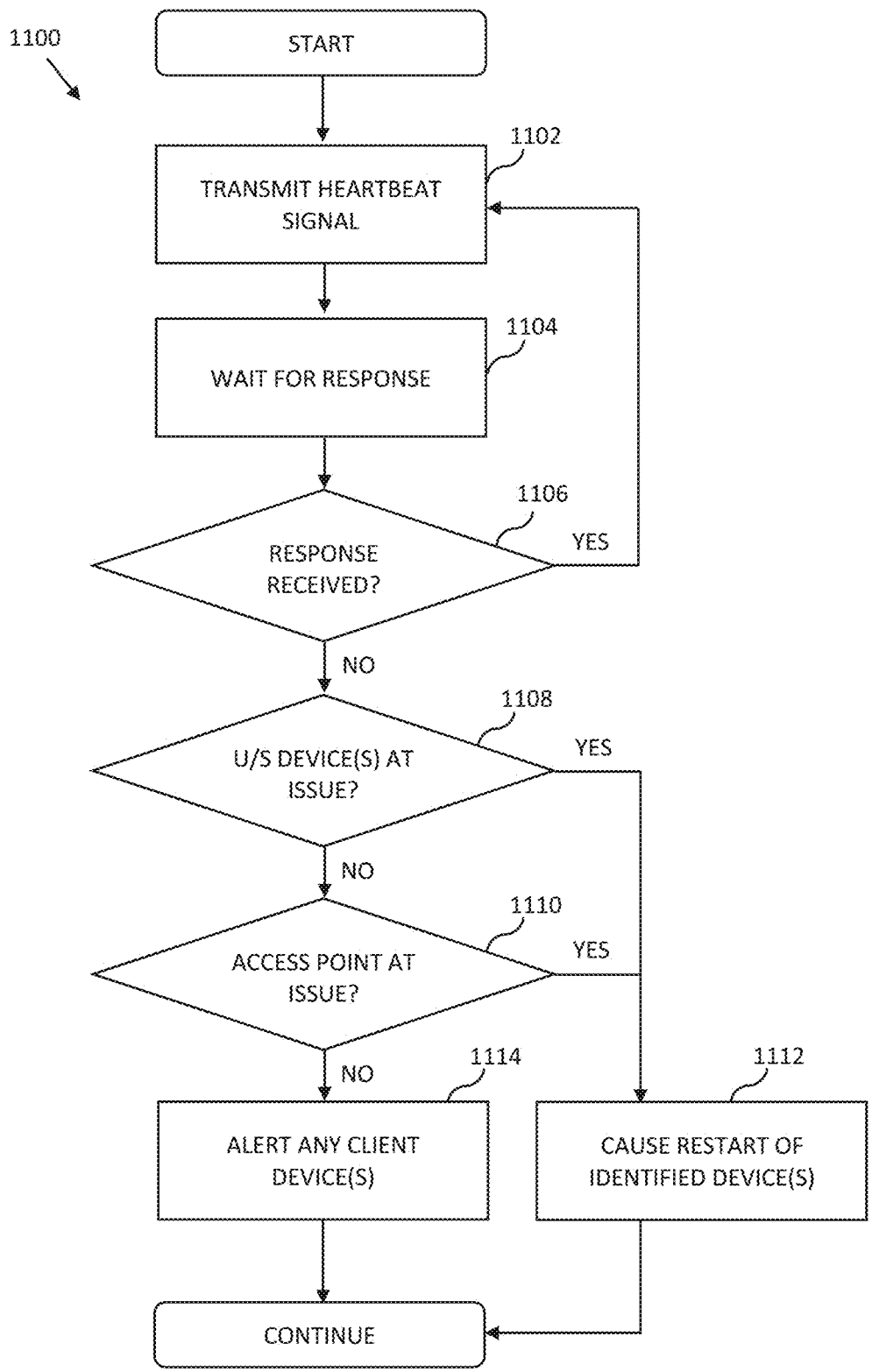
FIG. 11 is a logical flow diagram of an exemplary method for an access point to monitor a wireless network and restore network access to client devices.
Figure 12:
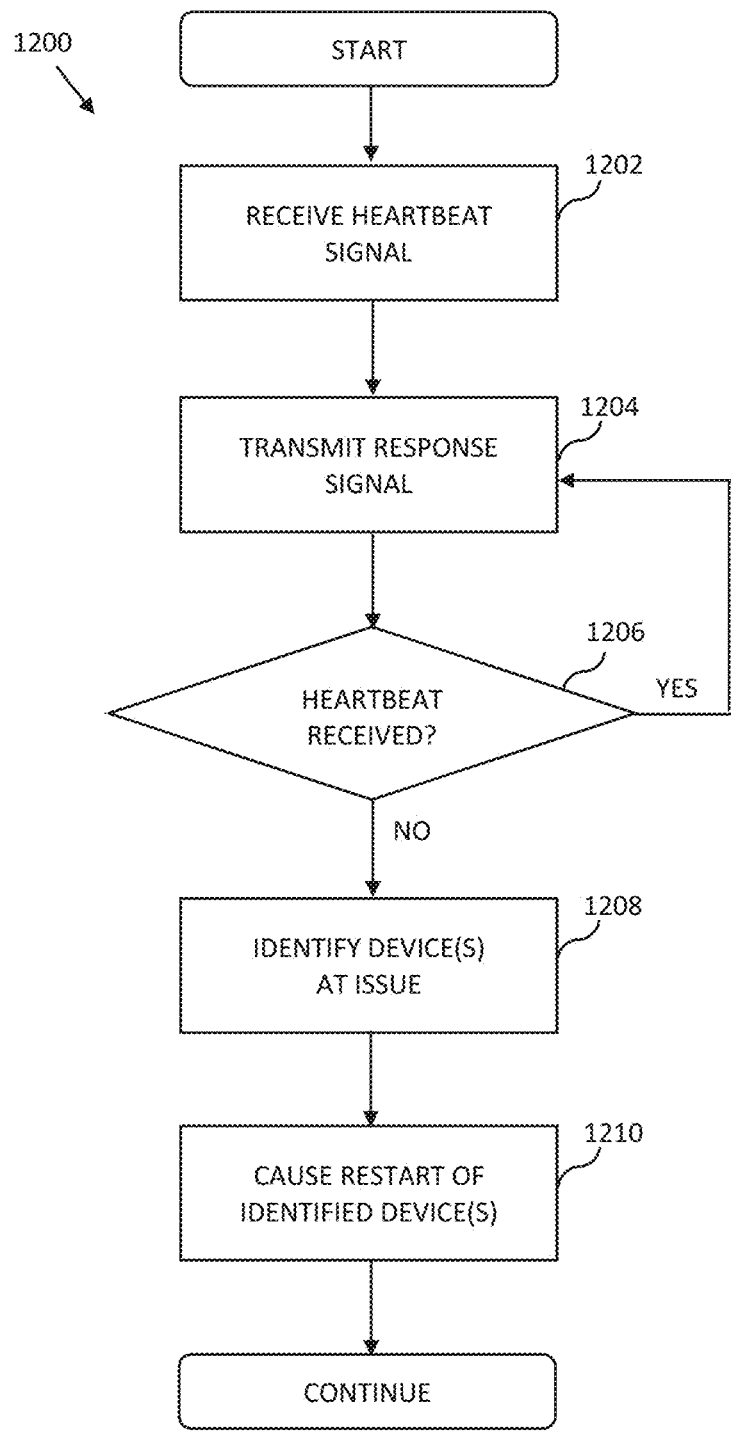
FIG. 12 is a logical flow diagram of an exemplary method for an upstream network entity to monitor a wireless network and restore network access to client devices.

Various methods of addressing the foregoing faults or failures within the network according to the present disclosure are now described with respect to FIGS. 11-12.

FIG. 11 illustrates an exemplary embodiment of a method 1100 implemented by an access point to monitor a wireless premises network, and restore network access to client devices. The wireless network useful with method 1100 is not limited to those embodied in FIGS. 2 and 3 herein, and may be used with any wireless-enabled client device and any architecture utilizing data communication among nodes.

At step 1102 of the method, the AP transmits one or more heartbeat signals. Specifically, heartbeats are sent to one or more upstream network entities in data communication therewith, e.g., cable modem, any backhaul entities (e.g., data centers), AP controller, CMTS, etc. In one variant, the heartbeats comprise preformatted messages addressed to the target devices/entities that are configured to elicit a reply or "ack" from the entity after receipt. In the exemplary embodiment, the heartbeats are transmitted according to a periodic or aperiodic temporal schedule; i.e., a heartbeat is sent at every predetermined interval (which may or may not be equal, and/or predicated on the occurrence of an event). In one variant, where multiple devices are targeted, the periodic heartbeats are staggered so as to be delivered to each targeted upstream device in a prescribed order. For example, four heartbeats may be sent at every given interval: one to the CM, one to a data center, one to the CMTS, and one to the AP controller, in that order.

Alternatively, in a different variant, the AP may only send heartbeats to the nearest upstream device, such as the CM 906 in FIG. 9, so that any troubleshooting process is limited to the premises.

In another variant, the pulse intervals are spaced such that any expected response signals are received before the next round of heartbeat signals (i.e., within a receive "window" of time). On the other hand, the AP may send heartbeats independently of receiving response signals, whether periodically or otherwise; i.e., in an asynchronous fashion. The AP may adjust accordingly depending on the number of devices and any significant latencies on the network.

In another variant, the periodic signals are sent at a predetermined interval that may be modified by the AP. In a different variant, the signals are sent at intervals depending on network conditions, e.g., traffic load, number of expected pings, expected network conditions (e.g., known offline connections in the network), size of network, time of day (e.g., peak hours). For instance, pings are sent at relatively longer intervals during peak times to keep traffic from being congested.

In another variant, the received signals include at least one unique identifier. The unique ID may be a value (formatted in alphanumeric, hex, binary, etc.) that identifies the originating AP as well as the destination or target. In one implementation, the unique ID values are associated with or derived from known values, such as MAC address or IP address assigned to the AP and/or the controller. In another implementation, the MAC address or IP address itself is the identifier. The transmitted signals (and return signals) may also include time stamps, such as those associated with and assigned by the underlying transmission protocol, indicating e.g., (system) time of transmission, time of receipt, etc. Such timestamps can be useful in determining propagation delays, including whether a responding entity in fact responded within the prescribed window. For example, a responding entity may transmit a heartbeat response within the prescribed time window, yet the response may not actually be delivered to the issuing entity (e.g., AP) within the window due to packet queuing, buffering, and/or propagation delays within the network infrastructure.

In another variant, rather than continuously monitoring the network, the AP transmits heartbeat signals upstream only when the AP determines that some anomaly (e.g., timeout, retransmission request, etc.) has been received or occurred.

At step 1104, the AP waits for a response from the upstream device(s) to which the heartbeats were transmitted. A response signal indicates to the AP that the initial heartbeat was acknowledged by a target device, and presumably that the connection between the recipient device and the AP is in working condition. A response signal that is absent when expected within a period of time may indicate a possible issue with the device to which the heartbeat was sent (or such problem may reside within the AP or the client device, as described below).

In another embodiment, a lack of response within an expected time does not necessarily indicate that the network has lost connectivity, but rather may have experienced some level of performance degradation (e.g., bottlenecking in one process or another) or other situation wherein normal operation is not achieved. As discussed further below, there may be several levels of expected thresholds or ranges of time; such different thresholds or criteria may also be correlated with different types of component problems or failures, so as to aid in identification of the root cause.

Moreover, an upstream device may send a preemptive notice that it is or will be entering a temporary downtime.

At step 1106, the AP determines whether an expected response signal was acceptable (e.g., received within the expected time, carries an acceptable timestamp, receives an "ack" issued by a proper entity, is a notice or alert that tells the AP that the device has gone offline; e.g., lost connection to devices upstream of the responding device, or that the device will go offline for maintenance, etc.). If a response was received and is acceptable, the AP returns to step 1102. If a response was not received, the AP stops transmitting its SSID(s) (so as avoid advertising an inoperable service), and proceeds to step 1108. In another embodiment, the AP continues to advertise its SSID(s) while attempting to diagnose or rectify the issue.

At step 1108, the AP identifies any upstream device(s) at issue. The target device may be offline, malfunctioning, going through a maintenance or reboot process, undergoing firmware update, or the connection between the AP and the upstream device may have been throttled or severed (thus, the heartbeat itself was not likely delivered to the CM). In one embodiment, the identification of the upstream device(s) is based on a unique identifier included with the original heartbeat signal, as described supra with respect to step 1102. For example, if an AP sends four heartbeat signals having ID=01, 02, 03, 04, and response signals corresponding to only ID=01, 02, 04 are received, it may be deduced that the upstream device that received (or should have received) the heartbeat signal containing ID=03 is at issue.

In another embodiment, the AP may make a time-based determination as to which device may be down. For example, the AP may expect a return signal to the CM to take 75±50 milliseconds, a reasonable ping latency that accounts for e.g., occasional traffic spikes. In some variants, the transmitted signal from the AP contains a descriptor that specifies the expected response time, which may be significantly longer a reasonable ping latency, so as to e.g., let the responding entity (here, the CM) schedule the reply in with other traffic, such as where the CM logs the time of receipt of the initial message from the AP, and issues a reply carrying a timestamp within the expected window, yet does not transmit the reply until later according to its scheduling. The AP, upon receiving the timestamped reply, evaluates the timestamp and notes that the timestamp falls within the expected window (even though the reply was not physically transmitted until a later time).

In one embodiment of the method 1100, if the AP does not receive an acceptable response, the AP determines that the target device (e.g., CM) is at issue and initiates a reboot, diagnosis, etc. of the CM, as discussed elsewhere herein. It will be appreciated, however, that the AP (or its proxy) may invoke a "tiered" response, depending on a scoring or other evaluation of performance. As a simple example, assume that the AP expects a return ping to take 75±50 ms. If the return signal is received within 75 ms, the upstream status is normal. If the return signal is received within 125 ms (75+25), the upstream device (e.g., CM) is flagged as a potential device at issue. If the return signal is received but within an unreasonable time, such as 1000 ms, the AP only then actively investigates the upstream device by, e.g., performing diagnosis, requesting or determining power level readings, adjusting a frequency, determining a signal-to-noise ratio.

Alternatively, in one implementation, the AP may initiate a reboot of the CM based on a lack of/unacceptable response, even though the CM may be online and exchanging traffic (i.e., in the absence of any other indicia of problems).

In another variant, the AP requires multiple repeated violations of the expected threshold ping timing (or other acceptance criteria) to determine the appropriate response as described above.

At step 1112, if the AP determines that an upstream device is offline, it transmits a reboot signal to the identified device to attempt to restore the network connection to the client devices.

If the AP determines that the upstream premises devices (e.g., the CM in the example configuration of FIG. 9) are in proper working condition, or if the AP cannot determine any upstream devices at issue, the AP proceeds to step 1110. At step 1110, the AP checks its internal status (e.g., based on Example Operation 2, infra) to determine whether the AP itself is a source of the problem(s), and/or whether a client device is lacking authorization.

At step 1112, if the AP determines that it is responsible, it begins a self-reboot process to attempt to restore the network connection to the client devices.

At step 1114, if the AP determines that none of the upstream devices nor the AP itself are problematic, yet the client device is unable to access the network, the AP attempts to alert the end user by sending a message to any known client devices (e.g., currently or previously connected with the AP, currently in range of the AP). In one embodiment, the message simply informs the end user that there may be a malfunction with the client device. The message may suggest user-friendly solutions, such as recommending a restart of the device or trying to connect with another available device. In another embodiment, if the issue is determined to be a lack of authorization, the message may suggest providing proper user credentials (e.g., attempt to log in again) to see if the connection restores.

FIG. 12 illustrates an exemplary embodiment of a method 1200 for an upstream or backend network entity to monitor a wireless network (and attempt to restore network access to client devices). The backend network entity includes devices that are outside of the user's premises; i.e., between the cable modem and the communication destination (e.g., Internet access or backhaul within the MSO network). In one exemplary embodiment, the upstream network entity is a controller (e.g., AP controller 912). In other embodiments, the upstream entity may be, e.g., the CMTS 199. As with the method 1100 above, the wireless network useful with method 1200 is not limited to those embodied in FIGS. 2 and 3, and may be used with any wireless-enabled client device and any architecture utilizing data communication among nodes.

At step 1202 of the method, the controller receives one or more periodic signals (e.g., pings, heartbeat signals, probing signals) from one or more downstream network entities (e.g., an AP). The controller is configured to expect the periodic signals and, in response, return one or more corresponding signals (responses). In one embodiment, in order to assist in troubleshooting (e.g., step 1208), a log is kept to record all instances of receipt and acknowledgement of the received signals, along with timestamps.

In one variant, the periodic signals are received at a predetermined interval that may be modified by the AP and/or the controller. For example, the AP controller may instruct corresponding APs which it is monitoring to transmit heartbeats at different staggered times or periodicities, e.g., in a round-robin or other fashion so as to mitigate arrival at the same time (e.g., the AP controller being flooded by numerous signals simultaneously).

Various schemes for timestamping and device identification described above with respect to FIG. 11 may also be used consistent with the method of FIG. 12.

At step 1204, the controller responds to the heartbeat by transmitting a signal to the originating downstream device (e.g., the AP). The response signal may be sent back to the originating device immediately or according to an indicated response time (e.g., as described above with respect to FIG. 11). For example, the AP may send a heartbeat signal that includes a time limit (e.g., 3 seconds), and the responding AP controller may "de-prioritize" such response in favor of another that allows less time.

In another embodiment, the controller begins at step 1204 rather than step 1202. That is, the controller may act similarly to the AP as discussed with respect to FIG. 11; i.e., it may function as an originating device from which heartbeat signals and reboot signals originate. In one such embodiment, the controller may reset upstream or downstream devices, as well as itself, using similar methodologies as those used by the AP, e.g., transmit heartbeats, wait for a response, determine acceptability of the response, identify devices at issue, and cause remote restart of identified devices (or other diagnostic or remedial action). In some variants, the initial signal (or the response signal in the prior scenario) may comprise a notice or alert that tells the AP that the controller has gone offline (e.g., lost connection to other backend devices) or that it will go offline for maintenance, etc. Such notification is a preemptive measure that indicates to the AP that any ensuing downtime is not to be cause for invoking the self-healing processes described herein.

In another embodiment of the method 1200, the transmitted heartbeat includes instructions regarding addressing of the response signal. The instructions may contain identification information, such as an IP address, MAC address, relative address, a recognized unique ID, URL, etc., and may not correspond to the (heartbeat issuing) device. An AP controller (or AP) would typically send and acknowledge a response signal at the same network location or address. However, the AP may prefer to collect response signals at a proxy entity (e.g., processing-heavy entity, such as a root AP that manages several mesh APs (see FIG. 2)). In such a case, the responding device (e.g., AP or controller) transmits the response signal according to the instructions.

At step 1206, if the controller expects another heartbeat (e.g., controller and AP are configured to exchange signals regularly, initiated by the AP), the controller determines whether the heartbeat was received. If it was received, the controller returns to step 1204 to acknowledge the received signal and send a response signal, as appropriate. If not received, the controller proceeds to step 1208.

At step 1208, the controller seeks to identify which downstream device, if any, is offline. In one embodiment, the controller evaluates the unique identifier associated with the heartbeat signals that stopped arriving at the controller, such as via previously received signals before cessation. The controller may use a log that has collected the instances of receiving the signals to track any abnormalities or discrepancies. For example, an expected heartbeat signal having an ID=05 may no longer be received. This would signal to the controller that there is a potential issue with the downstream device associated with ID=05.

In another embodiment, the controller may make a temporal or other determination as to which device in the downstream "chain" of addressable device may be down. For example, the controller may stagger responses and accordingly expect a signal from a given target device to arrive according to its prescribed schedule (e.g., periodicity). Receipt by the controller of signals associated with the first inline downstream device (e.g., CM), yet no others, may indicate a fault on any portion of the downstream network that is downstream of the CM input (i.e., the CM to AP connection may be bad, the AP itself may be bad, etc.). Likewise, the controller can "cascade" signals, such as where communication is established between the last device in the chain (e.g., the AP), and upon failing to receive signals from the AP, the next device in the chain is targeted for a ping/reply test, and so forth. In this way, the controller can work itself back up the chain in an attempt to identify the fault.

If the controller determines that if a subsequent heartbeat signal is never received (e.g., based on the foregoing methods), determined by e.g., waiting for an expected downstream signal for an unreasonable time or other acceptance criteria, the controller implements further diagnostic action; e.g., requesting or determining power level readings, adjusting a frequency, determining a signal-to-noise ratio, actively pinging the device, etc.

At step 1210, if the controller determines that a downstream device is ostensibly offline, the controller initiates one or more corrective actions, such as a reboot of the downstream device by, e.g., transmitting a reboot signal to attempt to restore the network connection to the client devices. Note that the corrective actions (e.g., reboots) may also be invoked in a cascaded or sequenced fashion; e.g., CM first, then AP, etc. In this fashion, attempts to restore the viability of each link in the chain are progressive, and rebooted (and responding) devices can be eliminated from further consideration.

If the controller determines that the downstream devices are in proper working condition, or if the controller cannot determine any upstream devices at issue, the controller may run internal diagnostic procedures or communicate with other backend apparatus to determine any fault with the controller itself.

Example Operation 1

Based on the foregoing failure scenarios of FIGS. 9-10B, exemplary processes for self-diagnosis and self-healing of particular issues within a wireless network according to the present disclosure will now be described.

In a first exemplary scenario, an end user is connected to a single access point on the wireless network (e.g., mesh AP 204 or root AP 206 as shown in FIG. 2 or embedded AP as shown in FIG. 10-10B) via a client device (smartphone, laptop, desktop, tablet, etc.). The AP is configured to consistently transmit heartbeat signals to an AP controller located at an intermediate or regional data center). The AP detects a continuing or chronic series of "loss of heartbeat" events or alarms associated with the AP, ostensibly indicating an issue with the AP or other component. Using the exemplary improvements described herein, the CM 906 and AP baseband module 604 (FIG. 6) may then be used to evaluate one or more factors such as higher-than-normal latency (e.g., higher than running average), and/or dropped packets, and moreover the RF performance of the CM can be evaluated (e.g., upstream/downstream power, ability to access various RF channels, etc.), such as via access to native DOCSIS tools associated with the CM.

In one variant, a continuous or intensive ping transmission and reception regime is used in order to conduct the foregoing evaluation(s) in a timely fashion for critical processes, although it will be appreciated that other test protocols may be used. Such implementations may provide robust connectivity between e.g., the controller and the AP, etc.

Example Operation 2

Another exemplary approach for self-diagnosis and self-resolution of issues within a wireless network is now described. In this second exemplary embodiment, an end user is connected to a single access point on the wireless network (e.g., mesh AP 204 or root AP 206 as shown in FIG. 2 or embedded AP as shown in FIG. 10-10B) via a client device (smartphone, laptop, desktop, tablet, etc.). Although the AP is aware of other network entities (e.g., CM), it is aware of its own network performance as well.

As discussed above with respect to FIGS. 9A and 9D, an AP may go offline or experience degraded performance for various reasons (e.g., overheating, firmware update, maintenance, physical disconnection to network, etc.). In the present embodiment, the AP architecture 600 is configured give itself a "grace period" (e.g., 30 minutes) upon e.g., shut down its critical features that prevents other devices (e.g., CM, client devices) from connecting to it, so as to ensure time to complete any incipient upgrade process, maintenance and/or rebooting, etc., as well as institute a self-healing protocol.

In one embodiment, the self-healing process begins after the grace period has passed. In one variant, the process includes: (i) checking whether the AP is online (i.e., whether the AP has been addressed and responds to network management entities); (ii) checking whether the billing code and IP address(es) are correct for the AP and/or the end user, (iii) resetting the CM (e.g., via native DOCSIS reset functions), (iv) check the configuration of upstream entities (e.g., AP controller), and (v) performing one or more test pings upstream from the AP to the controller to test the communications path. In one implementation thereof, sending heartbeat signals marks that normal AP operation and activity has resumed.

In another variant, when the AP checks the billing code and IP address (i.e., step (ii) above), the AP and/or auxiliary services (e.g., AAA 858) further checks whether any end user attempting to connect to the AP is a subscriber to the network provider; i.e., the end user and/or the client device has been authorized for billing and being assigned the IP address. In one implementation, the client device must have installed an MSO-provided software (e.g., an app) for authorization and access to the network.

Example Operation 3

In the scenario where the AP (and CM) are operational, and connections to the CM and the backhaul are functional (as evidenced by e.g., heartbeats/responses being normally transmitted and received, and CM operational parameters such as upstream/downstream power, RF channel access, etc. indicating normally), yet users of the AP are unable to gain (MSO) network access, the AP must look to other causes. For instance, in the embodiment, the AP 600 is configured to implement logic to determine whether the issue is caused by insufficient or improper authorization, a problem with the one of the network-side devices (e.g., a AAA or RADIUS server, billing module, etc.), or a network protocol-level problem (e.g., an incorrect or unavailable IP address or other incorrect network information).

As discussed above, the self-healing process may include checking whether the billing codes and IP addresses are verified for the AP and/or the end user; such testing may be useful where the AP appears to be online, but the users remain disconnected because of an incorrect billing code configuration (e.g., business configurations do not support residential use, and vice versa). For example, after an initial self-healing process has completed, the AP can attempt to restore service to end users; if the users cannot join then the AP initiates an internal configuration verification sequence. Specifically, in one implementation, the AP causes a reset of the CM. After the reset sequence, the AP controller configuration (e.g., billing codes, IP addresses, etc.) is verified, and the relevant AP controller is pinged to verify continuity. If the AP is offline but the CM is online, then the CM is reset once more via DOCSIS. In one such variant, the reset sequence is performed by a network operations center (NOC) (or equivalent logical entity) that sends a reset command to the CM, based on information received from the AP.

In the case of an authorization failure for multiple clients associated with a given AP, new users will be unable to access the AP. Hence, in one variant, the AP 600 is configured to check that its authentication protocols are functional and/or are able to communicate with the appropriate network authentication/entitlement entities. For example, the AP checks that AAA 858 and/or its Remote Authentication Dial-in User Service (RADIUS) server is online The AP also may run subsequent ping or other tests to determine AAA/ RADIUS server health and availability.

In another embodiment, the AP first checks whether the self-healing process referenced above has properly brought the device at issue back online. If the AP is determined (whether actively via detection of faulty parameters, configuration, etc., or via process of elimination of other devices/processes) to not be online or functional, the AP reboots itself. In one variant, the AP runs further self-diagnostic assessments, including of its antenna module 602, baseband module 604, radio resource module 608, cable modem interface module 612, etc. If the AP is determined to be online and functional, the AP takes the two additional steps.

If the connection issue persists, the AP determines the issue is likely with the client device. In one variant, the AP sends an alert to the client device by transmitting beacons that are "bit stuffed" with the alert to directly push the message to the client device (i.e., connection need not be established), as described in co-owned and co-pending U.S. patent application Ser. No. 15/063,314 filed Mar. 7, 2016 and entitled "APPARATUS AND METHODS FOR DYNAMIC OPEN-ACCESS NETWORKS", incorporated supra. The end user may be alerted to investigate the user's client device, such as by restarting the device, verifying that other devices can connect to the network, etc.

Example Operation 4

In the event that one or more APs become disconnected from their host or associated AP controller in the MSO network, the issue is correlated to the particular upstream network entity, e.g., root AP, CMTS, controller, backbone, backhaul connections, such as by executing an automatic diagnostic troubleshooting process on the AP controller. In the exemplary embodiment, this troubleshooting process includes: (i) checking the connectivity between the AP to the CM and the backbone (e.g., pinging each upstream device, as described elsewhere herein); (ii) checking the controller to see whether the AP has been configured and registered properly on the controller; (iii) checking whether the IP address or range of IP addresses assigned to the AP is/are properly registered by the controller and/or the CMTS; (iv) checking connections to local devices surrounding the AP for any regional issues, e.g., physical fiber or cable disconnections within the backhaul; and (v) checking the connectivity between the AP and headend apparatus, e.g., CMTS, AP controller, Layer 2 and 3 switches, control center.

Through the above process, the network identifies the problematic entity, whether it be an upstream root AP, a backend apparatus, or one in-between. Once the issue is correlated to one or more particular network entities, the MSO and/or the AP(s) may then send reboot commands to correct the issue, or implements other corrective action.

Controller Apparatus

Figure 13:
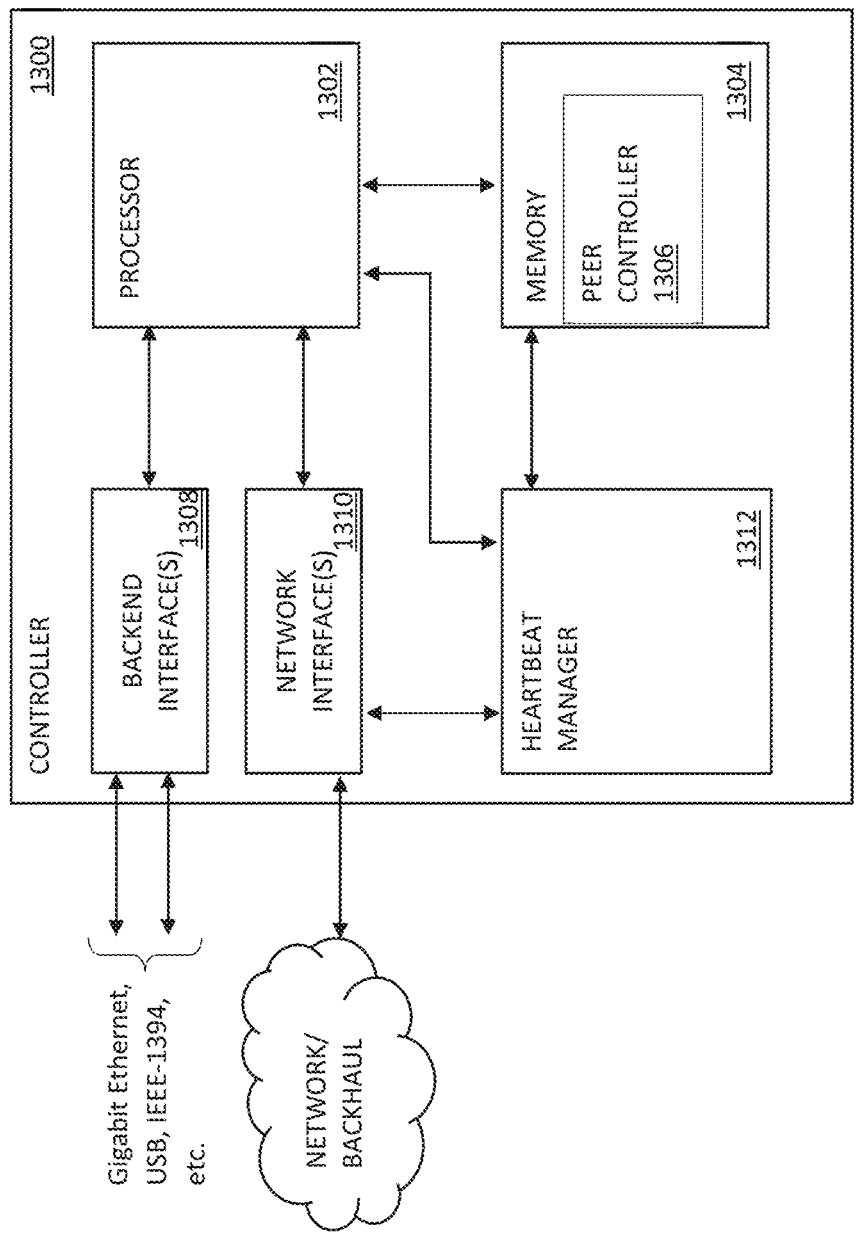
FIG. 13 is a functional block diagram of an exemplary embodiment of a controller apparatus according to the present disclosure.

FIG. 13 illustrates an exemplary embodiment of a controller apparatus 1300 according to the present disclosure. As shown, the controller includes, inter alia, a processor 1302, a memory module 1304, a peer controller (PC) 1306, a backend (e.g., headend, backhaul) network interface 1308, and a network (e.g., LAN, WLAN) interface 1310. Although the exemplary controller 1300 may be used as described within the present disclosure, those of ordinary skill in the related arts will readily appreciate, given the present disclosure, that the controller apparatus may be virtualized and/or distributed within other core network entities (thus having ready access to power for continued operation), and hence the foregoing apparatus 1300 is purely illustrative.

More particularly, the exemplary controller is located within near or at the centralized manager, e.g., MSO; an intermediate entity, e.g., within a data center, such as an AP controller; and/or within "cloud" entities or other portions of the infrastructure of which the rest of the wireless network (as discussed supra) is a part. In some embodiments, the controller 1300 may be one of several controllers, each having equivalent effectiveness or different levels of use, e.g., within a hierarchy (e.g., controller 1300 may be under a "parent" controller that manages multiple slave or subordinate controllers).

In one embodiment, the processor 1302 may include one or more of a digital signal processor, microprocessor, field-programmable gate array, or plurality of processing components mounted on one or more substrates. The processor 1302 may also comprise an internal cache memory. The processing subsystem is in communication with a memory subsystem 1304, the latter including memory which may for example comprise SRAM, flash, and/or SDRAM components. The memory subsystem may implement one or more of DMA type hardware, so as to facilitate data accesses as is well known in the art. The memory subsystem of the exemplary embodiment contains computer-executable instructions which are executable by the processor subsystem.

The processing apparatus 1302 is configured to execute at least one computer program stored in memory 1304 (e.g., a non-transitory computer readable storage medium). The computer program may include a plurality of computer readable instructions configured to perform the complementary logical functions of a peer controller (PC) 1306. Other embodiments may implement such functionality within dedicated hardware, logic, and/or specialized co-processors (not shown). For instance, the peer controller (or portions of the functionality thereof) can be located in one or more MSO data centers, and/or in other "cloud" entities, whether within our outside of the MSO network.

In the exemplary embodiment as shown, controller 1300 includes a heartbeat manager module 1312. The heartbeat manager 1312 is a hardware and/or software module that is in data communication with the processor 1302, memory 1304 and/or one or more interfaces 1308, 1310 to the external network. In some embodiments, the heartbeat manager 1312 is internal to the processor, memory, or other components of the controller 1300, such as via being rendered in software or firmware operative to run on the processor core(s).

At a high level, the exemplary heartbeat manager 1312 is configured to implement (or facilitate implementation of) the methods described above with respect to FIGS. 11-12, as applicable. The heartbeat manager is configured to manage signals or messages received upstream (sent from, e.g., an AP such as one utilizing the architecture 600 of FIG. 6) that contain, inter alia, (i) information that allows the controller (or other network devices that receive and/or relay the signal upstream) to ascertain that such heartbeat signal requires a response, (ii) information about the origin/routing of the signal, and/or (iii) instructions on handling of the signal (e.g., send a response heartbeat signal to the originating device or a device identified by a unique ID, MAC address, IP address, etc.).

In one embodiment, the heartbeat manager accesses the memory module 1304 to retrieve stored data. The data or information may relate to open-access features such as available bandwidth, power level readings, logs for received and transmitted signals, network conditions, quality of service, etc. Such features are accessible by other backend entities or may be included in response signals (e.g., back to AP).

In other embodiments, application program interfaces (APIs) such as those included in an MSO-provided applications, installed with other proprietary software, or natively available on the controller apparatus (e.g., as part of the computer program noted supra or exclusively internal to the heartbeat manager module 1312) may also reside in the internal cache or other memory 1304. Such APIs may include common network protocols or programming languages configured to enable communication with other network entities as well as receipt and transmit signals that a receiving device (e.g., AP) may interpret.

In one embodiment, the PC 1306 is configured to register known downstream devices, other backend devices, and wireless client devices (remotely located or otherwise), and centrally control the broader wireless network (and any constituent peer-to-peer sub-networks). Such configuration include, e.g., providing network identification (e.g., to APs, CMs and other downstream devices, or to upstream devices), managing network congestion, and managing capabilities supported by the wireless network.

In another embodiment, the PC 1306 is further configured to communicate with one or more authentication, authorization, and accounting (AAA) servers of the network. The AAA servers are configured to provide services for, e.g., authorization and/or control of network subscribers for controlling access to computer resources, enforcing policies, auditing usage, and providing the information necessary to bill for services.

In some variants, authentication processes are configured to identify an AP, a client device, or an end user, such as by having the end user enter valid credentials (e.g., user name and password) before access is granted, or other methods as described supra. The process of authentication may be based on each subscriber having a unique set of criteria or credentials (e.g., unique user name and password, challenge questions, entry of biometric data, entry of human-verification data such as "CAPTCHA" data, etc.) for gaining access to the network. For example, the AAA servers may compare a user's authentication credentials with user credentials stored in a database therein. If the authentication credentials satisfy the access requirements (e.g., provided credentials match the stored credentials), the user may then be granted access to the network and its features and services. If the credentials are at variance, authentication fails and network access may be denied.

Following authentication, the AAA servers are configured to grant authorization to a subscriber user for certain features, functions, and/or tasks. After logging into the wireless network, for instance, the subscriber may try to access an MSO-provided email account, cloud storage account, or streaming content. The authorization process determines whether the user has the authority to access those services or issue commands related thereto. Simply put, authorization is the process of enforcing policies, i.e., determining what types or qualities of activities, resources, or services a user is permitted. Usually, authorization occurs within the context of authentication. Once a user is authenticated, they may be authorized for different types of access or activity. A given user may also have different types, sets, or levels of authorization, depending on any number of aspects.

The AAA servers may be further configured for accounting, which measures the resources a user consumes during access. This may include the amount of system time or the amount of data a user has sent and/or received during a session, somewhat akin to cellular data plans based on so many consumed or available GB of data. Accounting may be carried out by logging of session statistics and usage information, and is used for, inter alia, authorization control, billing, trend analysis, network resource utilization, and capacity planning activities. It will be appreciated that in other examples, one or more AAA servers may be linked to a third-party or proxy server, such as that of an event management entity.

In one embodiment, one or more backend interfaces 1308 are configured to transact one or more network address packets with other networked devices, particularly backend apparatus (e.g., CMTS, Layer 3 switch, network monitoring center, MSO) according to a network protocol. Common examples of network routing protocols include for example: Internet Protocol (IP), Internetwork Packet Exchange (IPX), and Open Systems Interconnection (OSI) based network technologies (e.g., Asynchronous Transfer Mode (ATM), Synchronous Optical Networking (SONET), Synchronous Digital Hierarchy (SDH), Frame Relay). In one embodiment, the backend network interface 1308 operates in signal communication with the backbone of the content delivery network (CDN), such as that of FIGS. 1-1*d*. These interfaces might comprise, for instance, GbE (Gigabit Ethernet) or other interfaces of suitable bandwidth capability.

In one embodiment, one or more network interfaces 1310 are utilized in the illustrated embodiment for communication with downstream network entities, e.g., APs, backbone entities, data centers, and/or CMs, such as via Ethernet or other wired and/or wireless data network protocols. Heartbeat pings received from downstream are routed via the network interface to the heartbeat manager 1312.

It will also be appreciated that the two interfaces 1308, 1310 may be aggregated together and/or shared with other extant data interfaces, such as in cases where a controller function is virtualized within another component, such as an MSO network server performing that function.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

What is claimed is:

1. Wireless radio frequency access point apparatus, comprising:
    a first radio frequency modem configured to enable wireless communication between a plurality of user devices and the wireless radio frequency access point apparatus, the first radio frequency modem configured to operate according to a first protocol and comprising:
        a baseband module;
        a radio signal monitoring circuit in first data communication with the baseband module and comprising logic operative to run thereon; and
        a data interface in second data communication with the baseband module and configured to enable the second data communication between the first radio frequency modem and a second modem, the second modem configured to operate according to a second protocol different than the first protocol;
    wherein the logic is configured to:
        selectively monitor a plurality of network entities via the second modem to evaluate an upstream connectivity status, the monitor comprising transmission of a heartbeat signal to each of the plurality of network entities;
        determine whether a return signal is received from a first network entity of the monitored plurality of network entities within a first range of time;
        based on a determination that the return signal is received from the first network entity within the first range of time, repeat the transmission of the heartbeat signal to the first network entity;
        based on a determination that the return signal is received from the first network entity within a second range of time of greater duration than the first range of time, identify the first network entity for future investigation, and repeat the transmission of the heartbeat signal to the first network entity; and
        based on a determination that the return signal is not received from the first network entity within the first or second range of time, determine that the upstream connectivity status is offline with respect to the first network entity, and cause the first radio frequency modem to stop transmission of a service set identifier (SSID) for the first network entity.

2. The wireless radio frequency access point apparatus of claim 1, wherein the first radio frequency modem comprises a Wireless Local Area Network (WLAN) modem having an air interface, and the second modem comprises a Data Over Cable Services Interface Specification (DOCSIS) compliant cable modem configured to transmit and receive signals over a wireline medium.

3. The wireless radio frequency access point apparatus of claim 1, wherein the plurality of network entities includes at least one cable modem in communication with the second modem; and wherein the logic is configured to determine that the upstream connectivity status is offline when the at least one cable modem is in a reboot sequence.

4. The wireless radio frequency access point apparatus of claim 3, wherein the logic is configured to determine that the upstream connectivity status is offline when the at least one cable modem has lost upstream connectivity to a service provider backbone network.

5. The wireless radio frequency access point apparatus of claim 3, wherein the logic is configured to determine that the upstream connectivity status is offline when the second modem has lost connectivity with the at least one cable modem.

6. Embedded access point apparatus, comprising:
a first radio frequency modem configured to enable wireless communication between a plurality of user devices and the embedded access point apparatus, the first radio frequency modem configured to operate according to a first protocol;
a cable modem configured to operate according to a second protocol different than the first protocol, wherein the cable modem is configured to communicate with a cable modem termination system of a service provider backbone network; and
a signal monitoring apparatus configured to transact data between the first radio frequency modem and the cable modem and comprising logic operative to run thereon;
wherein the logic is configured to:
selectively monitor a plurality of network entities of the service provider backbone network via the cable modem to evaluate an upstream connectivity status with respect to the plurality of network entities;
based on a determination that (i) the upstream connectivity status is evaluated to be offline based on at least a partial failure of the embedded access point apparatus and a return signal not being received from at least one of the plurality of network entities within a range of time, and that (ii) a configuration mismatch is present, the configuration mismatch comprising at least a billing code mismatch or an internet protocol (IP) address mismatch, cause the first radio frequency modem to stop transmission of a service set identifier (SSID); and
initiate a self-healing process of the embedded access point apparatus, the self-healing process comprising (i) a self-reboot of the embedded access point apparatus and (ii) in response to the determination that the configuration mismatch is present, causation of a correction of the configuration mismatch.

7. The embedded access point apparatus of claim 6, wherein the cable modem is further configured to cause the first radio frequency modem to stop transmission of a service set identifier (SSID) when the cable modem is in a reboot sequence.

8. The embedded access point apparatus of claim 6, wherein the first radio frequency modem stops transmission of a service set identifier (SSID) when in a reboot sequence.

9. The embedded access point apparatus of claim 6, wherein the selective monitoring of the plurality of network entities comprises transmission of a heartbeat signal to each of the plurality of network entities.

10. The embedded access point apparatus of claim 9, wherein the logic is further configured to, based on a determination that the return signal is received from the from at least one of the plurality of network entities within the range of time, repeat the transmission of the heartbeat signal to the at least one of the plurality of network entities.

11. A method executed by a network device to assist in evaluating network connectivity, the method comprising:
transmitting a heartbeat signal to one or more network entities, the one or more network entities comprising at least one of (i) a cable modem, (ii) an access point controller, and (iii) an access point, the heartbeat signal causing the one or more network entities to respond when received;
waiting for a response to the heartbeat signal; and
based on determining that the response to the heartbeat signal is not successfully received within a predetermined time period:
evaluating whether at least one of the one or more network entities is offline;
verifying one or more controller configuration parameters responsive to determining that one or more end users are unable to connect to the network device despite the network device being online;
self-evaluating, by the network device, an internal status to determine whether the network device caused the determination that the response to the heartbeat signal is not successfully received;
stopping transmission of a service set identifier (SSID); and
implementing, by the network device, corrective action for at least one of (i) the at least one of the one or more network entities and (ii) the network device.

12. The method of claim 11, wherein the at least of the one or more network entities is the network device, and the evaluating comprises determining whether the network device is upgrading or rebooting; and
wherein the implementing of the corrective action comprises waiting for the upgrading or rebooting to complete and thereafter self-healing the network device.

13. The method of claim 12, wherein the self-healing further comprises one or more actions selected from the group consisting of:
checking at least one billing code and at least one internet protocol (IP) address of the network device; and
checking a controller configuration associated with an upstream controller and pinging the upstream controller.

14. The method of claim 11, wherein the at least one of the one or more network entities is the network device, and the method further comprises:
pinging an authorization server of the network, when multiple end users are unable to connect to the network device despite the network device being online.

15. The method of claim 11, wherein the at least one of the one or more network entities comprises multiple access points, and the method further comprises executing a trouble shooting process that includes at least one of:
checking a connectivity of one or more of the multiple access points;
identifying a network entity correlated with all of the multiple access points having a likelihood of being defective based on the checking of the connectivity of the one or more of the multiple access points; and
identifying a network component correlated with all of the multiple access points having a likelihood of being defective based on the checking of the connectivity of the one or more of the multiple access points.

16. The method of claim 15, wherein the identifying the network entity comprises checking one or more of a shared access point controller and a shared cable modem termination system.

17. The method of claim 15, wherein the identifying the network component comprises checking one or more of a shared fiber, a shared switch, or a shared concentrator.

18. The method of claim 11, further comprising transmitting one or more additional heartbeat signals to the one or more network entities;
   wherein the determining that the response to the heartbeat signal is not successfully received within the predetermined time period further comprises determining that a response to the one or more additional heartbeat signals is not successfully received.

19. The method of claim 11, further comprising initiating a self-reboot process based on the determining that the response to the heartbeat signal is not successfully received, the self-reboot process comprising an attempt to restore a network connection with the at least one of the one or more network entities.

20. The method of claim 11, further comprising sending an alert message to at least one of the one or more end users via at least one client device associated with the at least one of the one or more end users, the alert message comprising instructions to resolve the inability to connect to the network device.

\* \* \* \* \*